US012599223B2

(12) United States Patent
Choi et al.

(10) Patent No.: US 12,599,223 B2
(45) Date of Patent: Apr. 14, 2026

(54) BRUSHING GUIDE ELASTIC TOOTHBRUSH AND ELASTIC RESTORATION MECHANISM

(71) Applicant: I2C BRIDGE CORP., Paju-si (KR)

(72) Inventors: Nae Yoon Choi, Goyang-si (KR); Young Gun Hong, Seoul (KR)

(73) Assignee: BRIDGE CORP., Paju-si (KR)

( * ) Notice: Subject to any disclaimer, the term of this patent is extended or adjusted under 35 U.S.C. 154(b) by 259 days.

(21) Appl. No.: 18/641,188

(22) Filed: Apr. 19, 2024

(65) Prior Publication Data

US 2024/0260735 A1     Aug. 8, 2024

Related U.S. Application Data

(63) Continuation of application No. PCT/KR2022/016007, filed on Oct. 20, 2022.

(30) Foreign Application Priority Data

Oct. 20, 2021   (KR) ........................ 10-2021-0139929
Nov. 16, 2021   (KR) ........................ 20-2021-0003468
(Continued)

(51) Int. Cl.
   *A46B 5/00*         (2006.01)
   *A46B 9/04*         (2006.01)
   (Continued)

(52) U.S. Cl.
   CPC .......... *A46B 5/0037* (2013.01); *A46B 5/0095* (2013.01); *A46B 9/04* (2013.01);
   (Continued)

(58) Field of Classification Search
   CPC ....... A46B 5/0037; A46B 5/0095; A46B 9/04; A46D 3/00; B29C 45/1676
   See application file for complete search history.

(56) References Cited

U.S. PATENT DOCUMENTS

2003/0163883 A1* 9/2003 Broecker ............. A46B 5/0062
                                                    15/167.1

FOREIGN PATENT DOCUMENTS

EP        0669812 A1    9/1995
EP        0669812 B1 *  7/1997  ........... A46B 5/0066
          (Continued)

OTHER PUBLICATIONS

International search report of PCT/KR2022/016007, Jan. 25, 2023, English translation.

*Primary Examiner* — Marc Carlson
(74) *Attorney, Agent, or Firm* — STIP Law Group, LLC

(57) ABSTRACT

The present invention relates to a brushing guide elastic toothbrush comprising: a toothbrush head having bristles provided on the outer circumferential surface of one side in the longitudinal direction; a toothbrush handle connected to the rear end of the toothbrush head in the longitudinal direction and extending in one direction such that a user can hold the toothbrush handle by hand; and an elastic rotation restoring part provided between the toothbrush head and the toothbrush handle and allowing rotation of the toothbrush handle and rotation of the toothbrush head based on the rotation of the toothbrush handle. When force is applied to the toothbrush handle by the user such that the toothbrush handle rotates in one direction with respect to the longitudinal direction while the bristles are pressed and in close contact with the user's teeth or gums, the elastic rotation restoring part allows the rotation of the toothbrush handle and stores a rotational force generated by the toothbrush handle, and when the pressure contact of the bristles is released from the user's teeth or gums while a rotational force generated by the toothbrush handle is stored in the elastic rotation restoring part, the elastic rotation restoring part may provide the stored rotational force to the toothbrush head such that the teeth or gums can be cleaned by the
(Continued)

bristles while the toothbrush head rotates in the same direction as the toothbrush handle.

7 Claims, 55 Drawing Sheets

(30)      Foreign Application Priority Data

| | | |
|---|---|---|
| Dec. 23, 2021 | (KR) ........................ | 10-2021-0185557 |
| Jan. 14, 2022 | (KR) ........................ | 20-2022-0000118 |
| Jan. 25, 2022 | (KR) ........................ | 20-2022-0000284 |
| Mar. 4, 2022 | (KR) ........................ | 20-2022-0000567 |
| Mar. 11, 2022 | (KR) ........................ | 20-2022-0000619 |
| Apr. 20, 2022 | (KR) ........................ | 20-2022-0000955 |
| Apr. 28, 2022 | (KR) ........................ | 20-2022-0001047 |
| Jun. 13, 2022 | (KR) ........................ | 20-2022-0001425 |
| Jul. 28, 2022 | (KR) ........................ | 20-2022-0001831 |
| Sep. 14, 2022 | (KR) ........................ | 10-2022-0115268 |
| Oct. 6, 2022 | (KR) ........................ | 10-2022-0127845 |

(51) Int. Cl.
*A46D 3/00*      (2006.01)
*B29C 45/16*      (2006.01)
*B29L 31/42*      (2006.01)

(52) U.S. Cl.
CPC ........ *A46D 3/00* (2013.01); *A46B 2200/1066* (2013.01); *B29C 45/1676* (2013.01); *B29L 2031/425* (2013.01)

(56)      References Cited

FOREIGN PATENT DOCUMENTS

| | | | | | |
|---|---|---|---|---|---|
| JP | S5377074 | U | | 6/1978 | |
| JP | S63159525 | U | | 10/1988 | |
| JP | 2003500091 | A | * | 1/2003 | ............ A46B 5/007 |
| JP | 2008534800 | A | | 8/2008 | |
| KR | 200258312 | Y1 | * | 12/2001 | |
| KR | 20050011002 | A | * | 1/2005 | |
| KR | 20050026742 | A | * | 3/2005 | ............ A46B 13/08 |
| KR | 20100012450 | U | * | 12/2010 | .............. A46B 9/04 |
| KR | 101128208 | B1 | * | 3/2012 | .......... A46B 5/0066 |
| KR | 101255859 | B1 | * | 4/2013 | ............ A61C 17/22 |
| KR | 101331607 | B1 | * | 11/2013 | .......... A46B 5/0033 |
| KR | 20140132636 | A | * | 11/2014 | ............ A61C 17/34 |
| KR | 20170067573 | A | * | 6/2017 | .......... A46B 5/0012 |
| KR | 101767824 | B1 | * | 8/2017 | ............ A46B 9/028 |
| WO | WO-2021012070 | A1 | * | 1/2021 | .............. A46B 9/00 |

* cited by examiner

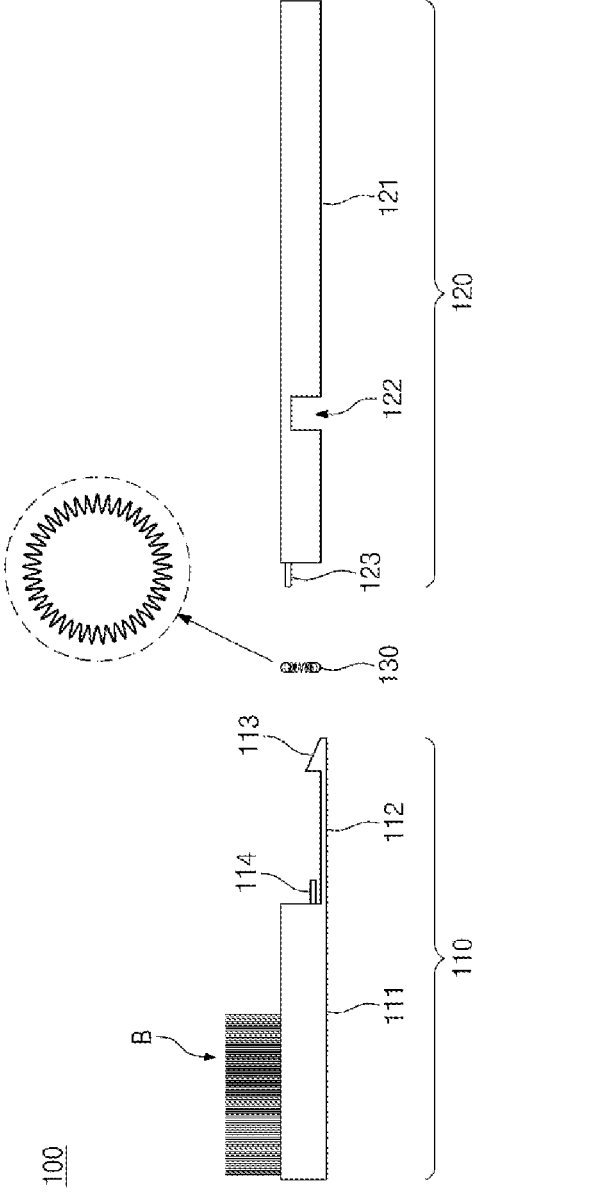
[FIG. 1]

[FIG. 2]
100
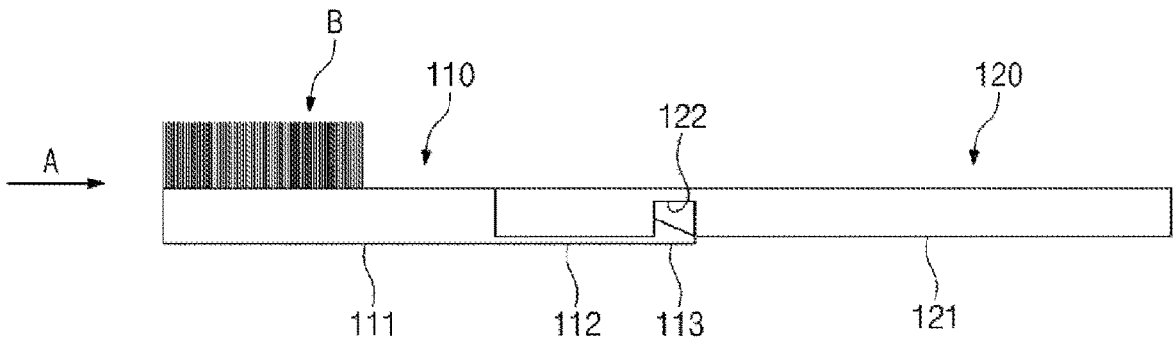
[FIG. 3]
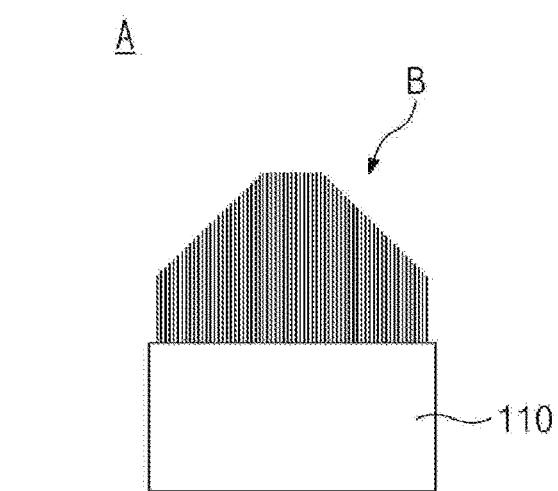

[FIG. 4]
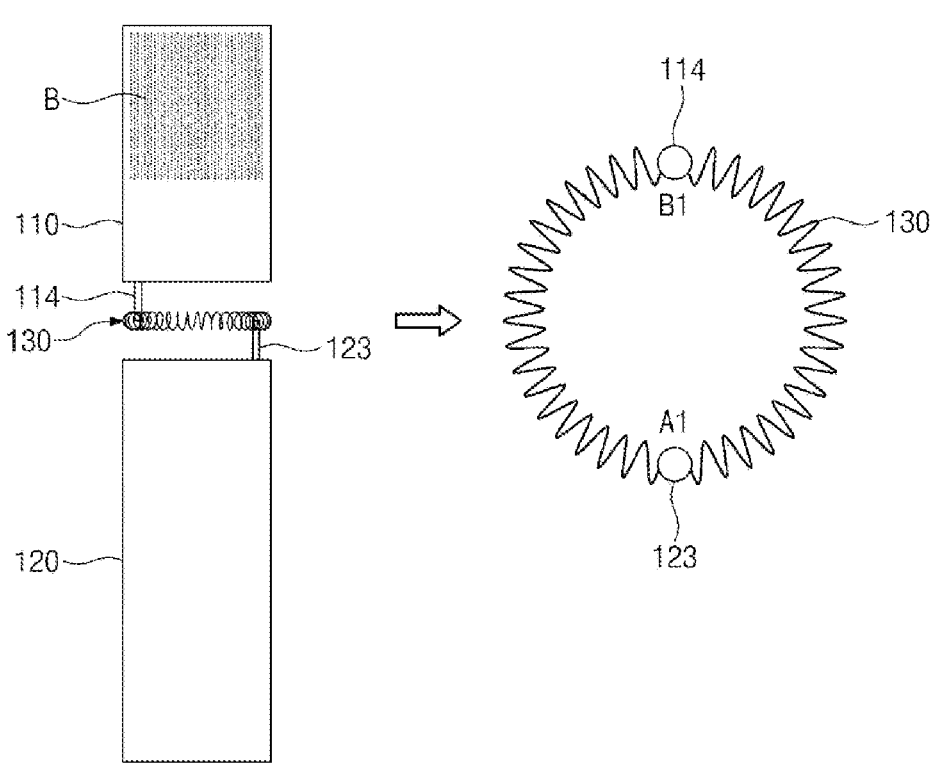

[FIG. 5]
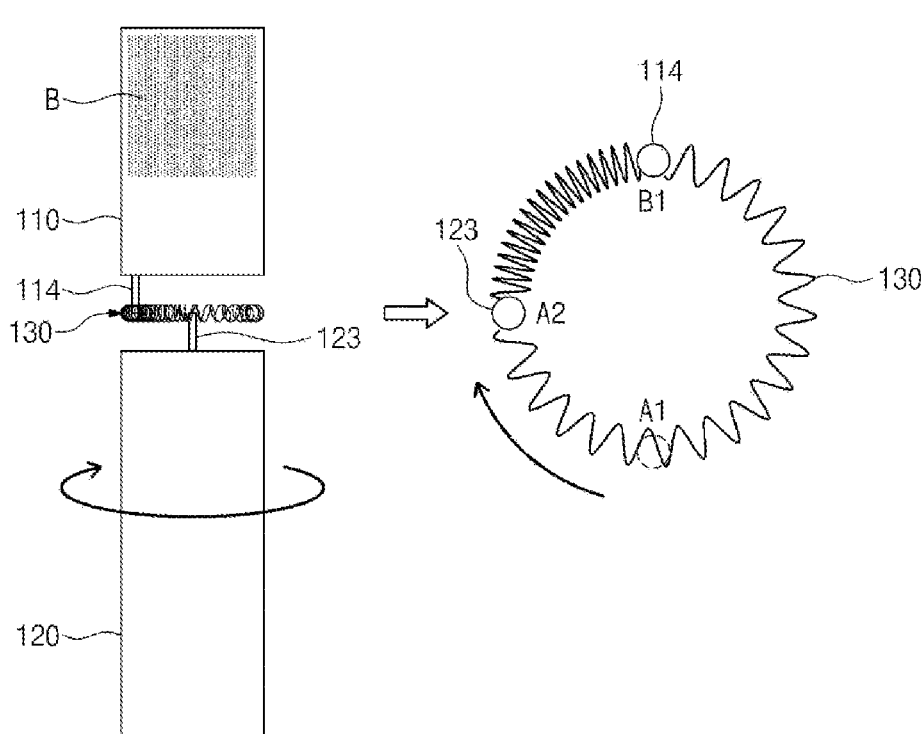

[FIG. 6]
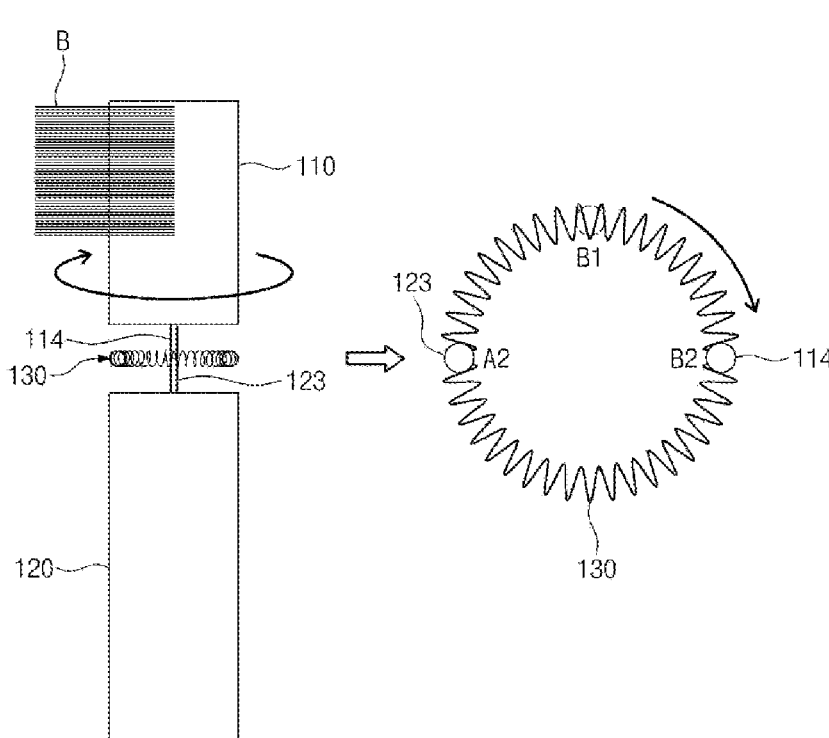

[FIG. 7]
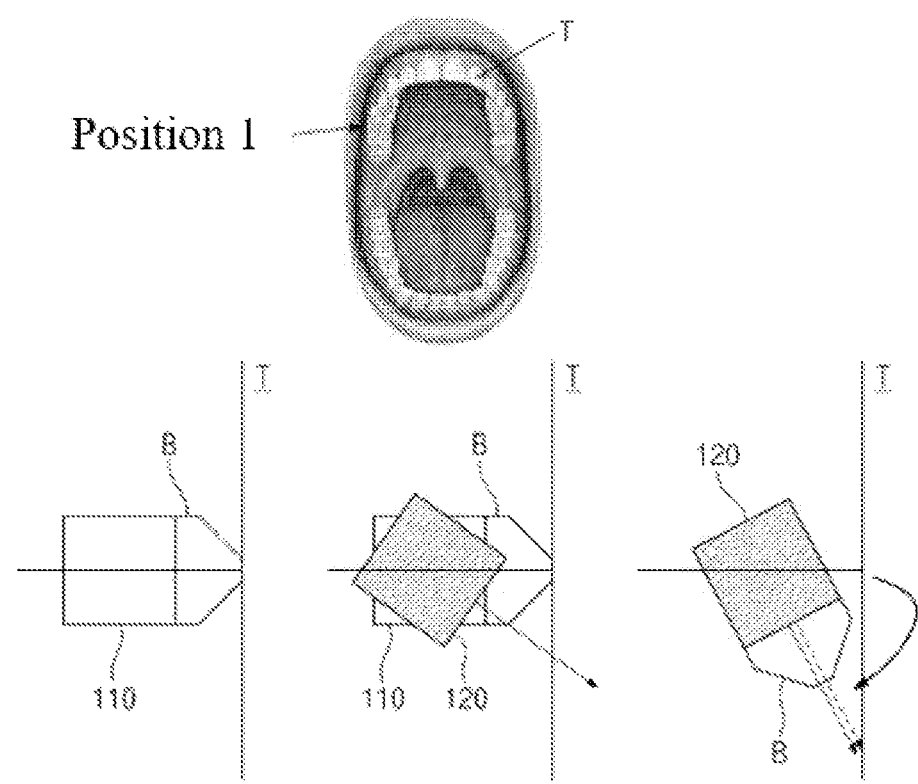

[FIG. 8]
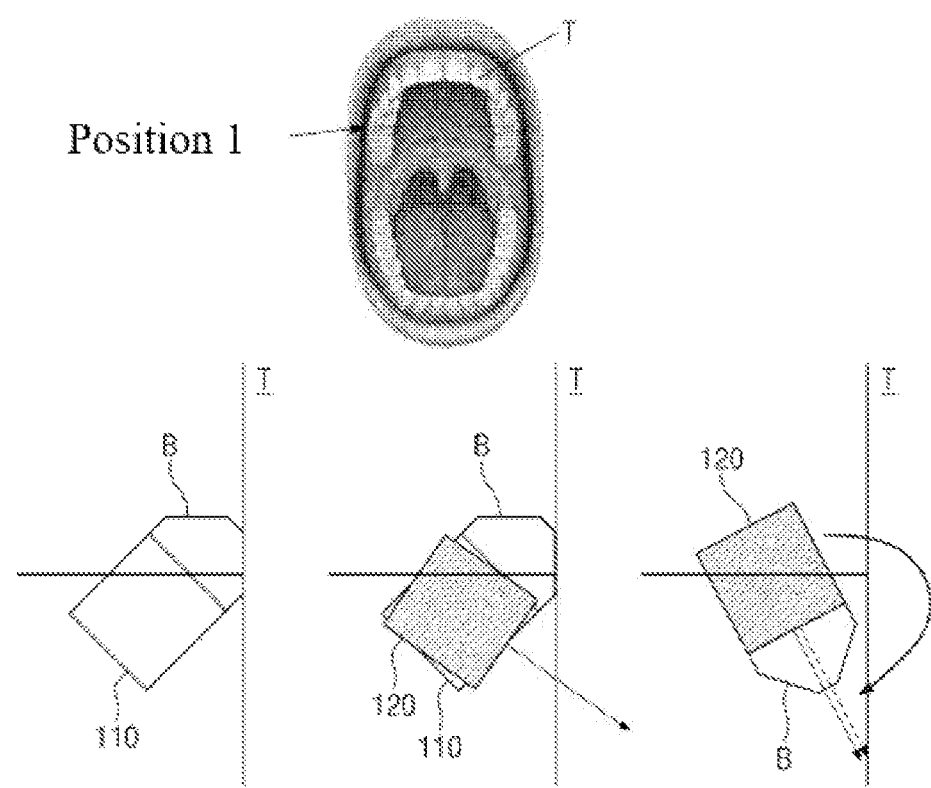

[FIG. 9]
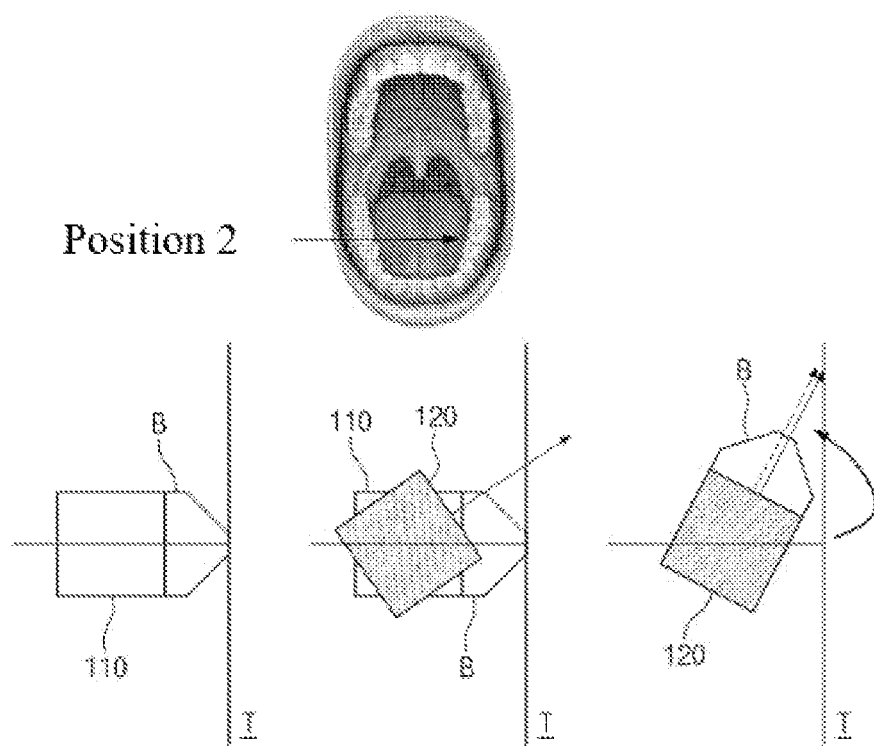

[FIG. 10]
<u>200</u>
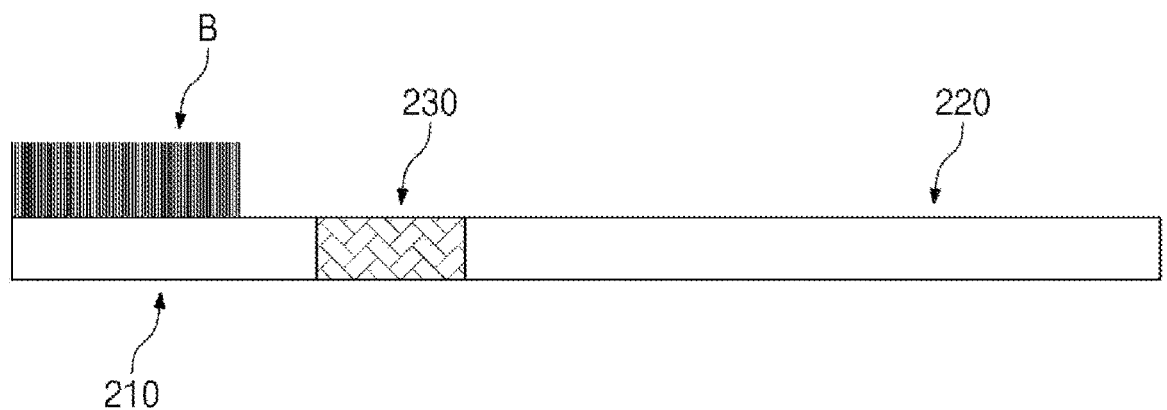
[FIG. 11]
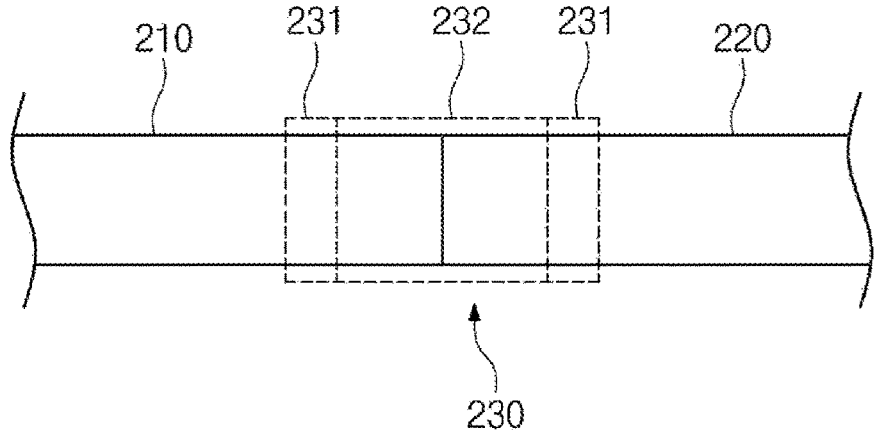

[FIG. 12]
300
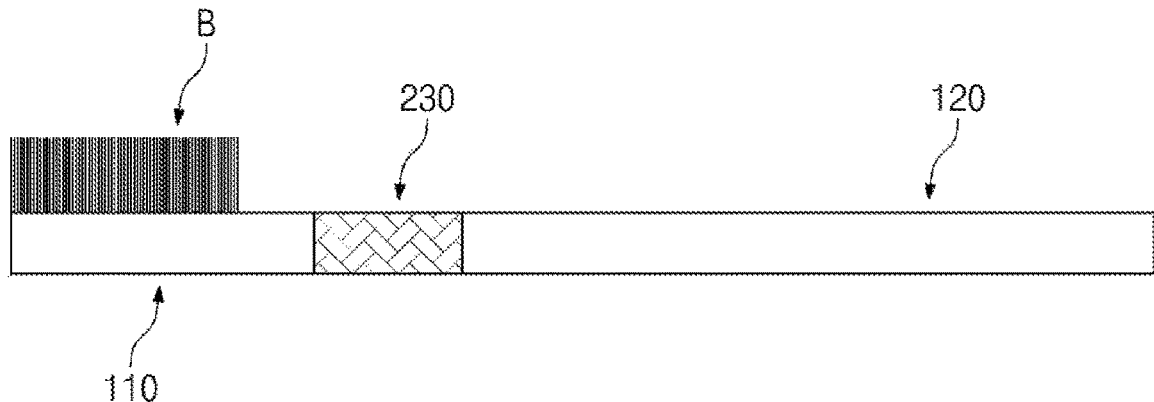

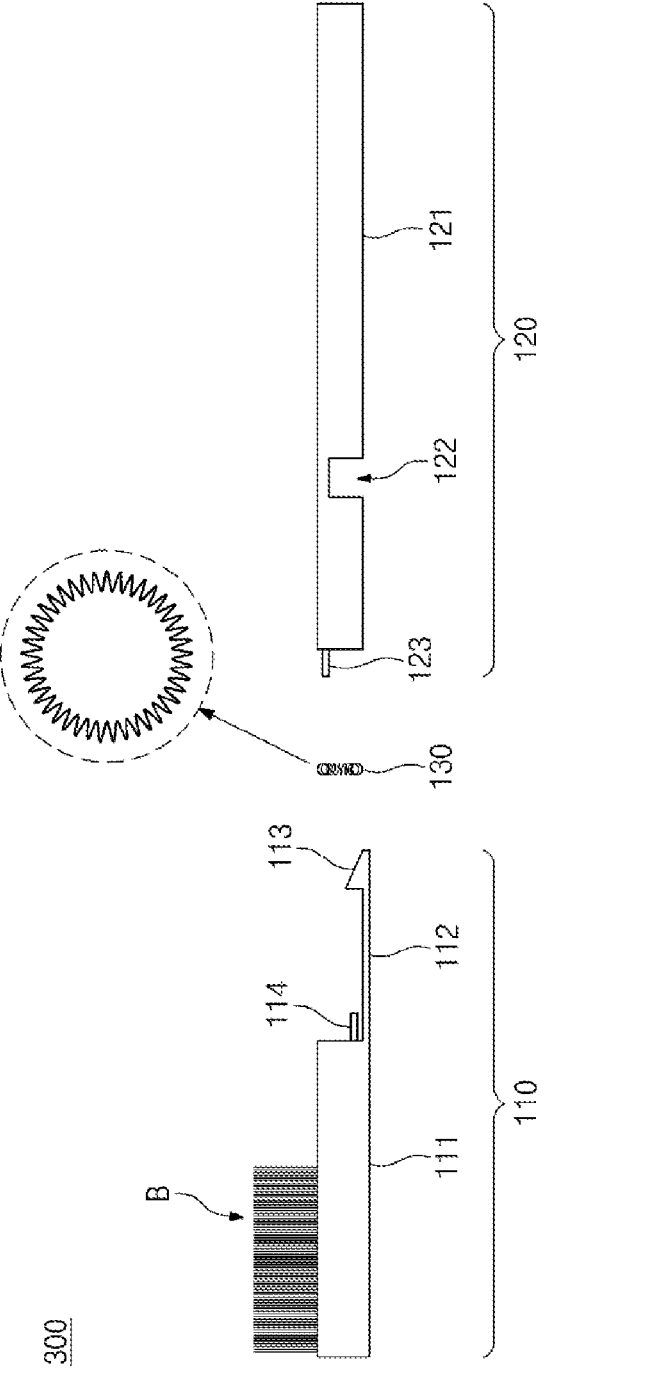
[FIG. 13]

[FIG. 14]
400
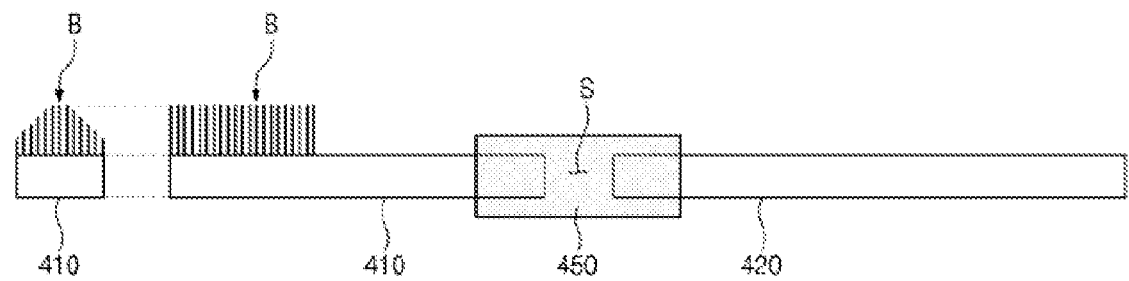

[FIG. 15A]
400
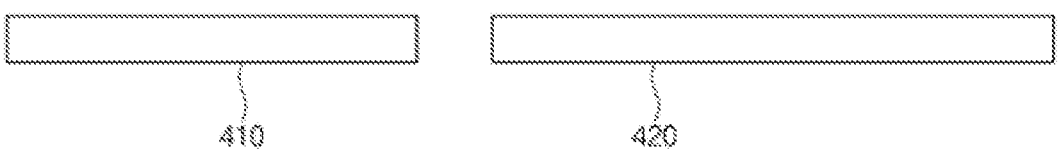
410            420
[FIG. 15B]
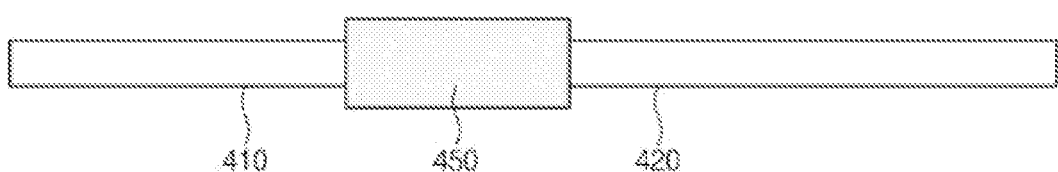
410      450      420

[FIG. 16A]
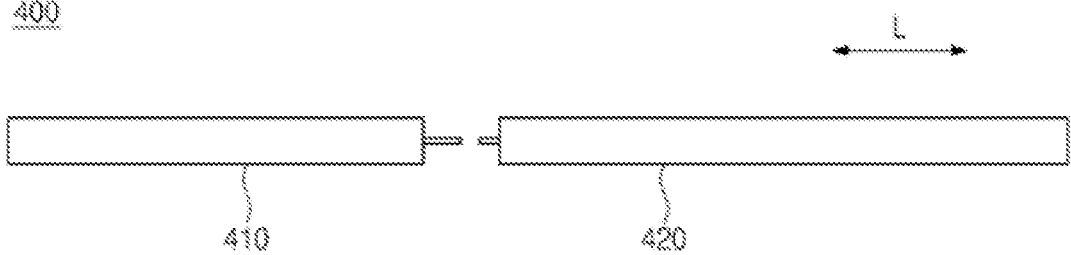
410
420
[FIG. 16B]
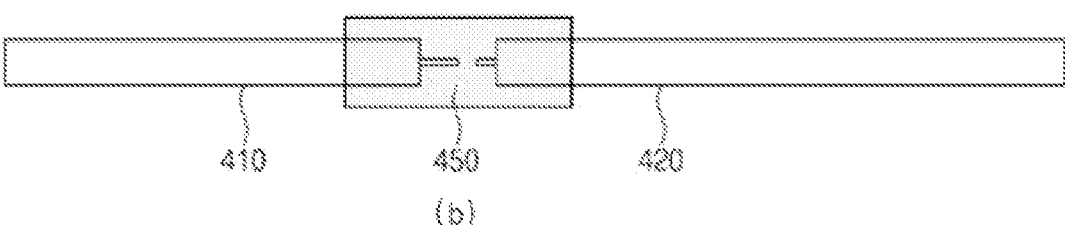
410
450
420
(b)

[FIG. 17A]
400
452
410
420
L
[FIG. 17B]
410        450        420
[FIG. 17C]
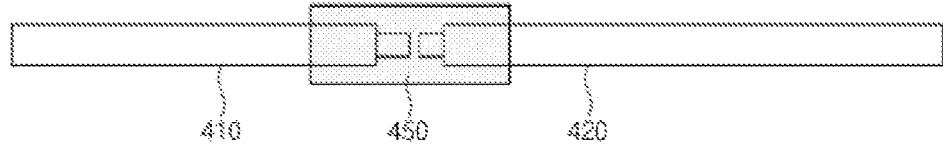
410        450        420

[FIG. 18]
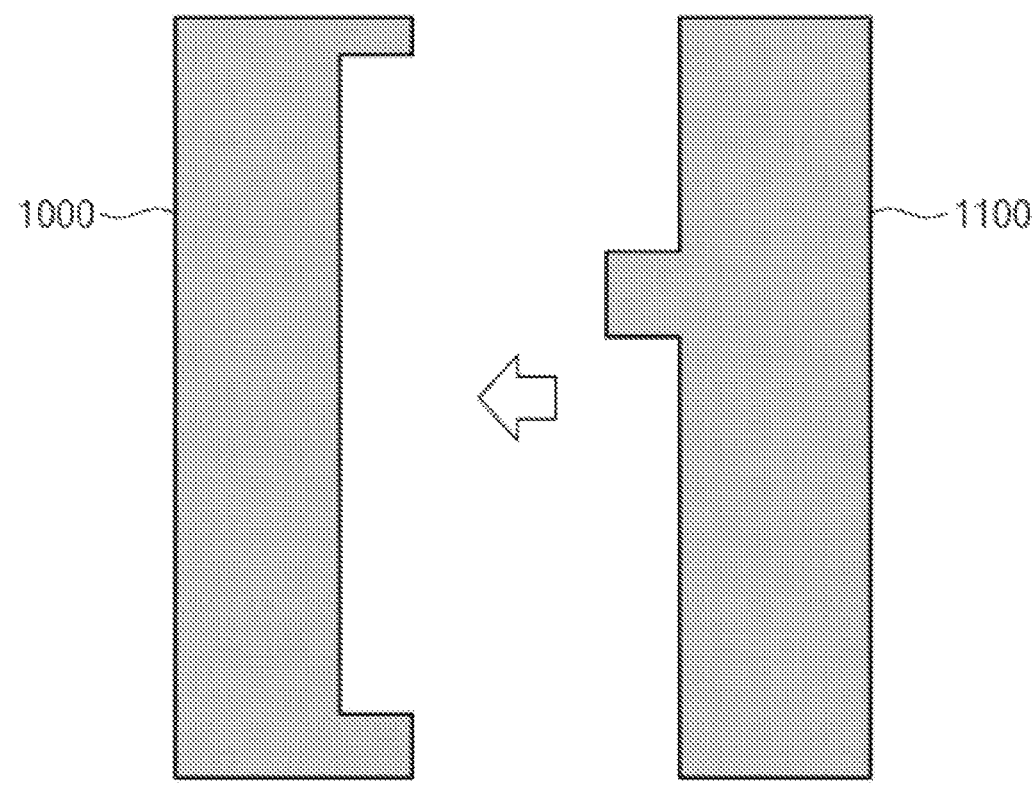

[FIG. 19]
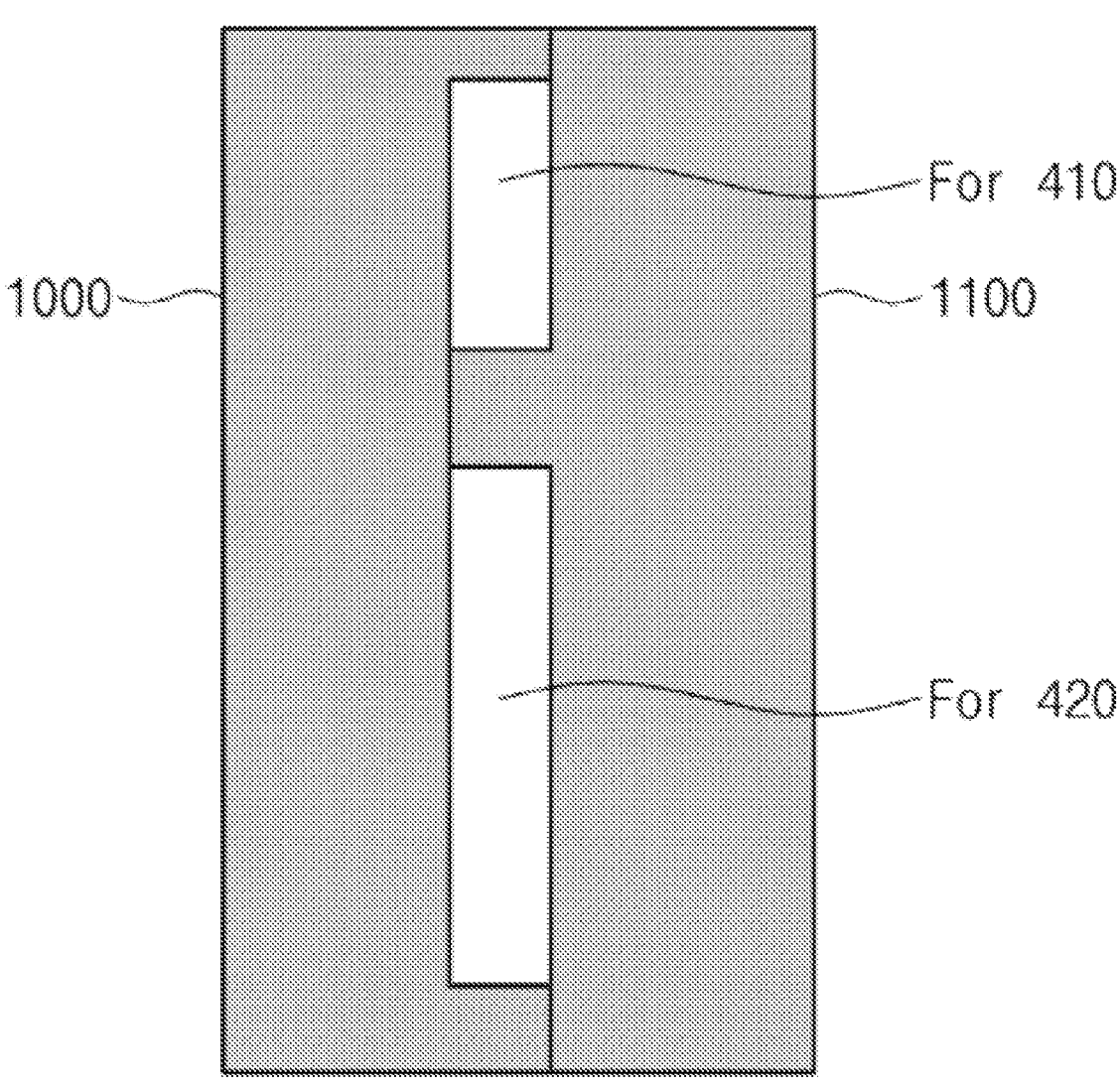

[FIG. 20]
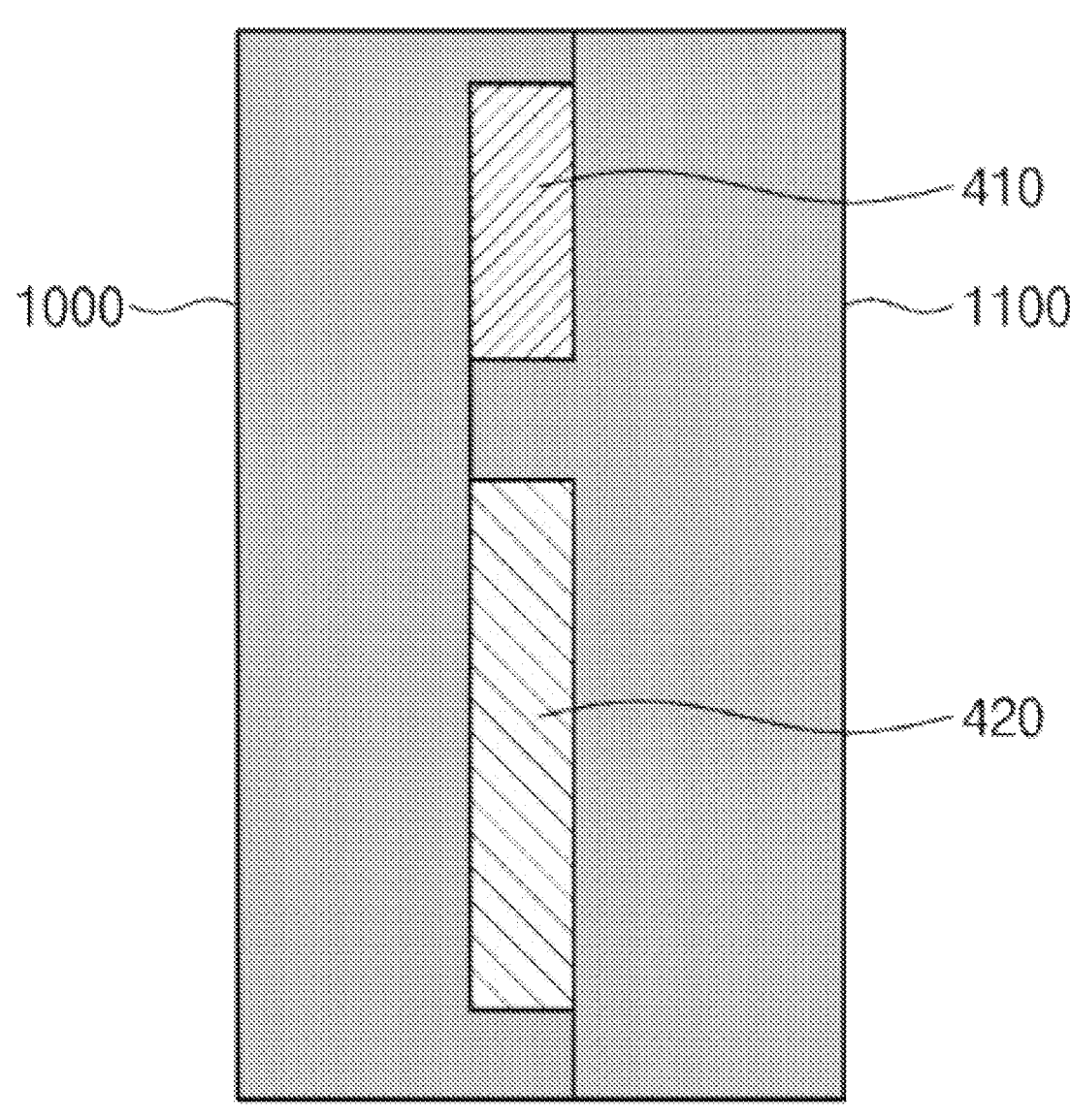

[FIG. 21]
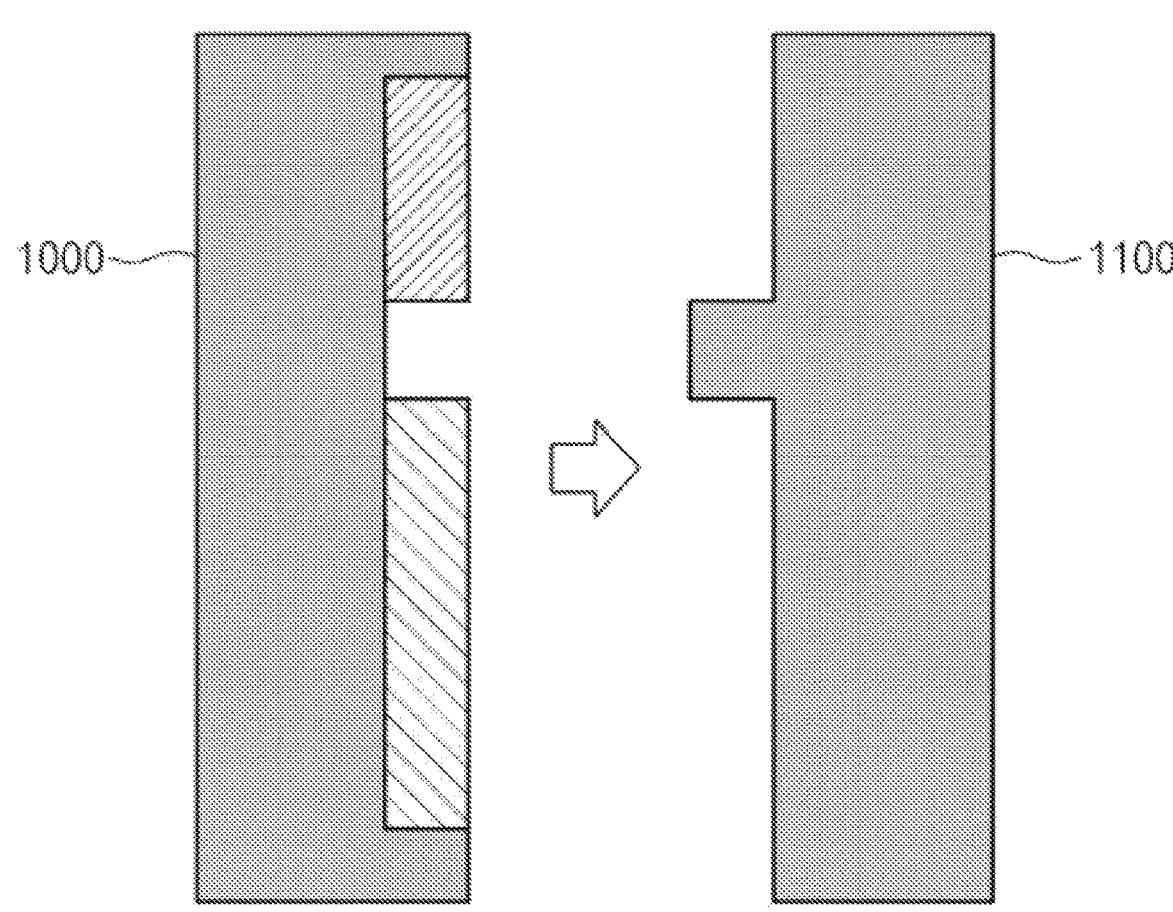

[FIG. 22]
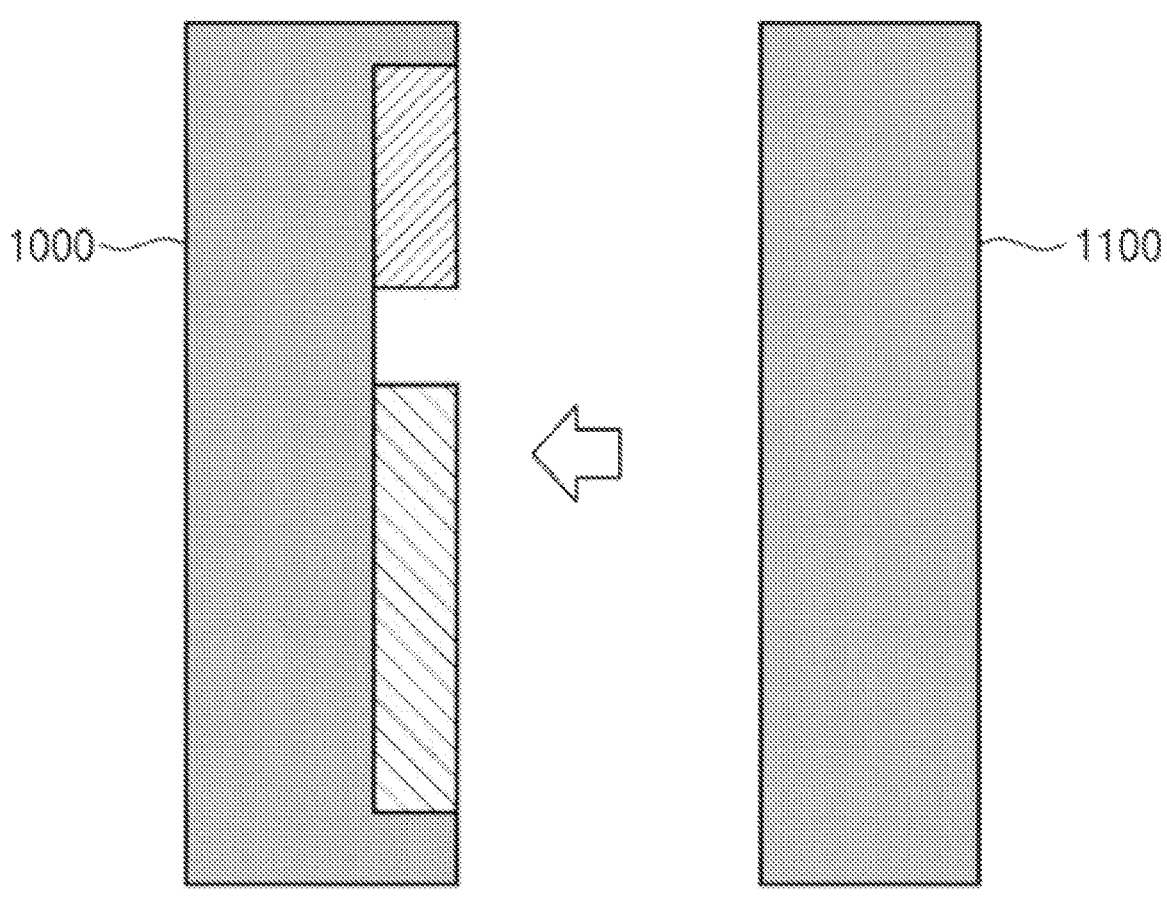

[FIG. 23]
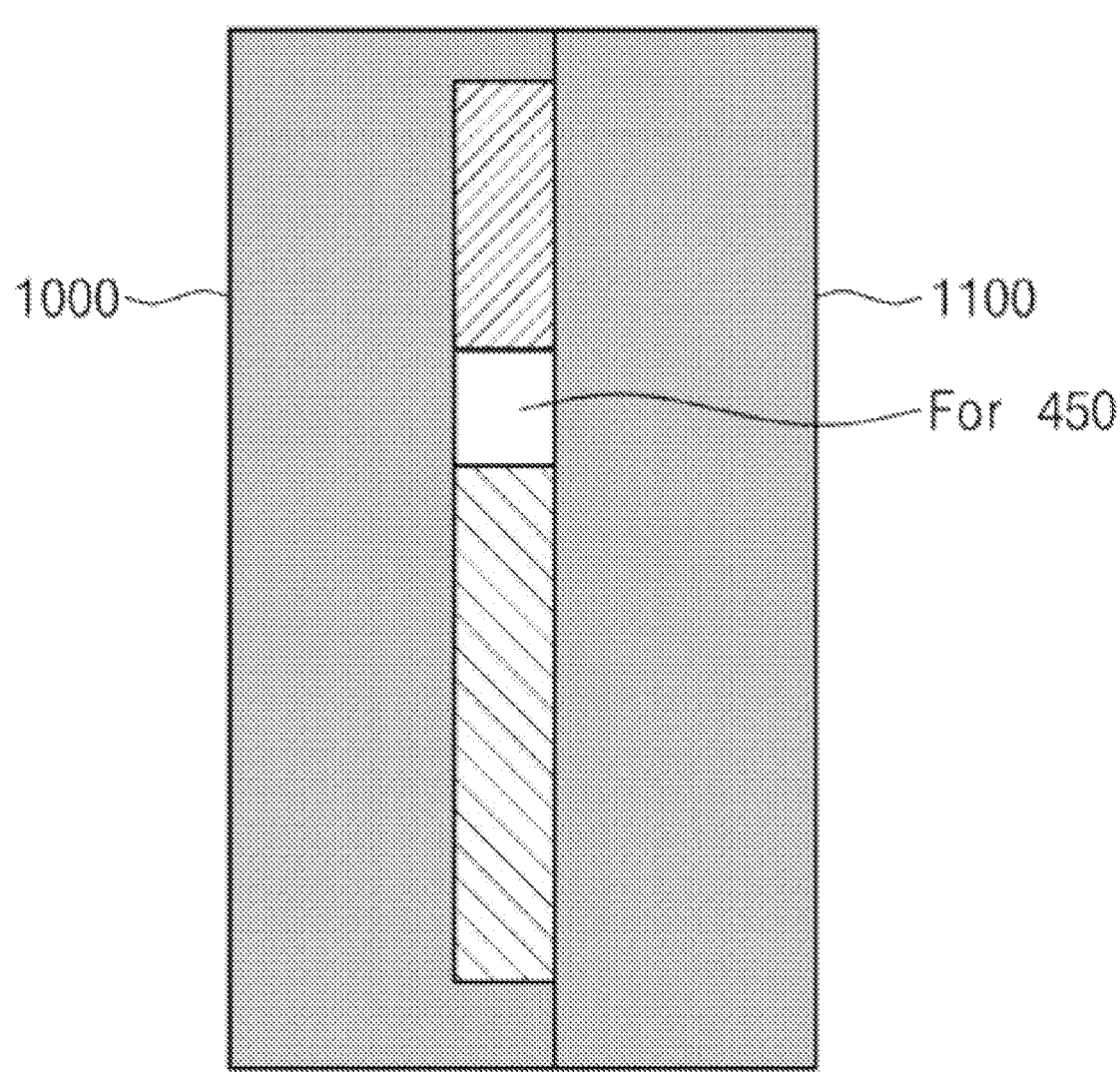
1000
1100
For 450

[FIG. 24]
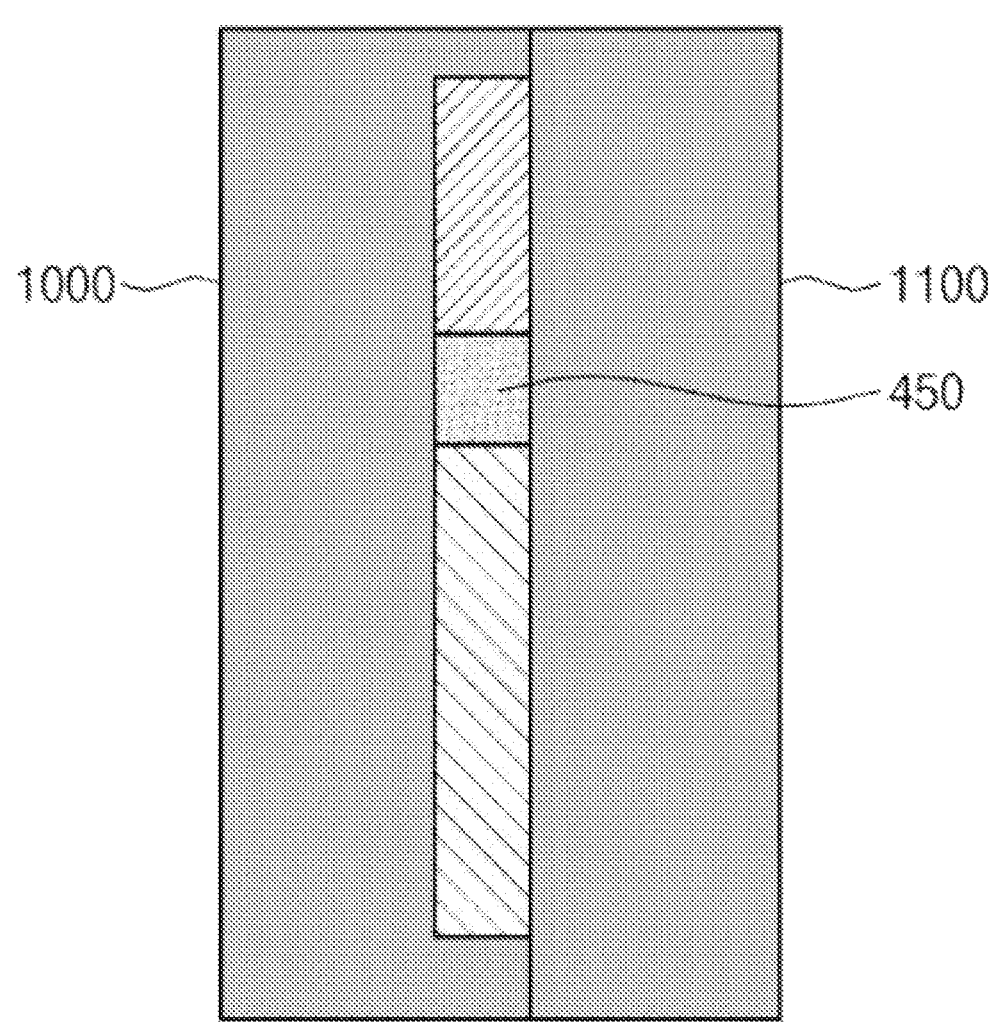

[FIG. 25]
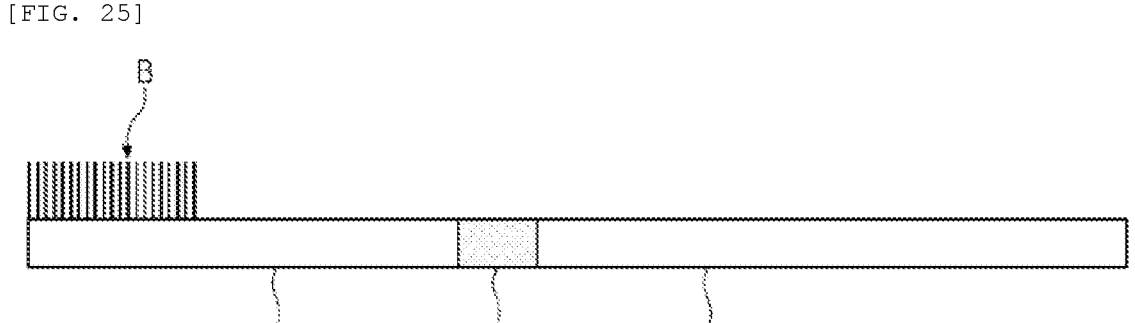
410  450  420

[FIG. 26]
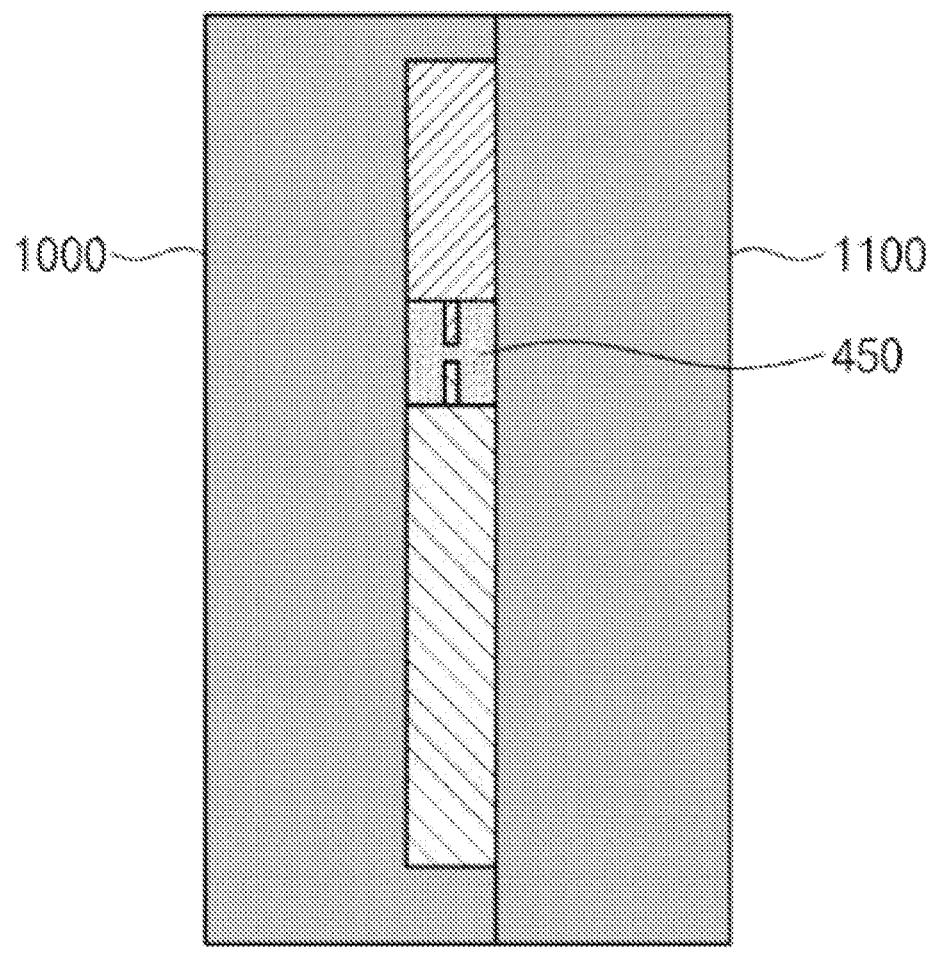

[FIG. 27]
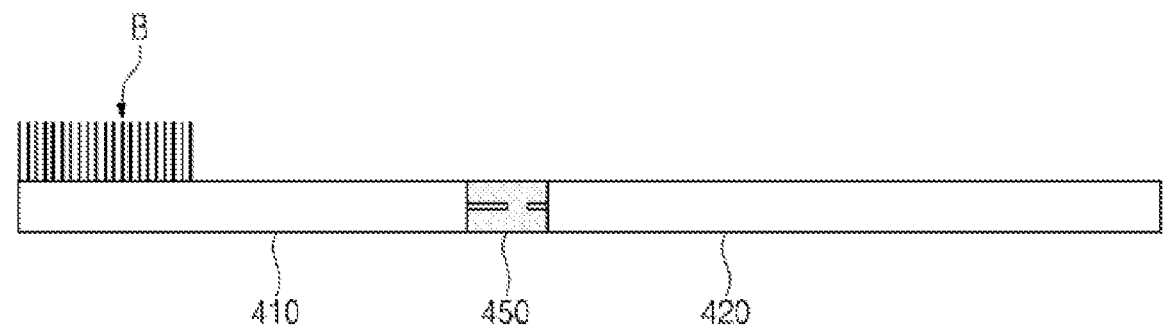
[FIG. 28]
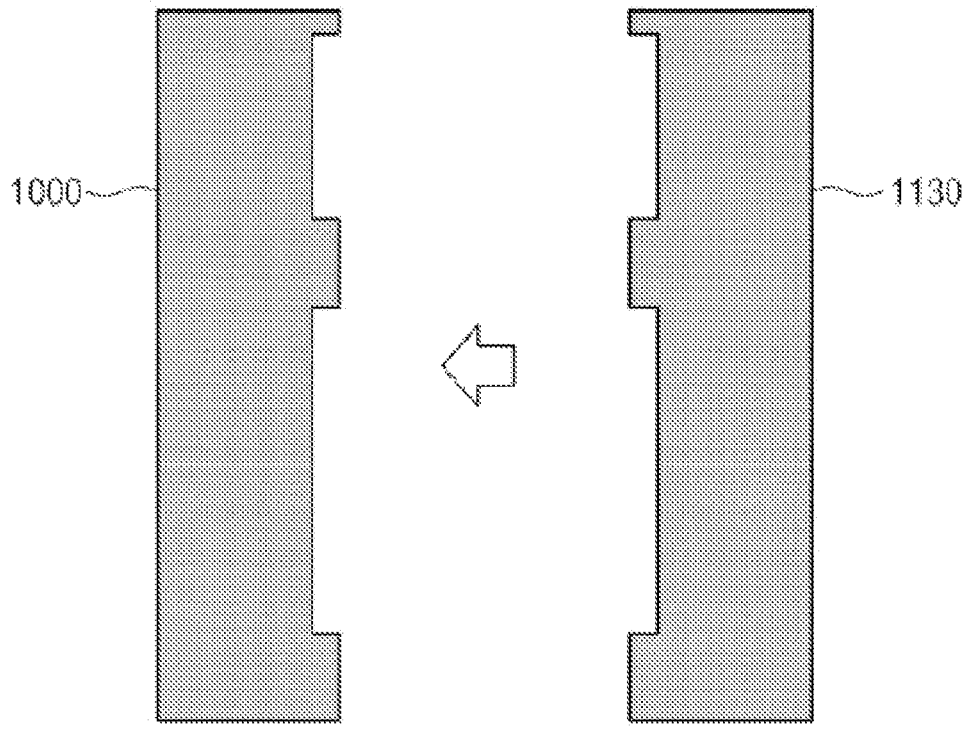

[FIG. 29]
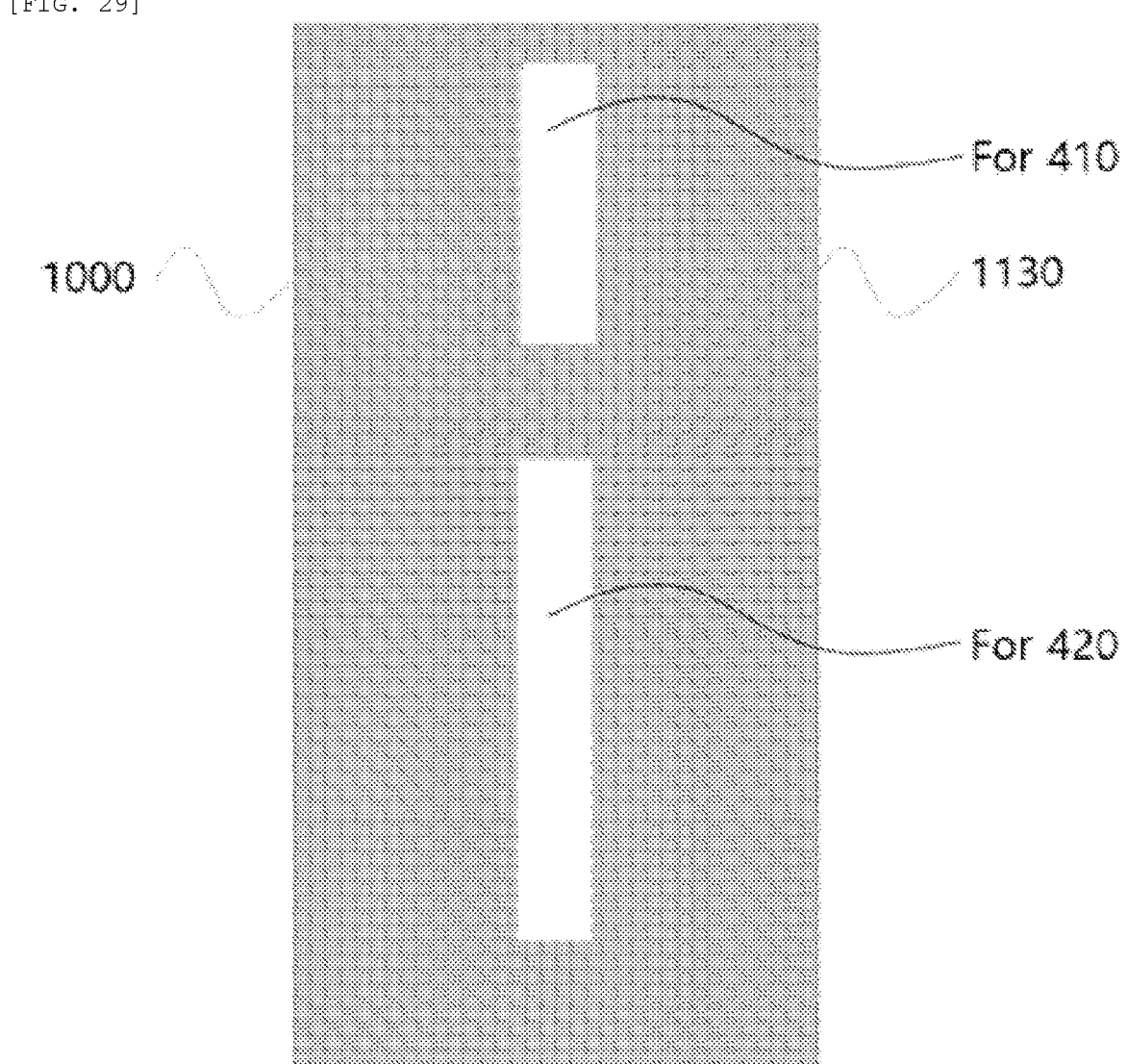

[FIG. 30]
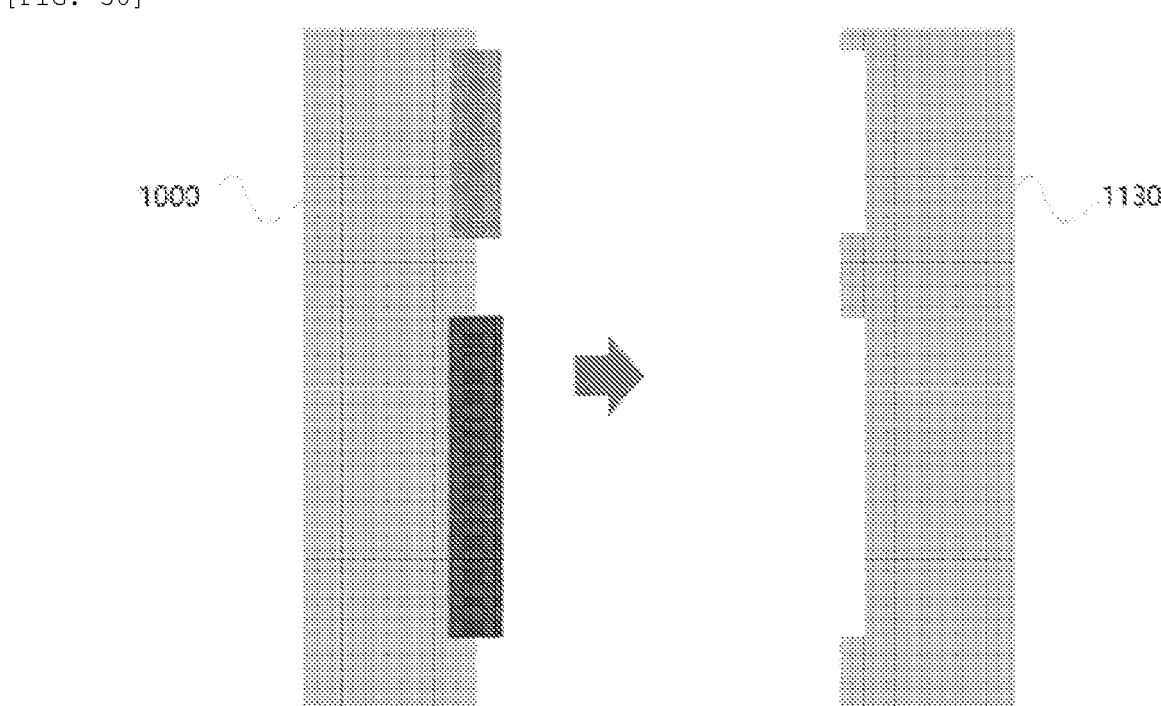

[FIG. 31]
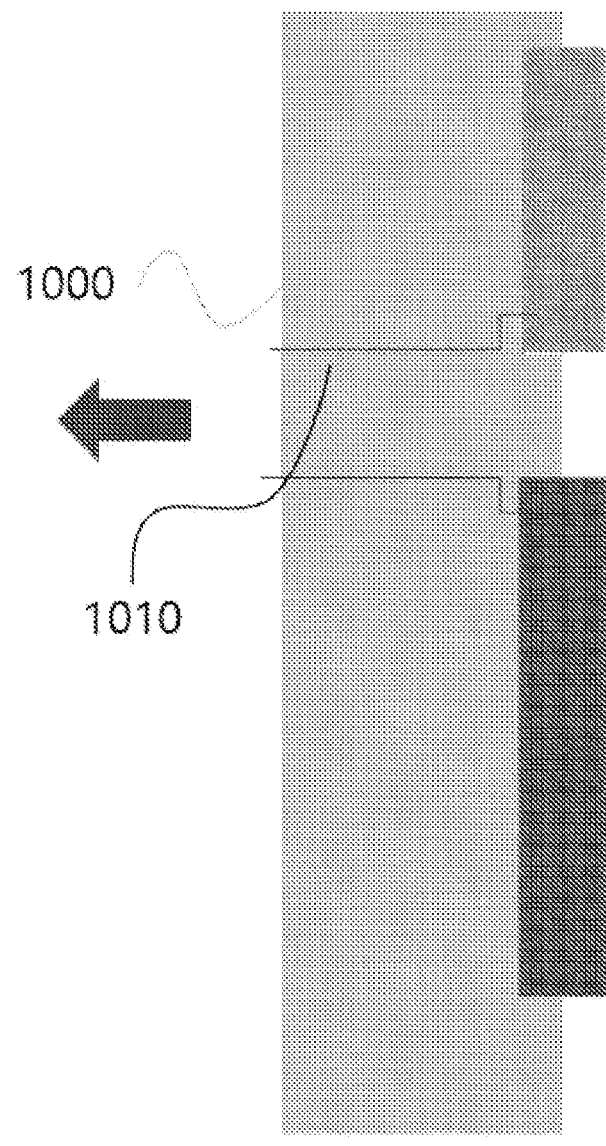

[FIG. 32]
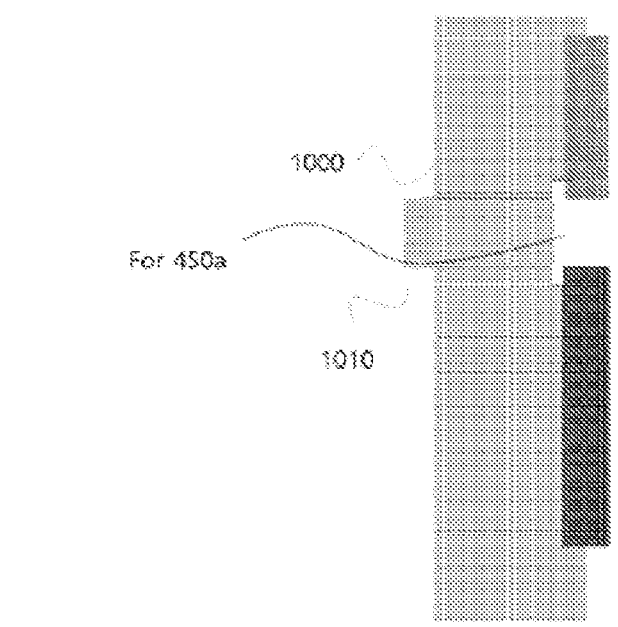
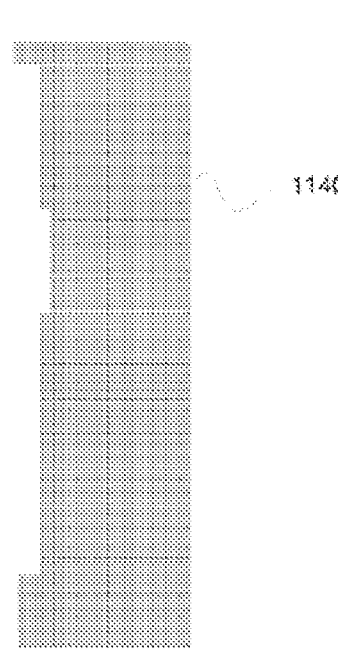

[FIG. 33]
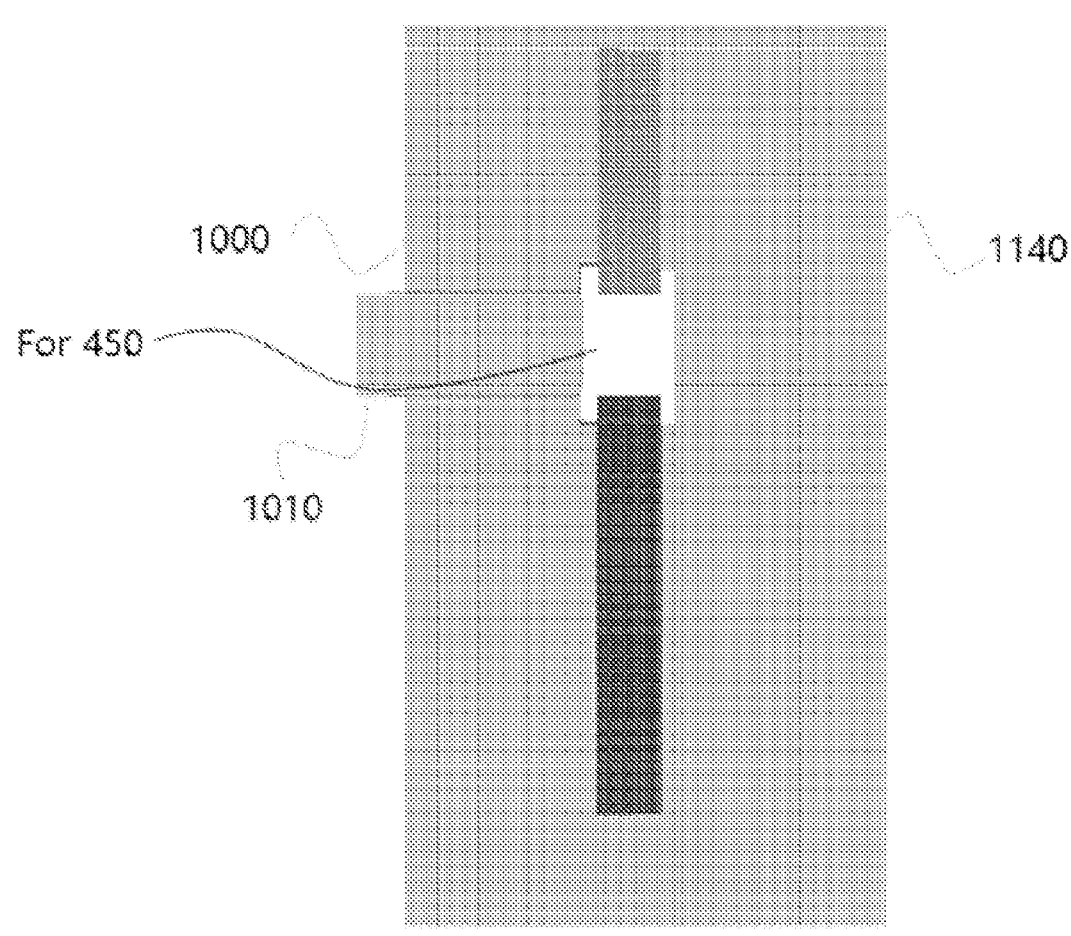

[FIG. 34]
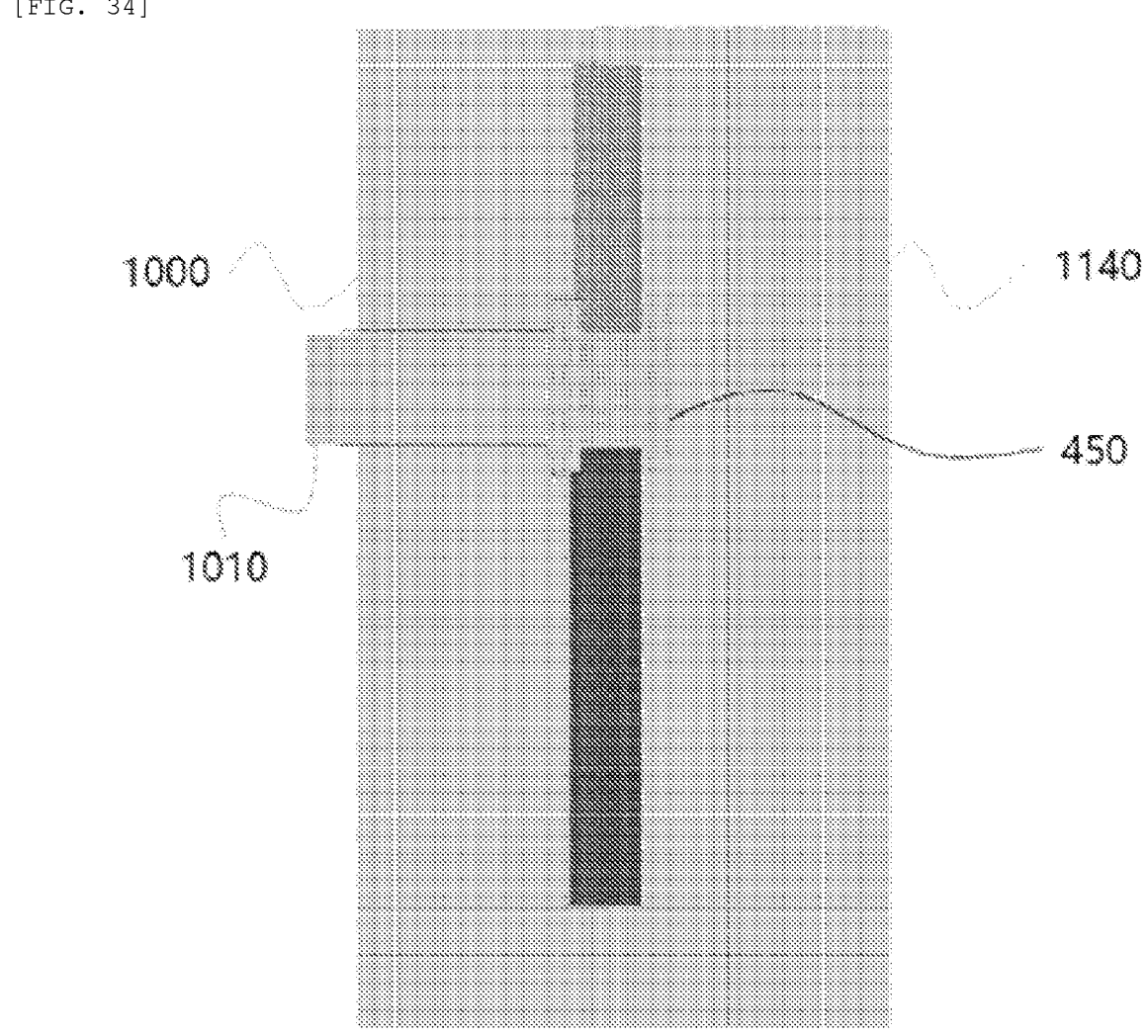

[FIG. 35]
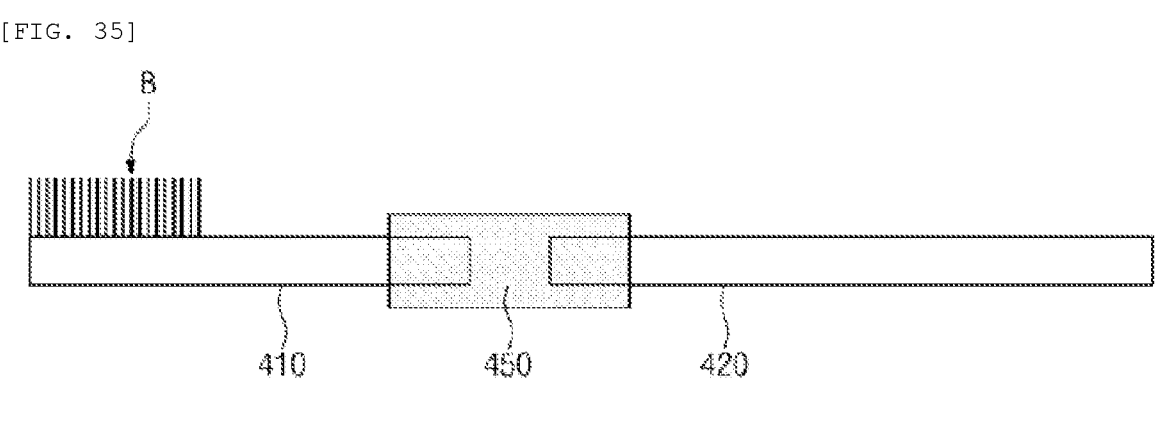
410 450 420
[FIG. 36A] [FIG. 36B] [FIG. 36C]
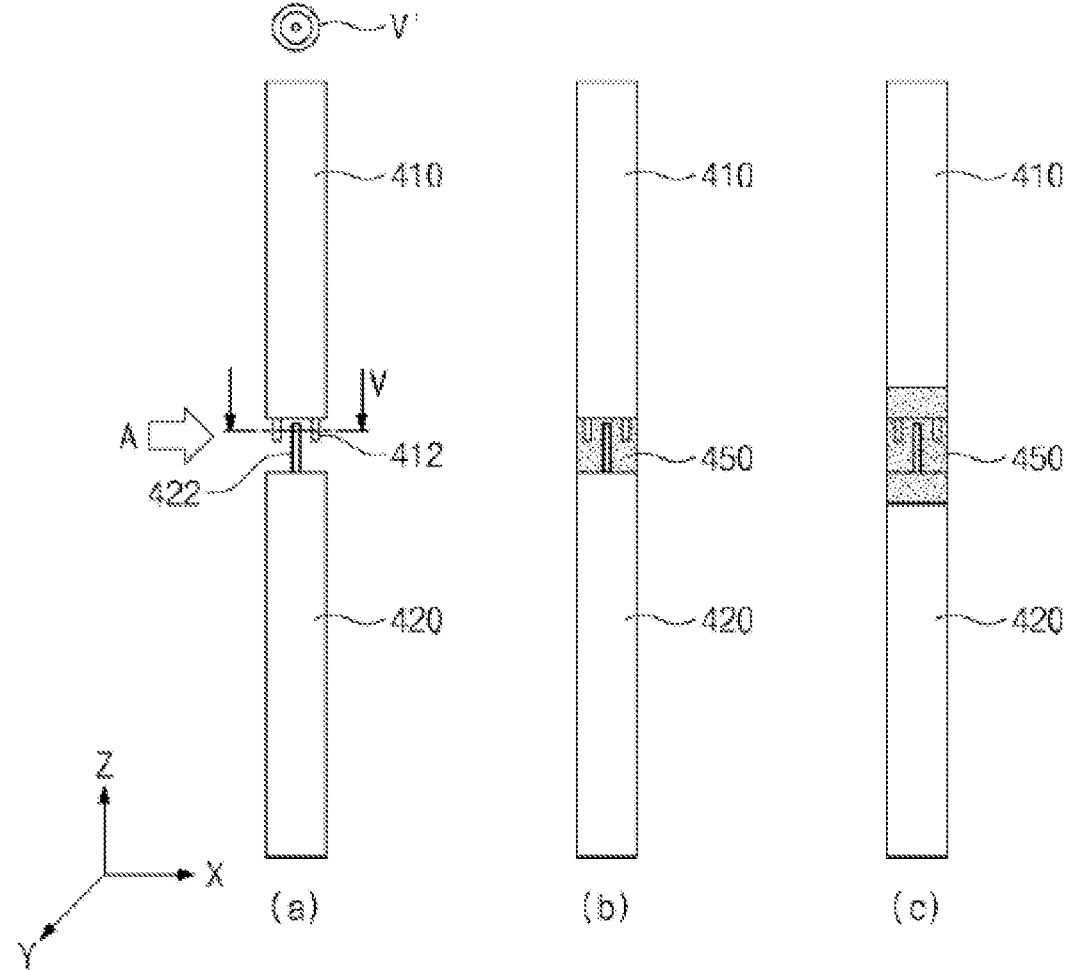
(a) (b) (c)

[FIG. 37]
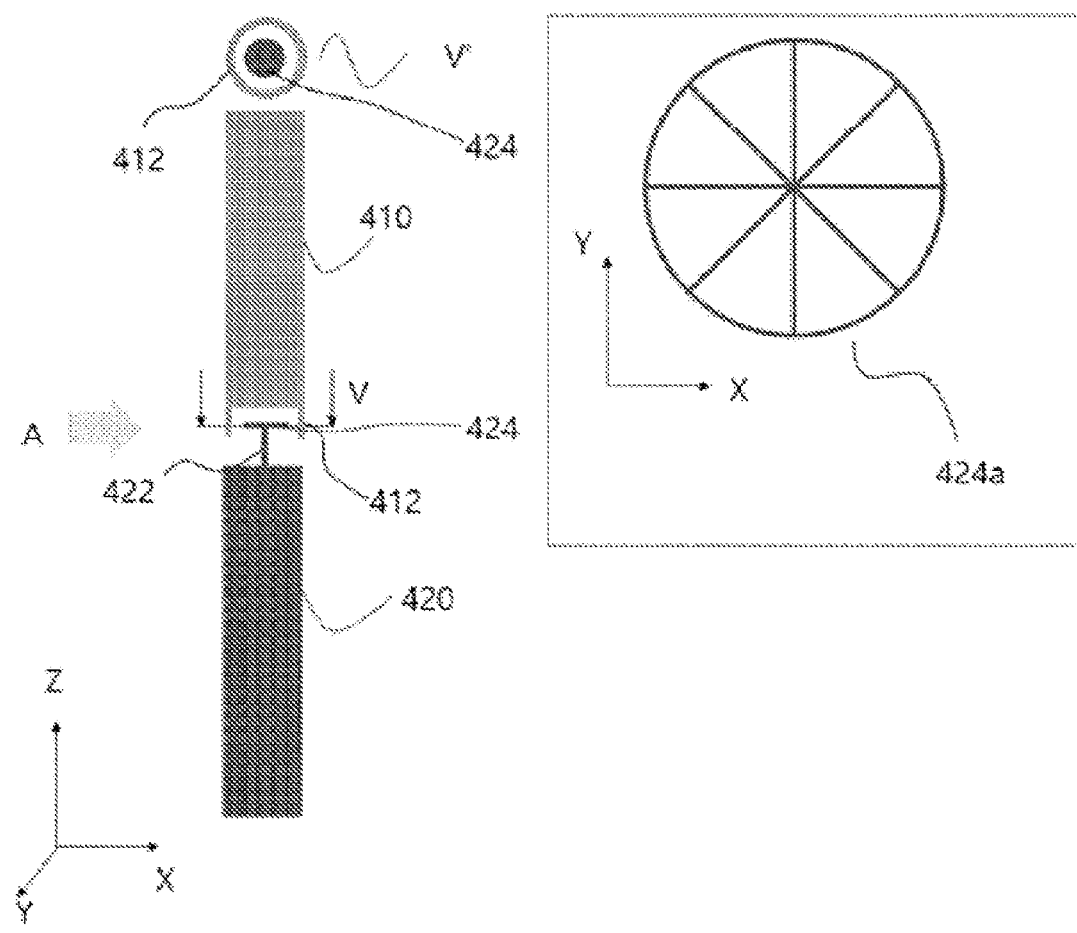

[FIG. 38]
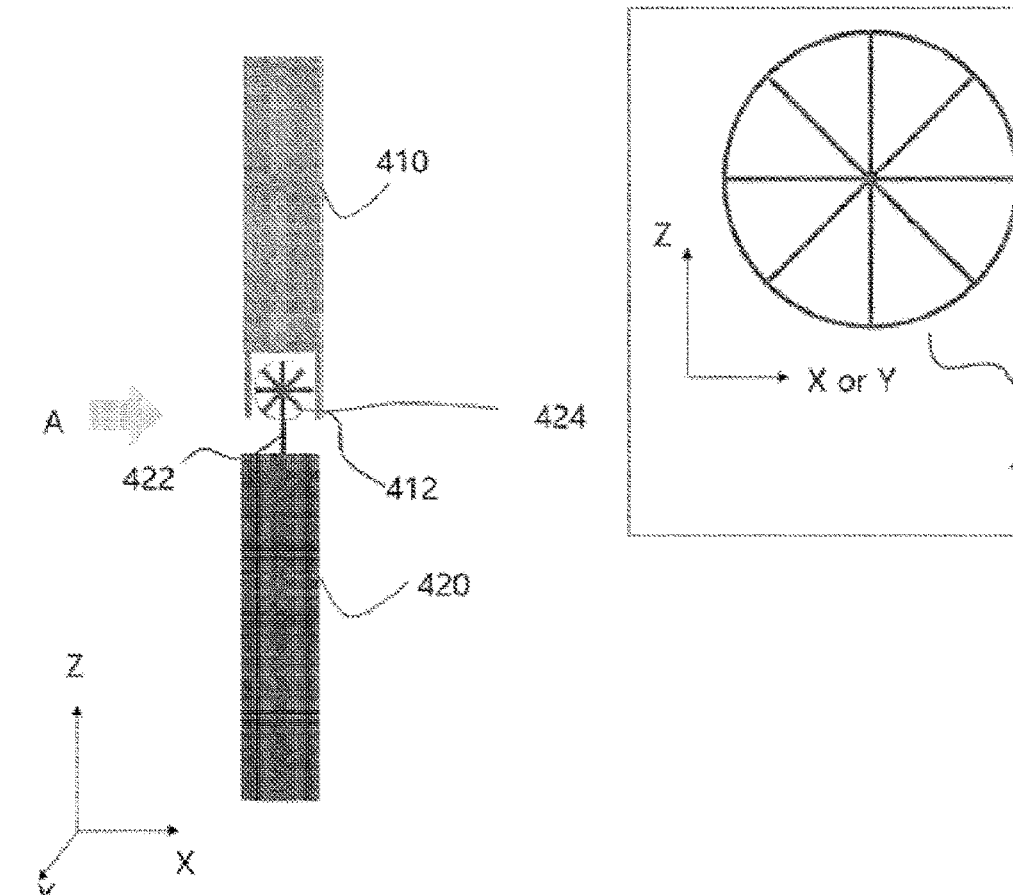

[FIG. 39]
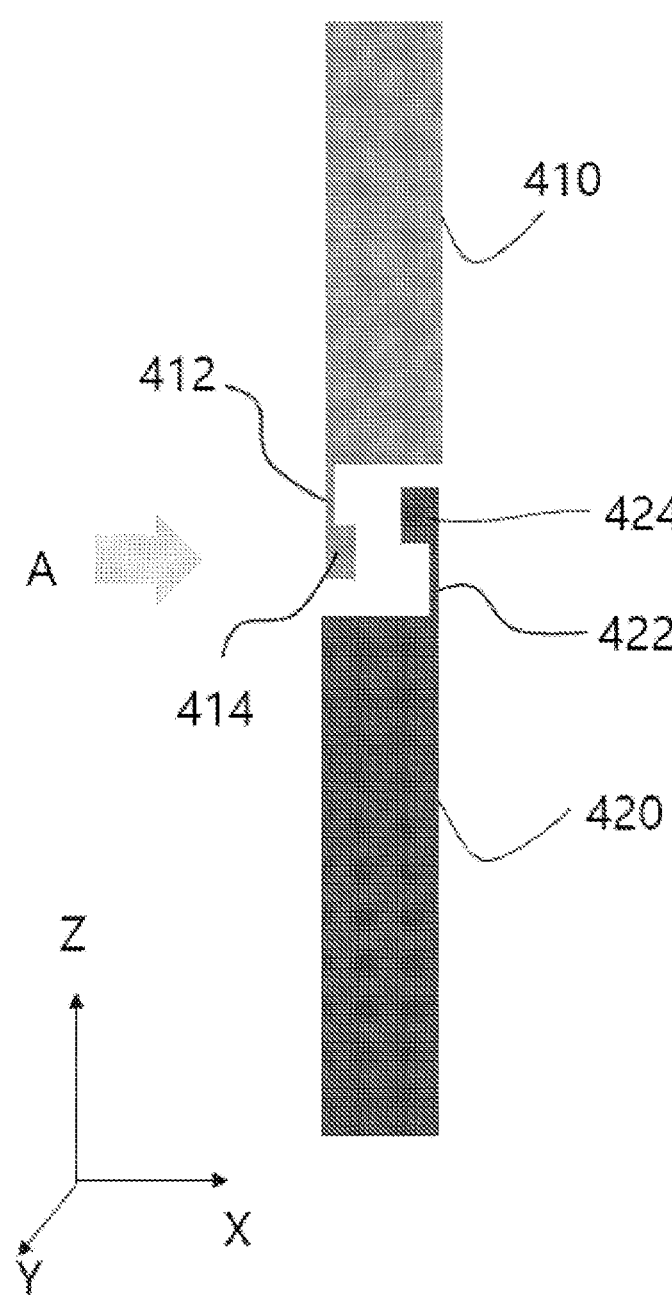

[FIG. 40]
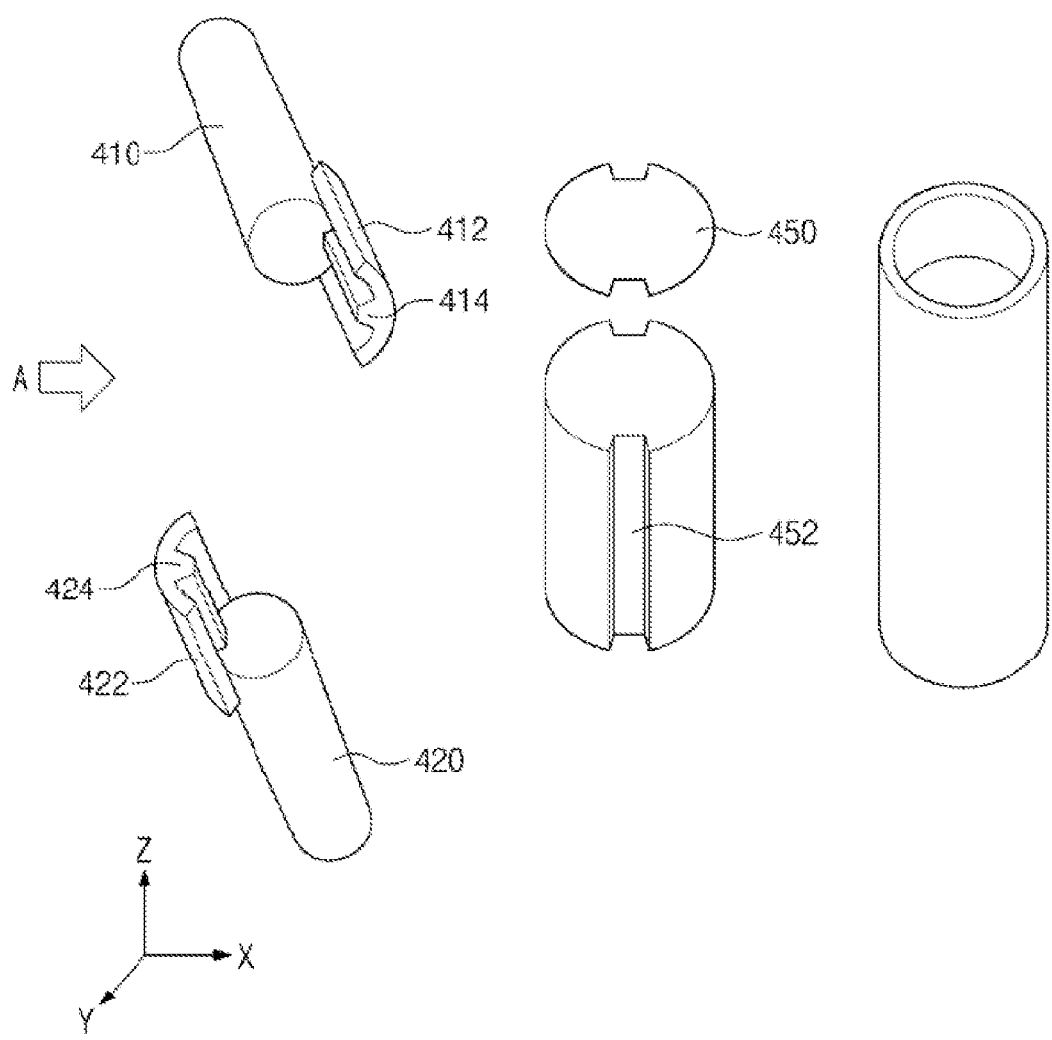

[FIG. 41A]
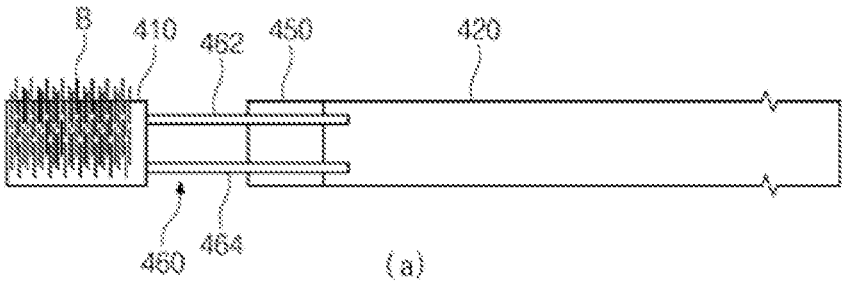
(a)
[FIG. 41B]
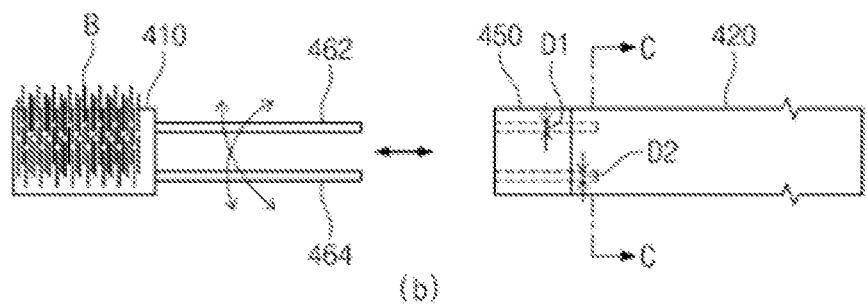
(b)
[FIG. 41C]
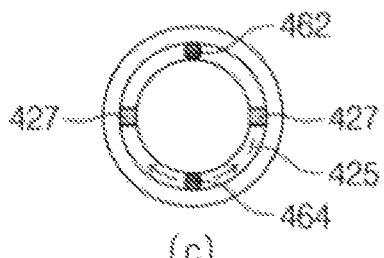
(c)
[FIG. 41D]
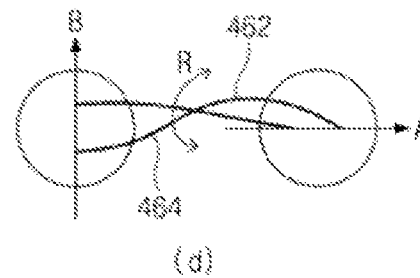
(d)

[FIG. 42A]
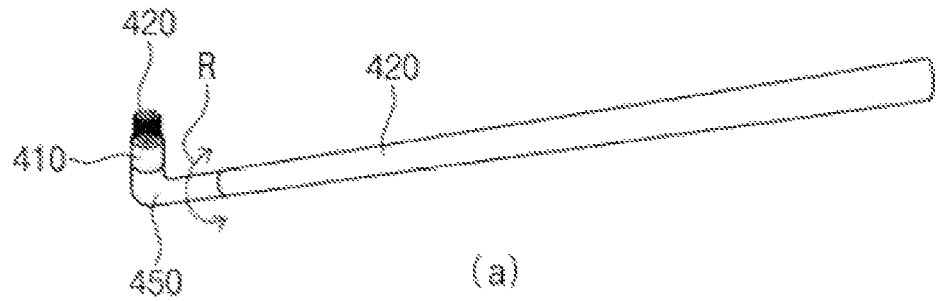
(a)
[FIG. 42B]
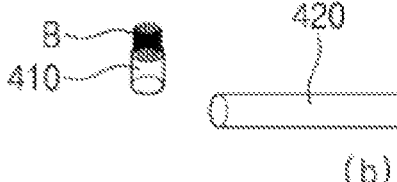
(b)
[FIG. 42C]
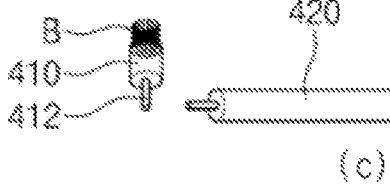
(c)
[FIG. 42D]
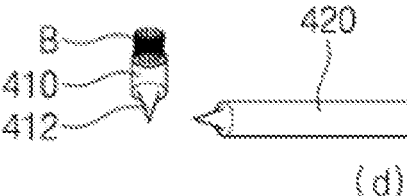
(d)
[FIG. 42E]
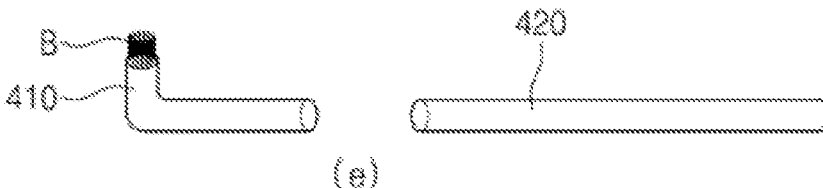
(e)

[FIG. 43A]
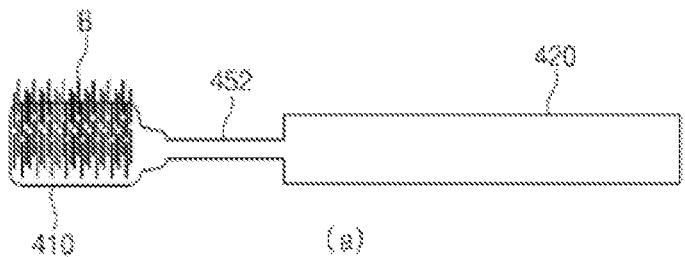
(a)
[FIG. 43B]
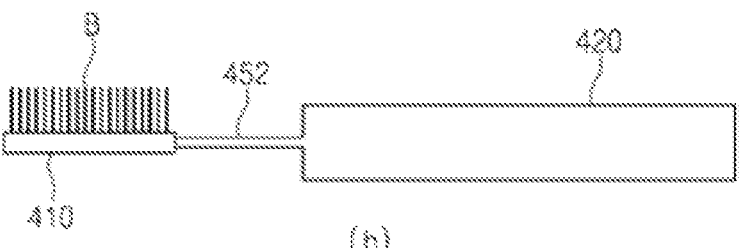
(b)
[FIG. 43C]
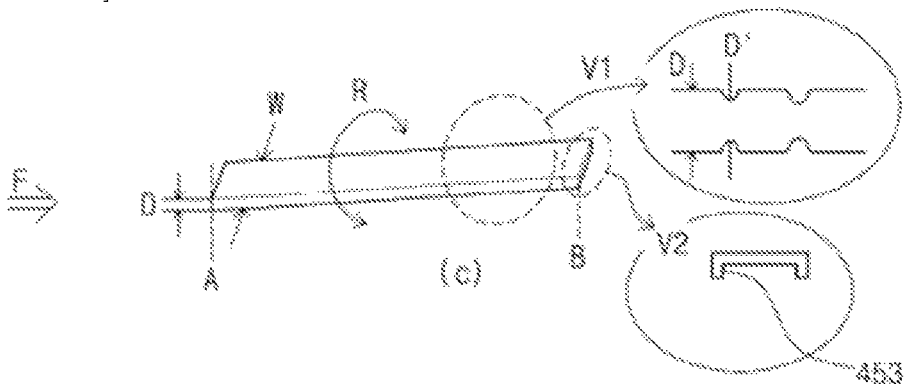
(c)
[FIG. 43D]
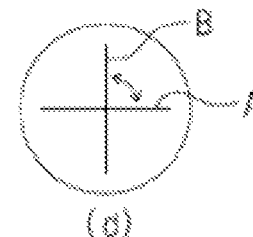
(d)

[FIG. 43E]
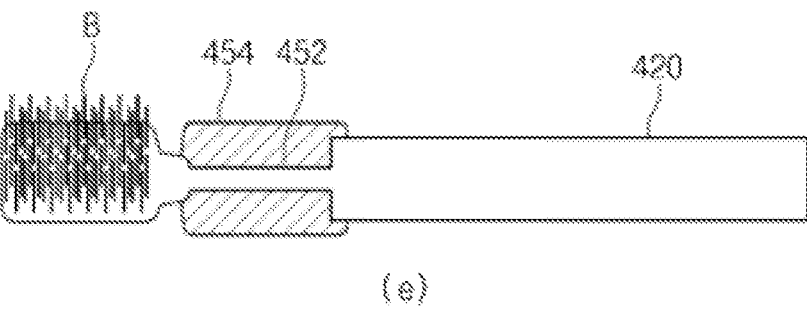
(e)

[FIG. 44]
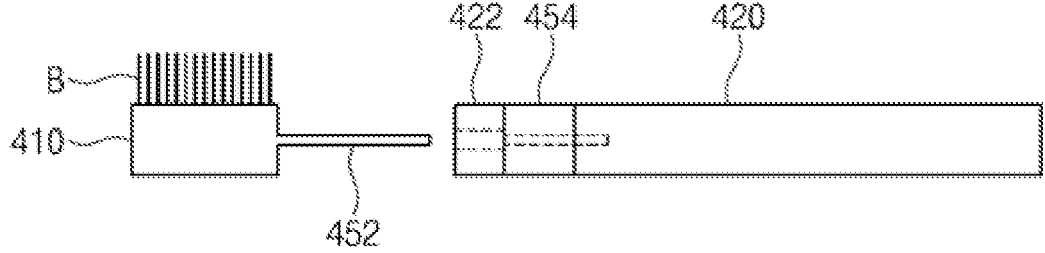
[FIG. 45]
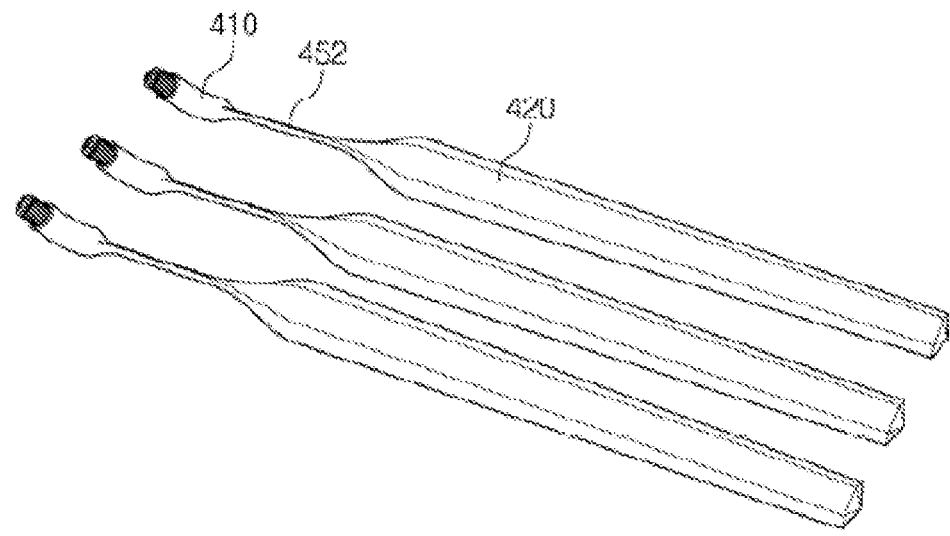

[FIG. 46A]
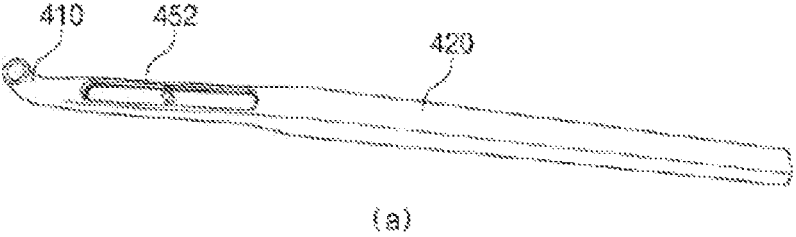
(a)
[FIG. 46B]
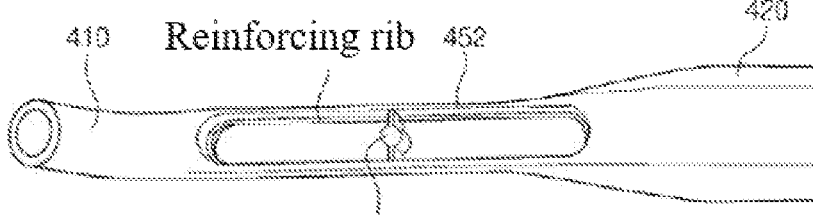
(b)

[FIG. 47A]
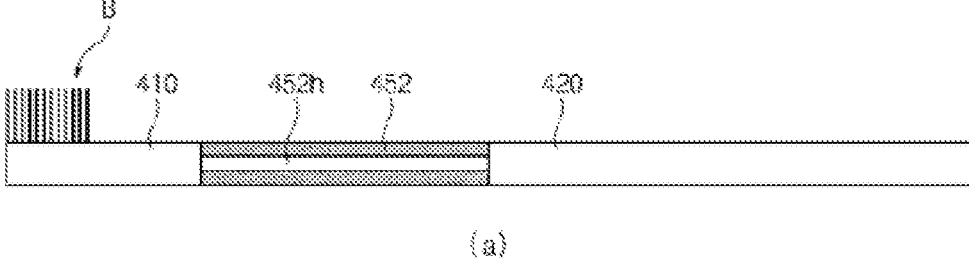
(a)
[FIG. 47B]
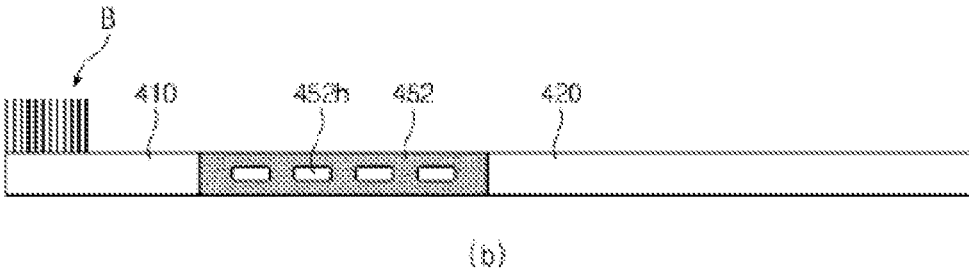
(b)
[FIG. 48]
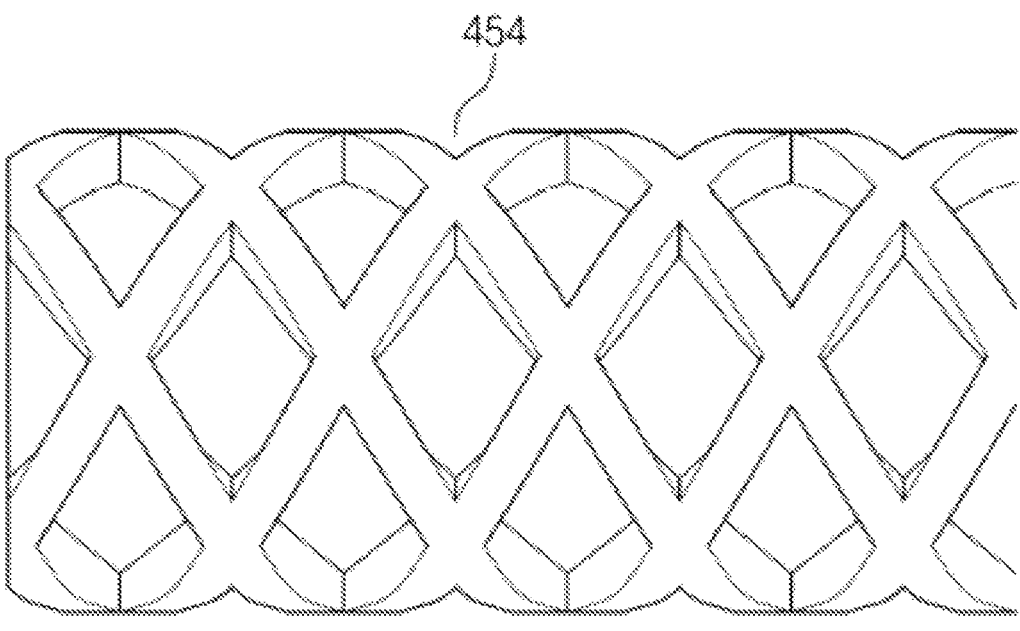

[FIG. 49A]
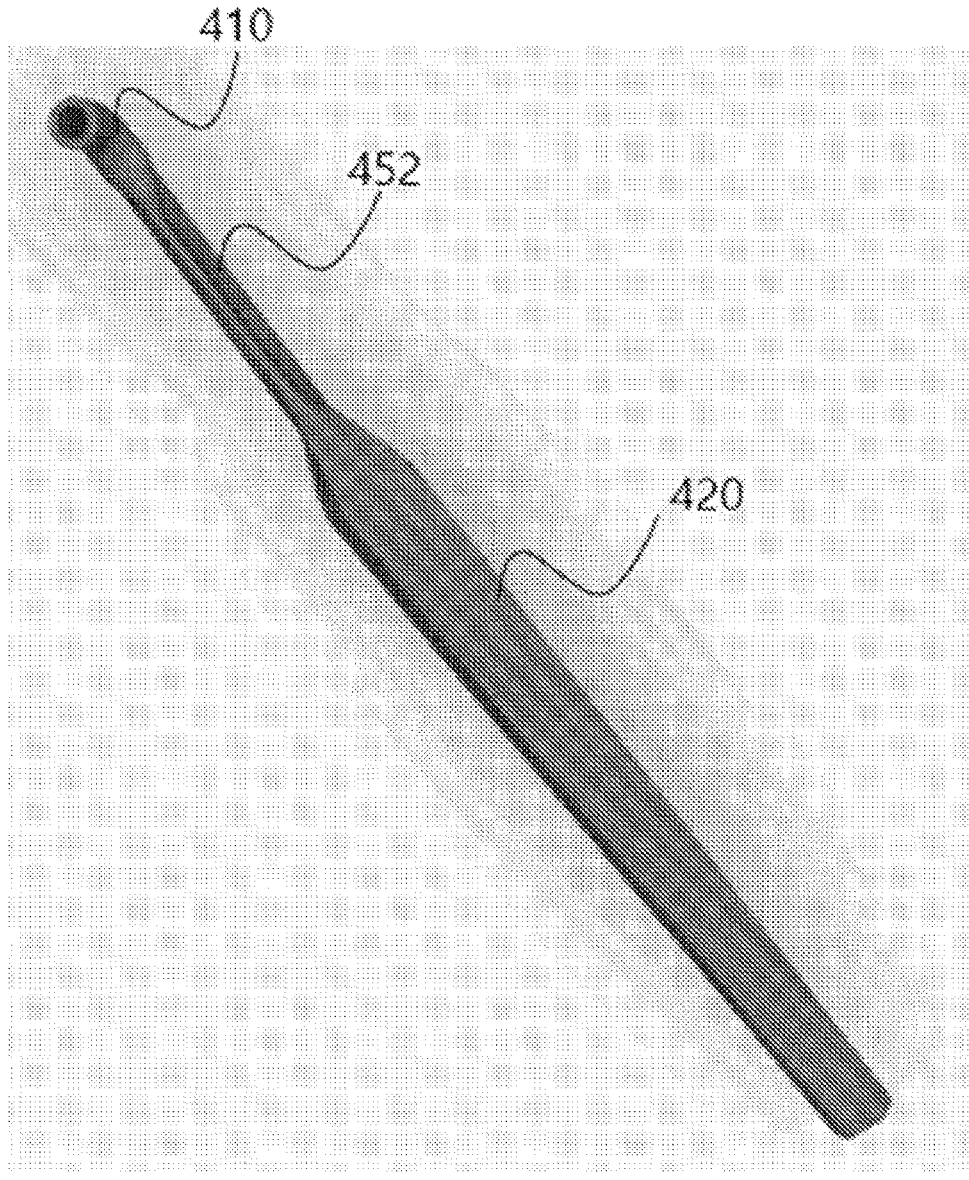

[FIG. 49B(a)]  [FIG. 49B(b)]
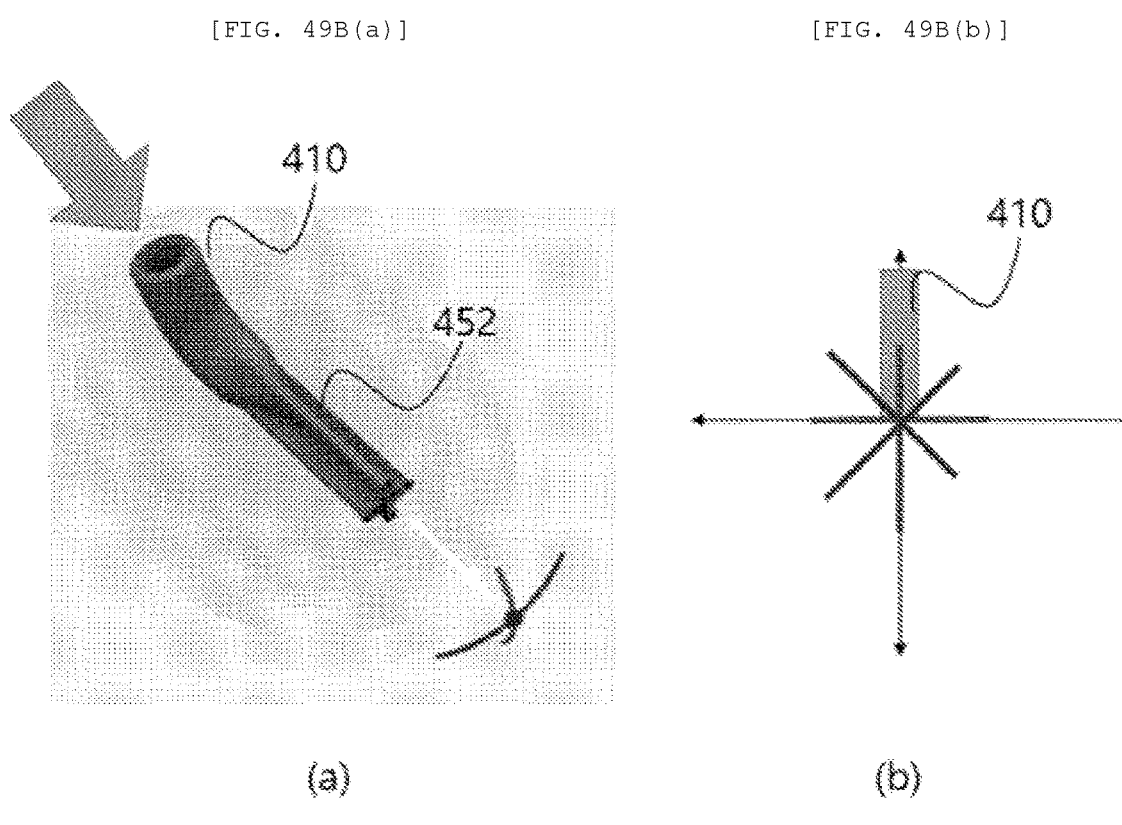
(a)  (b)
[FIG. 50]
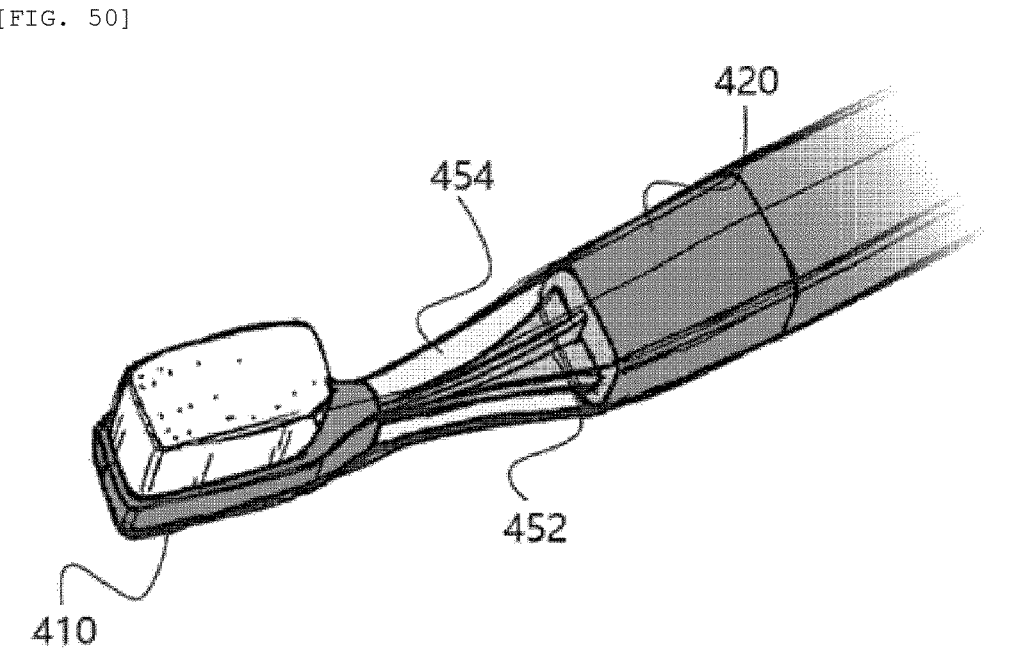

[FIG. 51]
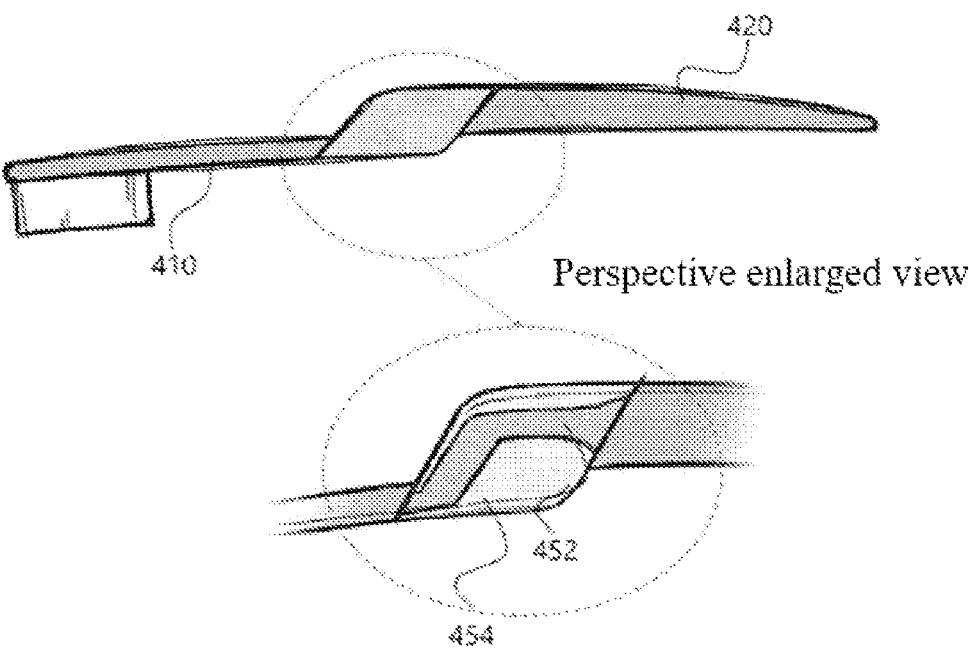
Perspective enlarged view
[FIG. 52]
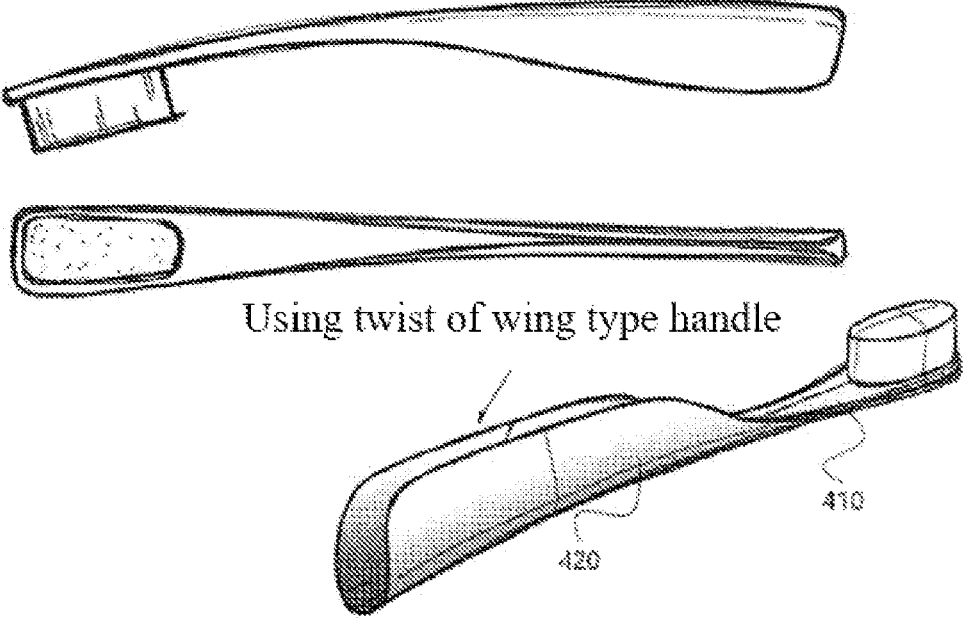
Using twist of wing type handle

[FIG. 53]
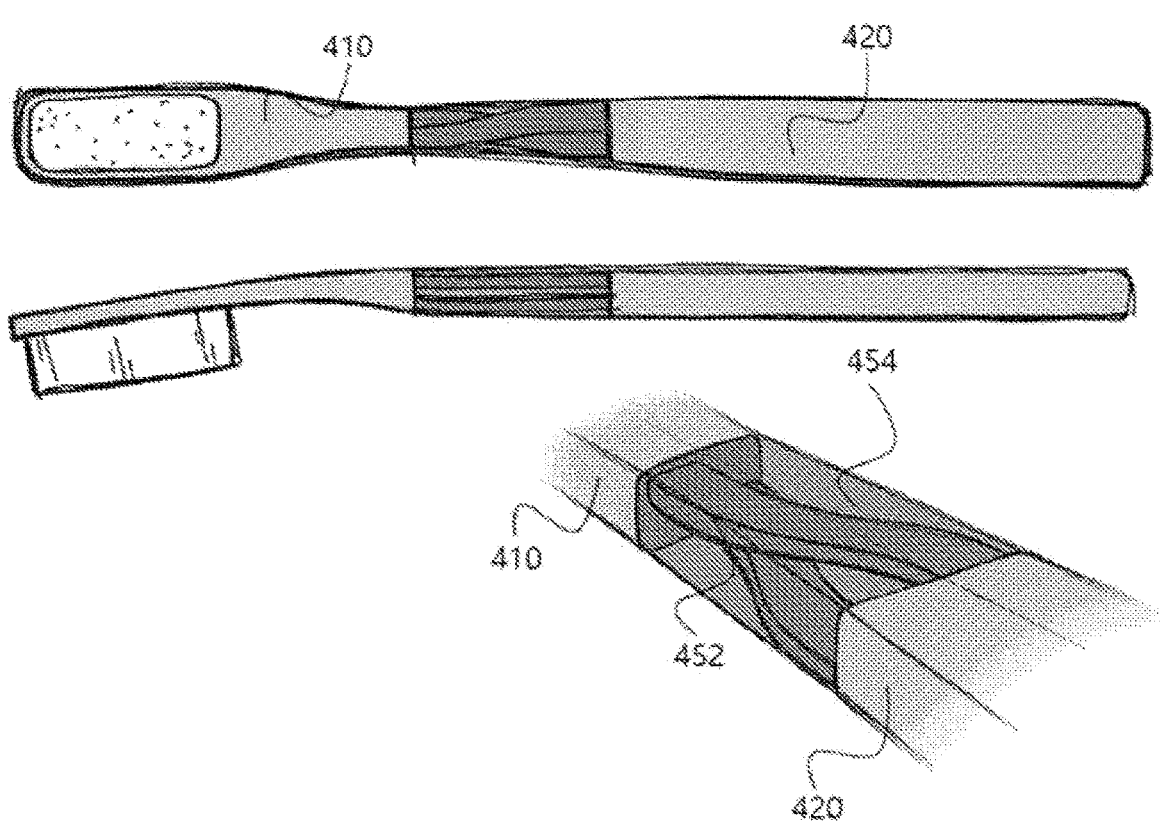

[FIG. 54]
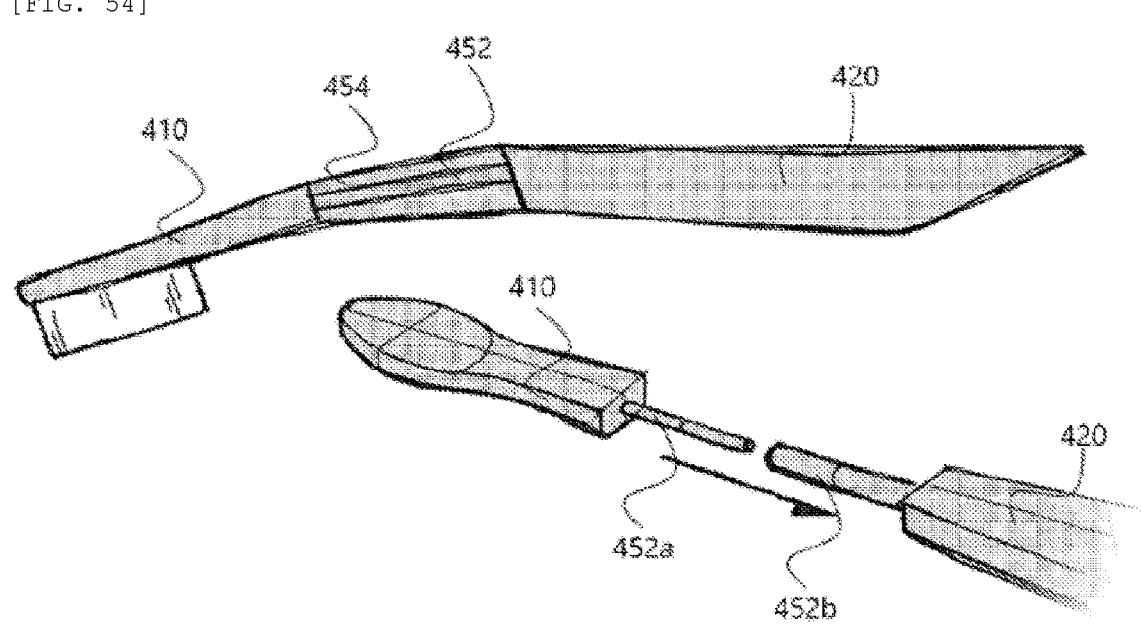

[FIG. 55]
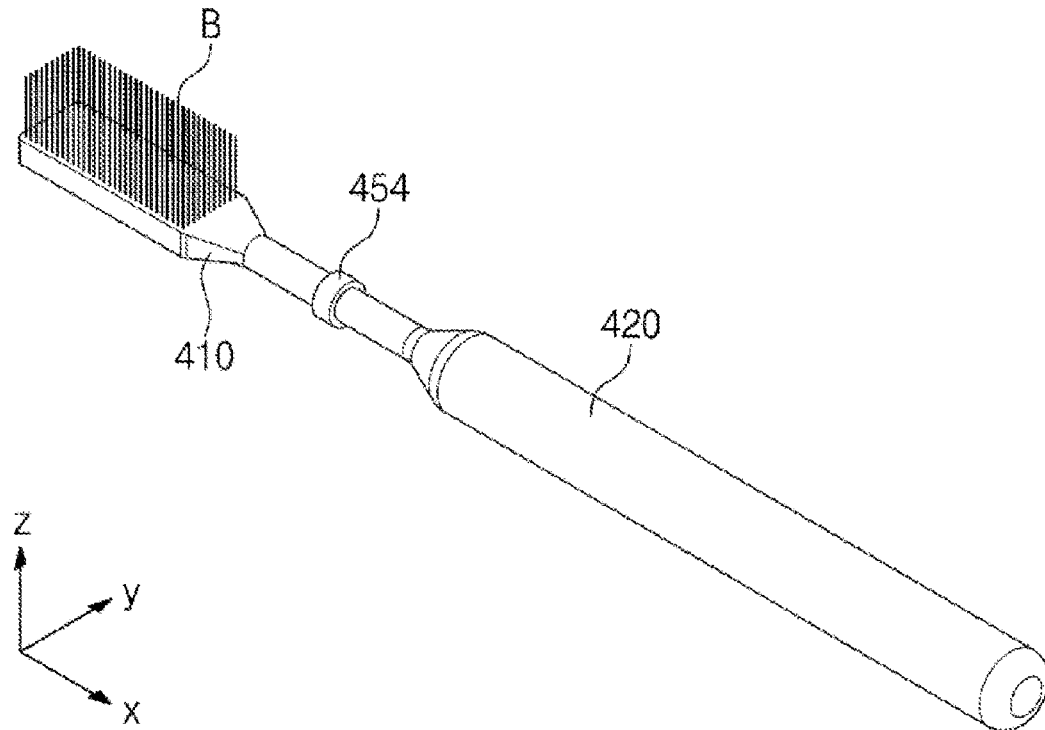

[FIG. 56]
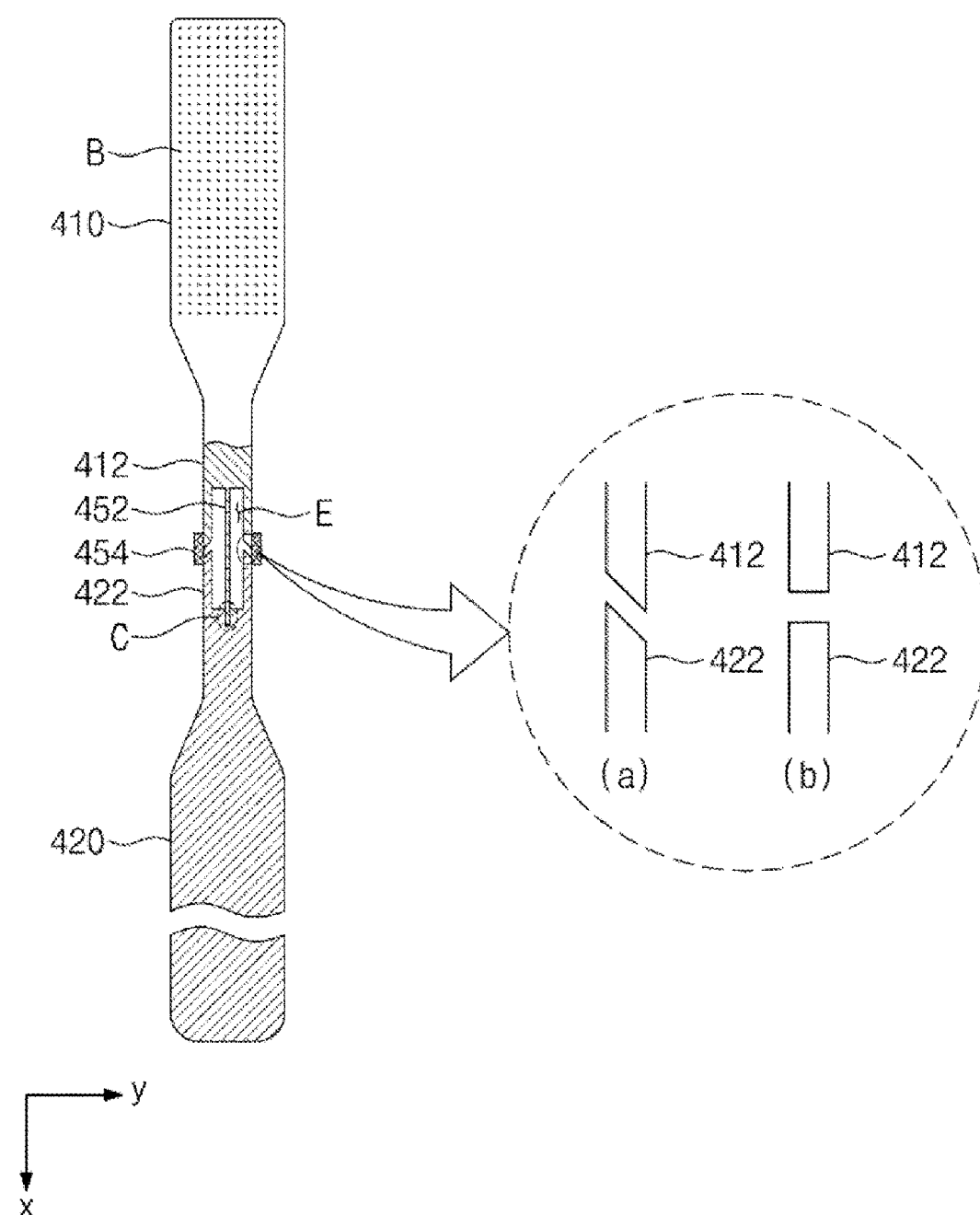

[FIG. 57]
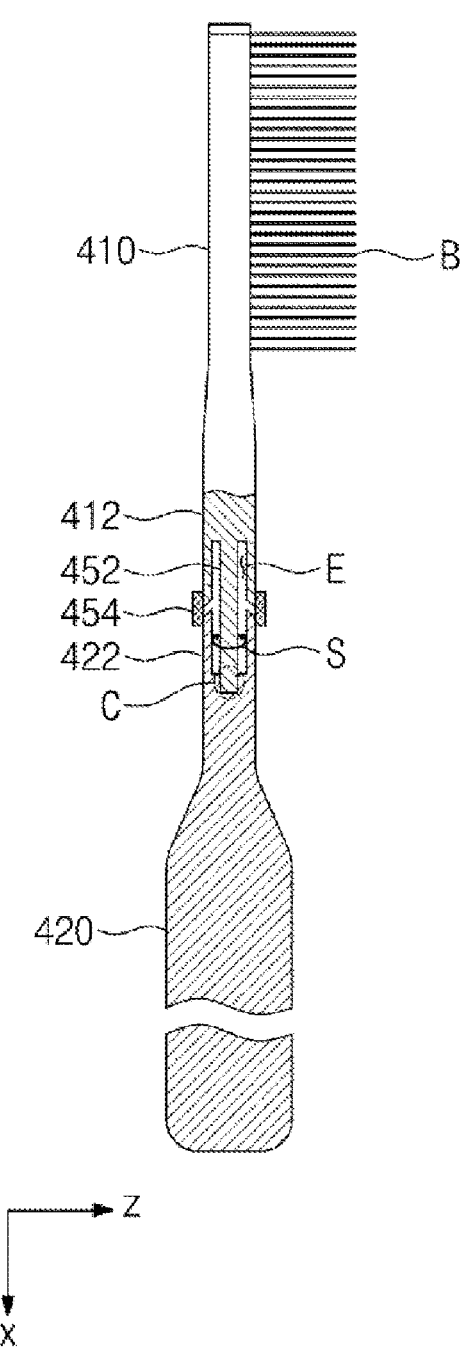

[FIG. 58]
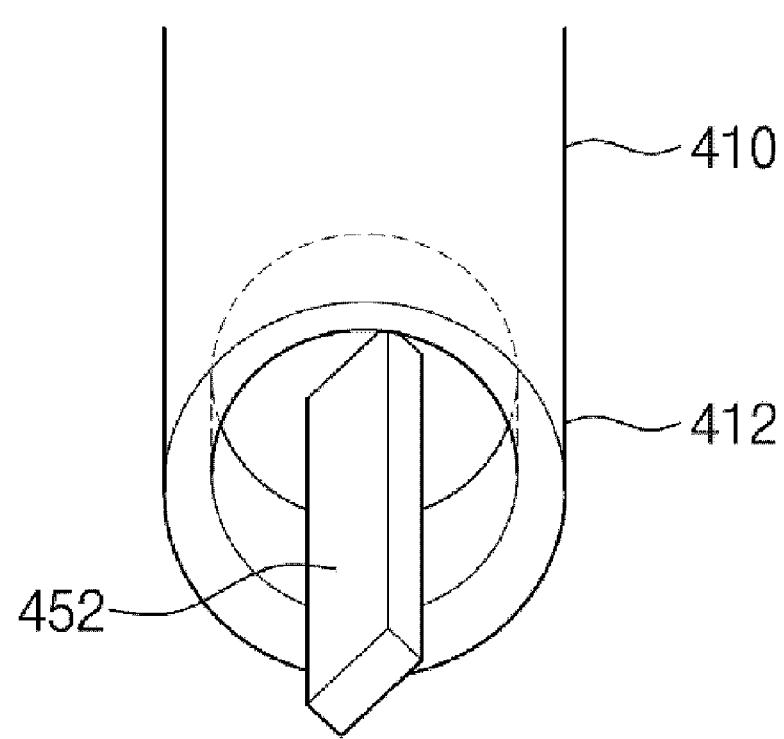

[FIG. 59]
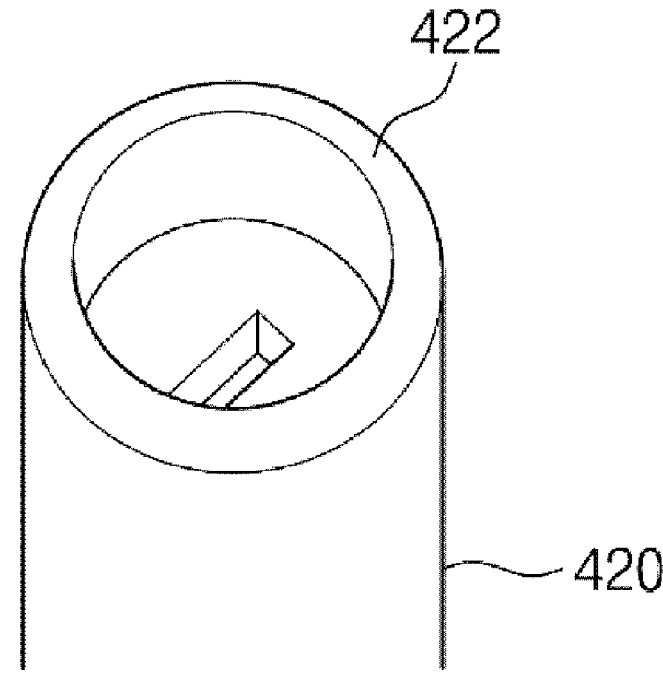

[FIG. 60]
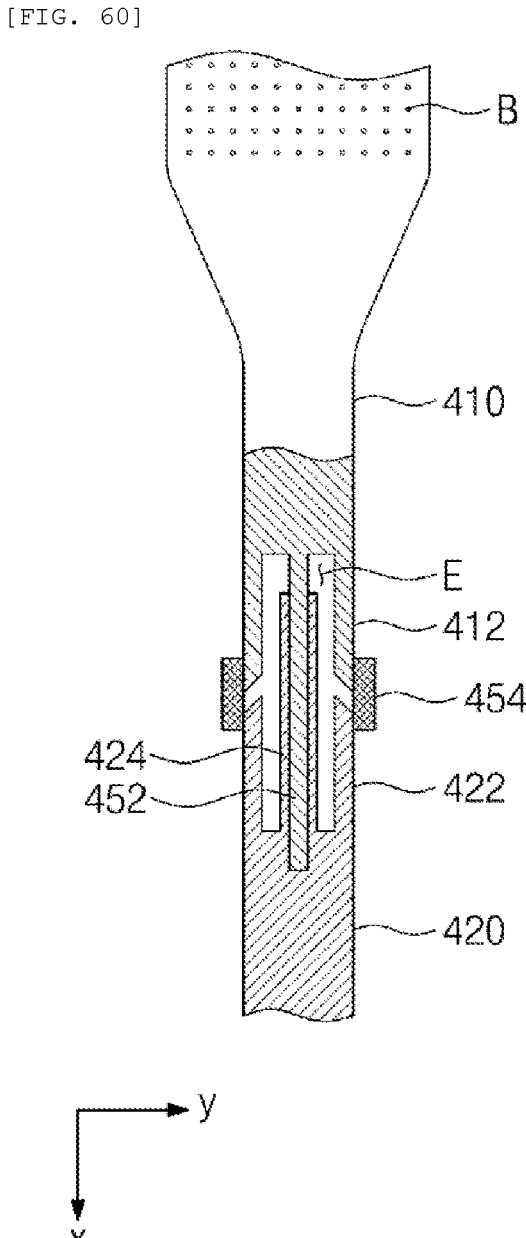

[FIG. 61]
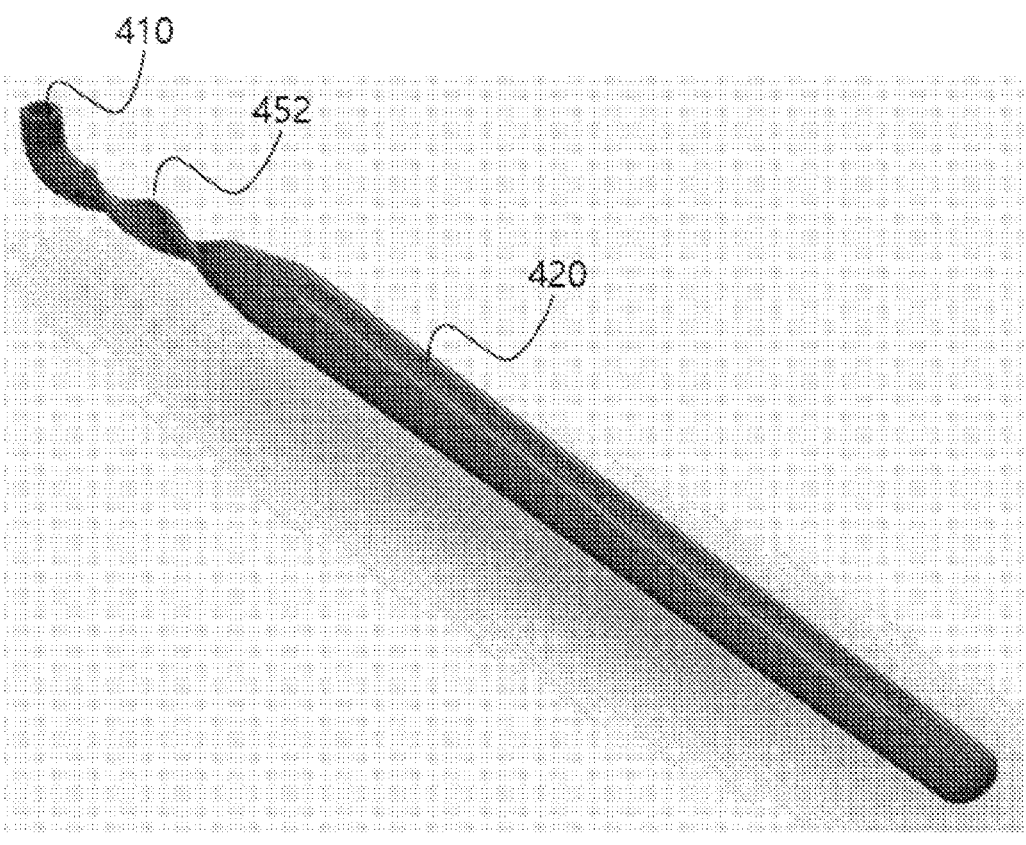

1

BRUSHING GUIDE ELASTIC TOOTHBRUSH AND ELASTIC RESTORATION MECHANISM

CROSS-REFERENCE TO RELATED APPLICATIONS

This application is a Continuation of Application No. PCT/KR2022/016007 filed on Oct. 20, 2022, which in turn claims the benefit of Korean Patent Application Nos. 10-2021-0139929, 20-2021-0003468, 10-2021-0185557, 20-2022-0000118, 20-2022-0000284, 20-2022-0000567, 20-2022-0000619, 20-2022-0000955, 20-2022-0001047, 20-2022-0001425, 20-2022-0001831, 10-2022-0115268, and 10-2022-0127845, filed on Oct. 20, 2021, Nov. 16, 2021, Dec. 23, 2021, Jan. 14, 2022, Jan. 25, 2022, Mar. 4, 2022, Mar. 11, 2022, Apr. 20, 2022, Apr. 28, 2022, Jun. 13, 2022, Jul. 28, 2022, Sep. 14, 2022, and Oct. 6, 2022, respectively. The entire disclosures of all these applications are hereby incorporated by reference.

TECHNICAL FIELD

The present invention relates to a brushing guide elastic toothbrush, and more specifically, to a brushing guide elastic toothbrush which guides an easy rotation method while brushing.

The present invention relates to an elastic restoration mechanism, and more specifically, to a mechanism which provides elastic twisting and elastic restoring force with respect to a longitudinal direction.

BACKGROUND

A rotation method while brushing refers to a method of brushing from gums to teeth while rotating a wrist holding a toothbrush.

More specifically, the rotation method refers to a method of holding the toothbrush to face the gums and rotating the wrist to brush upper teeth in a downward direction and lower teeth in an upward direction.

However, the rotation method of brushing was difficult to use in actual brushing due to difficulty of a brushing motion.

DISCLOSURE

Technical Problem

One technical object of the present invention is to provide a brushing guide elastic toothbrush which guides an easy rotation method while brushing.

Another technical object of the present invention is to provide a brushing guide elastic toothbrush which may arouse a child's interest in brushing.

Another technical object of the present invention is to provide an elastic restoration mechanism.

The technical objects of the present invention are not limited to the above.

Technical Solution

An elastic restoration mechanism and a toothbrush applied thereto according to one embodiment of invention may include: a toothbrush head having bristles provided on the outer circumferential surface of one side in the longitudinal direction; a toothbrush handle connected to the rear end of the toothbrush head in the longitudinal direction and extending in one direction such that a user can hold the toothbrush handle by hand; and an elastic rotation restoring part provided between the toothbrush head and the toothbrush handle and allowing rotation of the toothbrush handle and rotation of the toothbrush head based on the rotation of the toothbrush handle. When force is applied to the toothbrush handle by the user such that the toothbrush handle rotates in one direction with respect to the longitudinal direction while the bristles are pressed and in close contact with the user's teeth or gums, the elastic rotation restoring part allows the rotation of the toothbrush handle and stores a rotational force generated by the toothbrush handle, and when the pressure contact of the bristles is released from the user's teeth or gums while a rotational force generated by the toothbrush handle is stored in the elastic rotation restoring part, the elastic rotation restoring part may release the stored torsional energy as a rotational force to the toothbrush head such that the teeth or gums can be cleaned by the bristles while the toothbrush head rotates in the same direction as the toothbrush handle.

According to one embodiment, in a case where a force is applied to the toothbrush handle by the user such that the toothbrush handle may rotate clockwise around a longitudinal direction and in a case where a force is applied to the toothbrush handle by the user such that the toothbrush handle may rotate counterclockwise around the longitudinal direction, the elastic rotation restoring part may provide a restoring rotational force corresponding to each other.

According to one embodiment, an elastic rotation allowing part may have an elastic modulus less than that of at least one of the toothbrush head and the toothbrush handle.

According to one embodiment, the elastic rotation allowing part may have a strain rate against external force larger than that of at least one of the toothbrush head and the toothbrush handle.

According to one embodiment, the toothbrush head and the toothbrush handle may be spaced apart from each other along a longitudinal direction, and at least a portion of the elastic rotation allowing part may be located between the toothbrush head and the toothbrush handle.

According to one embodiment, the toothbrush head and the toothbrush handle may be separate components, and the toothbrush head and the toothbrush handle may be coupled to each other by the elastic rotation allowing part.

According to one embodiment, at least one of the toothbrush head and the toothbrush handle may have a protrusion protruding toward the other side. The protrusion may reduce a space between the toothbrush head and the toothbrush handle.

According to another embodiment, the elastic rotation restoring part may include at least two protrusions extending from the toothbrush head or the toothbrush handle. The protrusion may have a linear rod shape. According to one example, when a tooth brushing force is applied by the user, the torsional energy may be stored in a direction in which the linear rods intersect each other.

According to still another embodiment, the elastic rotation restoring part may have a thin plate-shaped thickness. According to one example, a restoring rotational force may be generated by a thin plate-shaped thickness. According to one example, there may be at least one elastic rotation restoring part. According to one example, the elastic rotation restoring part may be provided between one end of the toothbrush head and one end of the toothbrush handle, and integrally formed with the toothbrush head and the toothbrush handle. According to one example, the elastic rotation restoring part may be made of the same material as the toothbrush head and the toothbrush handle. At least a portion of an outer circumferential surface of the elastic rotation restoring part may be covered by another elastic rotation restoring part having a higher strain rate against an external force than that of the elastic rotation restoring part. According to one example, the elastic rotation restoring part may have four blades having a thin plate-shaped thickness and thus having a cross-sectional shape or more blades. When the thin plate-shaped blades are composed of two blades parallel to each other, a connection part for connecting the two blades may be provided. Any one of the blades may be thicker than the other blades to reduce bending in an unintended direction by the force of brushing. According to one example, at least one hole may be provided in the elastic rotation restoring part. According to one example, when at least one hole is provided in the elastic rotation restoring part, another elastic rotation restoring part made of a material having a greater strain rate against an external force than that of the elastic rotation restoring part may be filled in the hole. The another elastic rotation restoring part may store torsional energy as the hole of the elastic rotation restoring part is subjected to compressive deformation while being subjected to torsional deformation when the user's tooth brushing is applied.

According to still another embodiment, one end of the toothbrush head and one end of the toothbrush handle may be coupled to be rotatable relative to each other. According to one example, a protrusion protruding from the toothbrush head may be disposed to be rotationally movable relative to a protrusion protruding from one end of the toothbrush handle According to one example, the protrusion protruding from the toothbrush head may be disposed to be rotationally movable relative to a rotation hole provided at one end of the toothbrush handle. According to one example, the protrusion protruding from the toothbrush handle may be disposed to be movable relative to a rotation hole provided at one end of the toothbrush head. According to one example, the toothbrush head, the toothbrush handle, and the protrusion may be made of the same material. According to one example, the toothbrush head, the toothbrush handle, and the protrusion may be made of different materials from each other. At least a portion of the outer circumferential surface of the protrusion may be covered with the toothbrush head, the toothbrush handle, and another elastic rotation restoring part having a higher strain rate against an external force than that of the protrusion.

According to still another embodiment, the elastic rotation restoring part may have a thin plate shape. The thin plate shape may have a one-letter (one-line) shape, a cross shape, or a snowflake shape in cross section. The elastic rotation restoring part may be provided on at least one of one end of the toothbrush head and one end of the toothbrush handle. According to one example, at least one of the one end of the toothbrush head and the one end of the toothbrush handle may be provided with a protrusion having an empty space therein, and a rotation accommodation space may be defined by the empty space when the toothbrush head and the toothbrush handle are coupled to each other. According to one example, the elastic rotation restoring part may be subjected to torsional deformation when the torsional energy is stored in the rotation accommodation space. According to one example, the toothbrush head, the protrusion, the toothbrush handle, and the elastic rotation restoring part may all be made of the same material. According to one example, one end of the toothbrush head and one end of the toothbrush handle may be coupled to each other by another elastic rotation restoring part having a higher strain rate against an external force than that of the toothbrush head, the protrusion, the toothbrush handle, and the elastic rotation restoring part. According to one example, at least a portion of the rotation accommodation space may be filled by the another elastic rotation restoring part, or may still be empty. According to one example, a coupling line between one end of the toothbrush head and one end of the toothbrush handle may be inclined upward, maintained horizontally, or inclined downward toward a radial direction with respect to a longitudinal axis.

According to still another embodiment, one end of the toothbrush head and one end of the toothbrush handle may be coupled to be rotatable relative to each other. According to one example, an extension extending from the toothbrush head may be disposed to be movable relative to an extension extending from one end of the toothbrush handle. According to one example, the extension extending from the toothbrush head may be disposed to be movable relative to a rotation hole provided at one end of the toothbrush handle. According to one example, the extension extending from toothbrush handle may be disposed to be movable relative to a rotation hole provided at one end of the toothbrush head. According to one example, the toothbrush head, the toothbrush handle, and the protrusion may be made of the same material. According to one example, at least one of the one end of the toothbrush head and the one end of the toothbrush handle may be provided with a protrusion having an empty space therein, and a rotation accommodation space may be defined by the empty space when the toothbrush head and the toothbrush handle are coupled to each other. According to one example, one end of the toothbrush head and one end of the toothbrush handle may be coupled to each other by another elastic rotation restoring part having a higher strain rate against an external force than that of the toothbrush head, the protrusion, the toothbrush handle, and the elastic rotation restoring part. According to one example, at least a portion of the rotation accommodation space may be filled by the another elastic rotation restoring part, or may still be empty. According to one example, a coupling line between one end of the toothbrush head and one end of the toothbrush handle may be inclined upward, maintained horizontally, or inclined downward toward a radial direction with respect to a longitudinal axis.

Advantageous Effects

According to an embodiment of the present invention, the brushing guide elastic toothbrush can include: a toothbrush head having bristles provided on the outer circumferential surface of one side in the longitudinal direction; a toothbrush handle connected to the rear end of the toothbrush head in the longitudinal direction and extending in one direction such that a user can hold the toothbrush handle by hand; and an elastic rotation restoring part provided between the toothbrush head and the toothbrush handle and allowing rotation of the toothbrush handle and rotation of the toothbrush head based on the rotation of the toothbrush handle. When force is applied to the toothbrush handle by the user such that the toothbrush handle rotates in one direction with respect to the longitudinal direction while the bristles are pressed and in close contact with the user's teeth or gums, the elastic rotation restoring part can allow the rotation of the toothbrush handle and stores a rotational force generated by the toothbrush handle, and when the pressure contact of the bristles is released from the user's teeth or gums while a rotational force generated by the toothbrush handle is stored in the elastic rotation restoring part, the elastic rotation restoring part can provide the stored rotational force to the toothbrush head such that the teeth or gums can be cleaned by the bristles while the toothbrush head rotates in the same direction as the toothbrush handle.

Accordingly, the brushing guide elastic toothbrush can be provided, which can guide an easy rotation method while brushing.

According to one embodiment of the present invention, the rotation method can be easily performed even when a user is a child, and thus the child can be guided to personally manage teeth in a healthy state.

In addition, according to an embodiment of the present invention, the toothbrush head connected to a longitudinal front end of the toothbrush handle can be subjected to a rotational motion by a rotational operation of the toothbrush handle, so as to arouse the interest of the child, thereby reducing the child's repulsion against brushing teeth.

According to an embodiment of the present invention, an elastic restoration mechanism can be provided with a simple configuration.

DESCRIPTION OF DRAWINGS

FIG. 1 is a schematic exploded view for explaining a brushing guide elastic toothbrush according to one embodiment of the present invention.

FIG. 2 is a combined view showing a combined state of FIG. 1.

FIG. 3 is a view showing a brushing guide elastic toothbrush according to one embodiment of the present invention when viewed in direction "A" of FIG. 2.

FIGS. 4, 5 and 6 are views for explaining an action of an elastic rotation restoring part of a brushing guide elastic toothbrush according to one embodiment of the present invention.

FIGS. 7, 8 and 9 are views for explaining an action for each brushing position of an elastic rotation restoring part of a brushing guide elastic toothbrush according to one embodiment of the present invention.

FIG. 10 is a view for explaining a brushing guide elastic toothbrush according to another embodiment of the present invention.

FIG. 11 is a view for explaining an elastic rotation restoring part of a brushing guide elastic toothbrush according to another embodiment of the present invention.

FIG. 12 is a view for explaining a brushing guide elastic toothbrush according to still another embodiment of the present invention.

FIG. 13 is a view for explaining a toothbrush head and a toothbrush handle of a brushing guide elastic toothbrush according to still another embodiment of the present invention.

FIGS. 14, 15A, 15B, 16A, 16B and 17A, 17B, 17C are views for explaining still another embodiment of the present invention.

FIGS. 18, 19, 20, 21, 22, 23, 24, 25, 26, 27, 28, 29, 30, 31, 32, 33, 34 and 35 are views for explaining a manufacturing method of embodiments of the present invention.

FIGS. 36A, 36B, 36C, 37, 38, 39, 40, 41A, 41B, 41C, 41D, 42A, 42B, 42C, 42D, 42E, 43A, 43B, 43C, 43D, 43E, 44, 45, 46A, 46B, 47A, 47B, 48, 49A, 49B(a), 49B(b), 50, 51, 52, 53, 54, 55, 56, 57, 58, 59, 60 and 61 are views for explaining other embodiments of the present invention.

DETAILED DESCRIPTION OF THE EXEMPLARY EMBODIMENTS

Hereinafter, preferred embodiments of the present invention will be described in detail with reference to the accompanying drawings. However, the technical spirit of the present invention is not limited to the embodiments, but may be realized in different forms. The embodiments introduced herein are provided to sufficiently deliver the spirit of the present invention to those skilled in the art so that the disclosed contents may become thorough and complete.

When it is mentioned in the specification that one element is on another element, it means that the first element may be directly formed on the second element or a third element may be interposed between the first element and the second element. Further, in the drawings, a shape and a size are exaggerated for efficient description of the technical contents.

In addition, in the various embodiments of the present specification, the terms such as first, second, and third are used to describe various elements, but the elements are not limited to the terms. The terms are used only to distinguish one element from another element. Accordingly, an element mentioned as a first element in one embodiment may be mentioned as a second element in another embodiment. Each of the embodiments described and illustrated herein also include their complementary embodiments. Further, the term "and/or" in the present specification is used to include at least one of the elements enumerated in the specification.

In the specification, the terms of a singular form may include plural forms unless otherwise specified. Further, the terms "including" and "having" are used to designate that the features, the numbers, the steps, the elements, or combinations thereof described in the specification are present, and are not to be understood as excluding the possibility that one or more other features, numbers, steps, elements, or combinations thereof may be present or added. In addition, the term "connection" used herein may include the meaning of indirectly connecting a plurality of components, and directly connecting a plurality of components.

Further, in the following description of the present invention, a detailed description of known functions and configurations incorporated herein will be omitted when it may make the subject matter of the present invention unnecessarily unclear.

A brushing guide elastic toothbrush according to the following description may be abbreviated as an elastic toothbrush.

FIG. 1 is a schematic exploded view for explaining a brushing guide elastic toothbrush according to one embodiment of the present invention, FIG. 2 is a combined view showing a combined state of FIG. 1, FIG. 3 is a view showing a brushing guide elastic toothbrush according to one embodiment of the present invention when viewed in direction "A" of FIG. 2, FIGS. 4 to 6 are views for explaining an action of an elastic rotation restoring part of a brushing guide elastic toothbrush according to one embodiment of the present invention, and FIGS. 7 to 9 are views for explaining an action for each brushing position of an elastic rotation restoring part of a brushing guide elastic toothbrush according to one embodiment of the present invention.

As shown in FIGS. 1 and 2, a brushing guide elastic toothbrush 100 according to one embodiment of the present invention may guide an easy rotation method while brushing.

Here, the rotation method may refer to a method of holding the toothbrush to face the gums and rotating the wrist to brush upper teeth in a downward direction and lower teeth in an upward direction. In addition, the term "guide" may be understood to mean helping to easily perform a difficult brushing motion.

In other words, the brushing guide elastic toothbrush 100 according to one embodiment of the present invention may guide brushing when a user brushes from gums to teeth while turning the wrist holding the toothbrush.

The brushing guide elastic toothbrush 100 according to one embodiment of the present invention may guide a user to easily perform the rotation method even when the user is a child, and thus the child may be guided to personally manage teeth.

At this time, most children may be bothered to brush their teeth. That's why the toothbrush per se needs to attract children's interest and make the children want to brush their teeth using the toothbrush.

The brushing guide elastic toothbrush 100 according to one embodiment of the present invention may be moved according to a user's manipulation, for example, like a toy robot, which may be different from a conventional fixed stick type toothbrush, so as to arouse the interest of a child, thereby reducing the child's repulsion against brushing teeth.

Accordingly, the child may use the brushing guide elastic toothbrush 100 according to one embodiment of the present invention without repulsion, and the child may have fun in brushing teeth as the method of rotating the toothbrush is guided by the brushing guide elastic toothbrush 100. Accordingly, the child who brushing teeth using the brushing guide elastic toothbrush 100 according to one embodiment of the present invention may have confidence or pride in personally managing his/her own teeth.

Even in adults, a wrong tooth brushing habit may lead to incomplete tooth brushing and gum damage, and thus the development of a correct toothbrush is required.

For this purpose, the brushing guide elastic toothbrush 100 according to one embodiment of the present invention may be formed to include a toothbrush head 110, a toothbrush handle 120, and an elastic rotation restoring part 130.

The toothbrush head 110 may form a front end of the brushing guide elastic toothbrush 100 according to one embodiment of the present invention. The toothbrush head 110 may serve to support bristles B provided at an outer circumferential surface of one side in a longitudinal direction.

According to one embodiment of the present invention, the toothbrush head 110 may rotate relative to the toothbrush handle 120 by an energy emitted from the elastic rotation restoring part 130, which will be described in more detail below.

According to one embodiment of the present invention, the toothbrush head 110 may include a head body 111, a guide bar 112, an insertion end 113, and a first fixing end 114.

The head body 111 may form an appearance of the toothbrush head 110. The head body 111 may be provided in the form of a bar extending in one direction. In this case, the head body 111 may have a rectangular or circular cross section.

The head body 111 may provide a space in which the bristles B are provided at an outer circumferential surface of one side in a longitudinal direction. The bristles B may be provided in plurality and arranged in a specific shape, and may be provided such that a front end thereof may face a side at an outer circumferential surface of one side of the head body 111 in the longitudinal direction.

At this time, referring to FIG. 3, an upper end of the bristles B may include a flat surface and inclined surfaces inclined to both sides of the flat surface. When a top inclined surface of the bristles B is pressed and closely attached to the teeth (T of FIG. 7), a rotational angle of the toothbrush head 110 may be more amplified than when the flat surface is pressed and closely attached to the teeth (T of FIG. 7), which will be described in more detail below. However, it is one example that an upper end of the bristle B has a flat surface and inclined surfaces inclined to both sides of the flat surface, but the present invention is not limited thereto.

The guide bar 112 may be provided at a rear end of the head body 111. The guide bar 112 may extend rearward from one side to a rear end of the head body 111 in a circumferential direction. The guide bar 112 may support an insertion end 113 provided at an end thereof. The guide bar 112 may guide the insertion end 113 provided at the end thereof to a slit 122 of the toothbrush handle 120 to be described later.

According to one embodiment of the present invention, when the toothbrush head 110 and the toothbrush handle 120 are coupled in one direction, the guide bar 112 may be closely attached to the outer circumferential surface of the toothbrush handle 120 in the longitudinal direction.

Meanwhile, according to a modified embodiment, when the toothbrush head 110 and the toothbrush handle 120 are coupled in one direction, the guide bar 112 may be closely attached to an inner circumferential surface of the toothbrush handle 120 in the longitudinal direction.

The insertion end 113 may be provided at a longitudinal end of the guide bar 112. The insertion end 113 may protrude from the longitudinal end of the guide bar 112 in a direction perpendicular to the longitudinal direction. For example, when the head body 111 is provided in a cylindrical shape, the insertion end 113 may protrude radially inward of the head body 111 from the longitudinal end of the guide bar 112.

According to one embodiment of the present invention, when the toothbrush head 110 and the toothbrush handle 120 are coupled in one direction, the insertion end 113 may be guided by the guide bar 112 and inserted into the slit 122 provided in the toothbrush handle 120 from the outside to the inside.

According to a modified embodiment, when the head body 111 is provided in a cylindrical shape, the insertion end 113 may protrude radially outward of the head body 111 from the longitudinal end of the guide bar 112. When the toothbrush head 110 and the toothbrush handle 120 are coupled in one direction, the insertion end 113 may be guided by the guide bar 112 which is in close contact with an inner circumferential surface of the toothbrush handle 120 in the longitudinal direction, and thus may be inserted into the slit 122 provided in the toothbrush handle 120 from the inside to the outside of the toothbrush handle 120.

In this case, the slit 122 may be provided around one side of the toothbrush handle 120 in a circumferential direction, and the insertion end 113 inserted into the slit 122 may be rotated in a longitudinal direction of the slit 122, that is, in a circumferential direction of the toothbrush handle 120. Accordingly, according to one embodiment of the present invention, the toothbrush head 110 may be rotated relative to the toothbrush handle 120, and also the toothbrush handle 120 may be rotated relative to the toothbrush head 110.

The first fixing end 114 may be provided at a rear end of the head body 111 in the longitudinal direction. The first fixing end 114 may extend rearward from a longitudinal rear end of the head body 111. The first fixing end 114 may be coupled to one side of the elastic rotation restoration part 130 in the circumferential direction, which is disposed in parallel with the circumferential direction of the toothbrush head 110 and the toothbrush handle 120, so as to fix the elastic rotation restoring part 130.

Meanwhile, although not shown, according to one embodiment of the present invention, a circular trench on which the elastic rotation restoring part 130 provided in the form of a circular spring is seated may be provided inside a rear end of the head body 111 in the longitudinal direction.

Subsequently, referring to FIGS. 1 and 2, the toothbrush handle 120 may form a rear end of the brushing guide elastic toothbrush 100 according to one embodiment of the present invention. In other words, the toothbrush handle 120 may be connected to a longitudinal rear end of the toothbrush head 110. The toothbrush handle 120 may be connected to the longitudinal rear end of the toothbrush head 110 in a form extending rearward from the longitudinal rear end of the toothbrush head 110 so that a user may grip the toothbrush handle by hand.

According to one embodiment of the present invention, when a force is applied by the user to rotate the toothbrush handle 120 in one direction (clockwise or counterclockwise) with respect to the longitudinal direction, a rotation relative to the toothbrush head 110 may be allowed by the elastic rotation restoring part 130.

The toothbrush handle 120 may include a handle body 121, a slit 122, and a second fixing end 123.

The handle body 121 may form an appearance of the toothbrush handle 120. The handle body 121 may be provided in the form of a bar extending in one direction. In this case, the handle body 121 may have a rectangular or circular cross section, and may have the same shape as the head body 111.

The handle body 121 may be provided with a length that may be sufficiently gripped by an adult user having, for example, an average palm size with a hand. Accordingly, the handle body 121 may have a relatively longer length than that of the head body 111.

In addition, the slit 122 may be coupled to the insertion end 113 provided in the toothbrush head 110. For this purpose, the slit 122 may be provided at one side of the handle body 121 in the longitudinal direction. Specifically, the slit 122 may be provided at a point corresponding to a length of the guide bar 112 provided in the toothbrush head 110 from a tip of the handle body 121. The slit 122 may be provided in the circumferential direction of the handle body 121 at the corresponding point. For example, when the handle body 121 is provided in a cylindrical shape, the slit 122 may be provided in the circumferential direction of the handle body 121 at the corresponding point. In this case, the slit 122 may have a width in which the insertion end 113 may be inserted.

According to one embodiment of the present invention, when the toothbrush head 110 and the toothbrush handle 120 are coupled in one direction, the coupling between the toothbrush head 110 and the toothbrush handle 120 may be completed by inserting the insertion end 113 guided by the guide bar 112 into the slit 122.

In this case, the slit 122 may allow the insertion end 113 inserted therein to be rotatable in a longitudinal direction thereof, that is, in a circumferential direction of the handle body 121. Accordingly, according to one embodiment of the present invention, the toothbrush head 110 may be rotated relative to the toothbrush handle 120, and also the toothbrush handle 120 may be rotated relative to the toothbrush head 110.

Meanwhile, the second fixing end 123 may be provided at a front end of the handle body 121 in the longitudinal direction. The second fixing end 123 may extend forward from a front end of the handle body 121 in the longitudinal direction. The second fixing end 123 may have one side in the circumferential direction coupled to the other side of the elastic rotation restoring part 130 in the circumferential direction, which is fixed to the first fixing end 114 of the toothbrush head 110, thereby fixing the elastic rotation restoring part 130.

In this case, the second fixing end 123 may be provided to face the first fixing end 114 based on an origin of the elastic rotation restoring part 130.

Subsequently, referring to FIGS. 1 and 2, the elastic rotation restoring part 130 may be provided between the toothbrush head 110 and the toothbrush handle 120. According to one embodiment of the present invention, the elastic rotation restoring part 130 may allow the rotation of the toothbrush handle 120 by a force applied from the user's hand.

In addition, according to one embodiment of the present invention, the elastic rotation restoring part 130 may allow the rotation of the toothbrush head 110 based on the rotation of the toothbrush handle 120.

In other words, according to one embodiment of the present invention, the rotation of the toothbrush head 110 and the toothbrush handle 120 may be allowed by the elastic rotation restoring part 130 provided therebetween.

Accordingly, the brushing guide elastic toothbrush 100 according to one embodiment of the present invention may include a first rotation operation mode of the toothbrush handle 120 according to the allowed rotation of the elastic rotation restoring part 130 and a second rotation operation mode of the toothbrush head 110 according to a rotation energy caused by the first rotation operation provided from the elastic rotation restoring part 130 when a force is applied from the user.

According to one embodiment of the present invention, the second rotation operation mode may start with a time difference from the first rotation operation mode. In other words, the second rotation operation mode may start after the first rotation operation mode is completed.

Here, the first rotation operation mode may start in a state where the bristles B are pressed and in close contact with the user's teeth T (T in FIG. 7) or gums. In addition, the second rotation operation mode may start at a time when the pressure contact of the bristles B is released from the user's teeth (T in FIG. 7) or gums.

The first rotation operation mode may start as the elastic rotation restoring part 130 allows the rotation of the toothbrush handle 120, when a force is applied to the toothbrush handle 120 by the user so that the toothbrush handle 120 is rotated in one direction with respect to a longitudinal direction in a state where the bristles B are pressed and in close contact with the user's teeth (T in FIG. 7) or gums.

At this time, in the first rotation operation mode, the elastic rotation restoring part 130 may store the rotational force generated by the toothbrush handle 120.

In addition, the second rotation operation mode may start as the elastic rotation restoring part 130 provides the stored rotational force to the toothbrush head 110 so that the toothbrush head 110 rotates in the same direction as the toothbrush handle 120 and brushes the teeth (T in FIG. 7) or gums with the bristles B, when the pressure contact of the bristles B is released from the user's teeth (T in FIG. 7) or gums in a state where the rotational force generated by the toothbrush handle 120 is stored in the elastic rotation restoring part 130.

Referring to FIG. 4, the elastic rotation restoring part 130 according to one embodiment of the present invention may be provided as a circular spring. The elastic rotation restoring part 130 provided as the circular spring may be disposed in parallel with the circumferential direction of the toothbrush head 110 and the toothbrush handle 120.

In this case, according to one embodiment of the present invention, one side of the elastic rotation restoring part 130 in the circumferential direction provided as the circular spring may be coupled to the first fixing end 114 provided in the toothbrush head 110. For example, the first fixed end 114 may be coupled to the circular spring at a position B1 of the circular spring in the circumferential direction.

In addition, the other side of the circular spring in the circumferential direction may be coupled to the second fixing end 123 provided in the toothbrush handle 120. For example, the second fixing end 123 may be coupled to the circular spring at a position A1 of the circular spring in the circumferential direction.

Here, the position A1 of the circular spring in the circumferential direction, to which the second fixing end 123 is coupled, and the position B1 of the circular spring in the circumferential direction, to which the first fixing end 123 is coupled, may be defined as both ends of a diameter in the longitudinal direction, which passes through an origin in the circular spring.

According to one embodiment of the present invention, when a force applied to the toothbrush handle 120 is transmitted through the second fixing end 123, that is, the force applied to the toothbrush handle 120 is transmitted through the second fixing end 123, as a user gripping the toothbrush handle 120 applies force to the toothbrush handle 120 to rotate the toothbrush head 120, the elastic rotation restoring part 130 formed as a circular spring may be compressed in the direction of the force applied to the toothbrush handle 120. The elastic rotation restoring part 130 may enable the rotation of the toothbrush handle 120 while being compressed in the direction of the force applied to the toothbrush handle 120.

As such, in the first rotation operation mode, the toothbrush handle 120 may be rotated and the toothbrush head 110 may be fixed.

Referring to FIG. 5, in a state where the bristles B are pressed and in close contact with the user's teeth (T in FIG. 7) or gums, the second fixing end 123 provided at the toothbrush handle 120 is coupled to a position A1 of the circular spring in the circumferential direction, and the first fixing end 114 provided at the toothbrush head 120 is coupled to a position B1 of the circular spring in the circumferential direction, for example, when the user grasping the toothbrush handle 120 rotates the toothbrush handle 120 in a left direction (based on the drawing), the second fixing end 123 coupled to the position A1 of the circular spring in the circumferential direction may move to a position A2 of the circular spring in the circumferential direction.

At this time, the first fixing end 114 coupled to the position B1 of the circular spring in the circumferential direction may be continuously maintained at the position B1 of the circular spring in the circumferential direction because the bristles B provided at the toothbrush head 110 are pressed and in close contact with the user's teeth (T in FIG. 7) or gums. Accordingly, only the second fixing end 123 moves from the position A1 to the position A2 of the circular spring in the circumferential direction, and thus the circular spring between the position A2 and the position B1 of the circular spring in the circumferential direction may be compressed. Accordingly, the toothbrush handle 120 may be rotated in the direction desired by the user.

In addition, according to one embodiment of the present invention, in a state where the elastic rotation restoring part 130 is compressed in the direction of force applied to the toothbrush handle 120, for example, in a state where a space between the position A2 and the position B1 of the circular spring in the circumferential direction, which constitutes the elastic rotation restoring part 130, is compressed, when a fixing force of the toothbrush head 110 is released, that is, when a force applied to the bristles B is removed so as to be pressed and in close contact with the user's teeth (T in FIG. 7) or gums, the circular spring may allow the rotation of the toothbrush head 110 in the same direction as the rotation direction of the toothbrush handle 120 while an elastic energy is released in the same direction as the compressed direction. By the rotation of the toothbrush head 110, the user's teeth (T in FIG. 7) may be cleaned as if the teeth are wiped by the bristles B provided at the toothbrush head 110.

Referring to FIG. 6, in a state where the space between the position A2 and the position B1 of the circular spring in the circumferential direction is compressed, when the force applied to the bristles (B) so as to be pressed and in close contact with the user's teeth (T in FIG. 7) or gums is removed, the second fixing end 123 moved to the position A2 of the circular spring may be intactly maintained at the position A2. In other words, the toothbrush handle 120 may be maintained in a fixed state.

On the contrary, the toothbrush head 110 may be in a state of being freely rotatable, and thus the circular spring in which a space between the position A2 and the position B1 is compressed may be elastically restored while the elastic energy is released in the clockwise direction. Accordingly, the first fixing end 114 coupled to the position B1 of the circular spring in the circumferential direction may move to the position B2 of the circular spring in the circumferential direction. Here, the position A2 of the circular spring in the circumferential direction and the position B2 of the circular spring in the circumferential direction may be both ends of the diameter in the longitudinal direction, which passes through the origin of the circular spring.

As such, in the second rotation operation mode, the toothbrush handle 120 may be fixed and the toothbrush head 110 may be rotated.

Meanwhile, referring to FIG. 7, when the teeth T at the position 1 corresponding to upper teeth are cleaned by the rotation method, the teeth may be cleaned as if the teeth are wiped from top to bottom.

When the teeth T at the position 1 are cleaned by the rotation method using the brushing guide elastic toothbrush 100 according to one embodiment of the present invention, the user may first press and adhere an upper end of the bristles B provided at one side of the toothbrush head 110 to the surface of the teeth T at the position 1.

Then, the user may rotate the toothbrush handle 120 being held so that the teeth T at the position 1 are cleaned by the bristles B moving as if the teeth are wiped from top to bottom. In this case, the rotational force generated by the toothbrush handle 120 may be stored in the elastic rotation restoring part 130.

Then, when the user removes the force applied to the bristles B toward the teeth T, the rotational force generated by the toothbrush handle unit 120, for example, elastic energy, stored in the elastic rotation restoring part 130 is released, and thus the toothbrush head 110 and the bristles B provided at one side thereof may be rotated in the same direction as the rotational direction of the toothbrush handle 120. Accordingly, the teeth T at the position 1 corresponding to the upper teeth may be cleaned as if the teeth are wiped from the top to the bottom by the bristles B.

At this time, referring to FIG. 8, the user may first press and adhere an inclined surface of one side of the upper end of the bristles B provided at one side of the toothbrush head 110 to the surface of the teeth T at the position 1.

In this case, in the form as shown in FIG. 7, a greater rotational force may be stored in the elastic rotation restoring part 130 than in the case where the upper end of the bristle B is pressed and in close contact with the surface of the teeth T, and thus a rotation angle of the toothbrush head 110 may be further amplified than in FIG. 7.

Meanwhile, referring to FIG. 8, when the teeth T at the position 2 corresponding to lower teeth are cleaned by the rotation method, the teeth may be cleaned as if the teeth are wiped from bottom to top.

When the teeth T at the position 2 are cleaned by the rotation method using the brushing guide elastic toothbrush 100 according to one embodiment of the present invention, the user may first press and adhere an upper end of the bristles B provided at one side of the toothbrush head 110 to the surface of the teeth T at the position 2.

Here, as described above, when an inclined surface of one side of the upper end of the bristle B is pressed and in close contact with the surface of the teeth T at the position 2, the rotation angle of the toothbrush head 110 may be further amplified than when a central portion of the upper end of the bristle B is pressed and in close contact with the surface of the teeth T at the position 2.

Then, the user may rotate the toothbrush handle 120 being held so that the teeth T at the position 2 are cleaned by the bristles B moving as if the teeth are wiped from bottom to top. In this case, the rotational force generated by the toothbrush handle 120 may be stored in the elastic rotation restoring part 130.

Then, when the user removes the force applied to the bristles B toward the teeth T, the rotational force generated by the toothbrush handle unit 120, for example, elastic energy, stored in the elastic rotation restoring part 130 is released, and thus the toothbrush head 110 and the bristles B provided at one side thereof may be rotated in the same direction as the rotational direction of the toothbrush handle 120. Accordingly, the teeth T at the position 2 corresponding to the lower teeth may be cleaned as if the teeth are wiped from bottom to top by the bristles B.

In another aspect, according to one embodiment of the present invention, the elastic rotation restoring part 130 may provide a clockwise twist and a clockwise restoring force and may provide a counterclockwise twist and a counterclockwise restoring force with respect to the longitudinal axis of the toothbrush handle 120. Accordingly, it may be possible to use the rotation in both directions and the restoring force required for brushing teeth according to the rotation method.

Furthermore, according to one example, the restoring force after the clockwise twist with respect to the longitudinal axis of the toothbrush handle 120 and the restoring force after the counterclockwise twist with respect to the longitudinal axis of the toothbrush handle 120 may correspond to each other. More specifically, the restoring force may be the same regardless of the direction.

Hereinafter, the brushing guide elastic toothbrush according to another embodiment of the present invention will be described with reference to FIGS. 10 and 11.

FIG. 10 is a view for explaining a brushing guide elastic toothbrush according to another embodiment of the present invention, and FIG. 11 is a view for explaining an elastic rotation restoring part of a brushing guide elastic toothbrush according to another embodiment of the present invention.

Referring to FIG. 10, the brushing guide elastic toothbrush 200 according to another embodiment of the present invention may be formed to include a toothbrush head 210, a toothbrush handle 220, and an elastic rotation restoring part 230.

The toothbrush head 210 may form a front end of the brushing guide elastic toothbrush 200 according to another embodiment of the present invention. Bristles B may be provided at an outer circumferential surface of one side of the toothbrush head 210 in the longitudinal direction. The toothbrush head 210 may be provided in the form of a bar extending in one direction. In this case, the toothbrush head 210 may have a rectangular or circular cross section.

The toothbrush head 210 may rotate relative to the toothbrush handle 220 by the energy released from the elastic rotation restoring part 230.

The toothbrush handle 220 may form a rear end of the brushing guide elastic toothbrush 200 according to another embodiment of the present invention. In other words, the toothbrush handle 220 may be connected to a longitudinal rear end of the toothbrush head 210. The toothbrush handle 220 may be connected to the longitudinal rear end of the toothbrush head 210 in a form extending rearward from the longitudinal rear end of the toothbrush head 210 so that a user may grip the toothbrush handle by hand.

The toothbrush handle 220 may be provided in the form of a bar extending in one direction. In this case, the toothbrush handle 220 may have a rectangular or circular cross section, and may have the same shape as the toothbrush head 210.

According to another embodiment of the present invention, when a force is applied by the user to rotate the toothbrush handle 220 in one direction with respect to a longitudinal direction, a rotation relative to the toothbrush head 210 may be allowed by the elastic rotation restoring part 230.

According to another embodiment of the present invention, the elastic rotation restoring part 230 may be provided with an elastic polymer band. In this case, the elastic rotation restoring part 230 provided as the elastic polymer band may have a mesh structure so as to store and release elastic energy in a clockwise direction and a counterclockwise direction.

Referring to FIG. 11, the elastic polymer band constituting the elastic rotation restoring part 230 may be provided in a form surrounding a contact portion between the toothbrush head 210 and the toothbrush handle 220 connected in one direction.

In this case, the elastic polymer band may be divided into a joint area 231 and a non-joint area 232 according to whether the brushing guide elastic toothbrush 200 is joined or not.

In other words, according to another embodiment of the present invention, the longitudinal two ends of the elastic polymer band may be the joint area 231 which is joined to the outer circumferential surfaces of the toothbrush head 210 and the toothbrush handle 220.

In addition, in the elastic polymer band, a portion except for the two longitudinal ends may be a non-joint area 232 which is not joined to the outer circumferential surfaces of the toothbrush head 210 and the toothbrush handle 220.

According to another embodiment of the present invention, the non-joint area 232 may include a portion in which the longitudinal rear end of the toothbrush head 210 and the longitudinal front end of the toothbrush handle 220 are in contact with each other.

Accordingly, the toothbrush handle 220 may rotate relative to the toothbrush head 210 in a fixed state, and the toothbrush head 210 may rotate relative to the toothbrush handle 220 in a fixed state.

Accordingly, the brushing guide elastic toothbrush 200 according to another embodiment of the present invention may guide the user's brushing of examining the rotation method while operating in the same manner as the brushing guide elastic toothbrush 100 (FIG. 1) according to one embodiment of the present invention.

In other words, the brushing guide elastic toothbrush 200 according to another embodiment of the present invention may include a first rotation operation mode of the toothbrush handle 220 according to the allowed rotation of the elastic rotation restoring part 230 and a second rotation operation mode of the toothbrush head 210 according to a rotation energy caused by the first rotation operation provided from the elastic rotation restoring part 230 when a force is applied from the user.

According to another embodiment of the present invention, the second rotation operation mode may start with a time difference from the first rotation operation mode. In other words, the second rotation operation mode may start after the first rotation operation mode is completed.

Here, the first rotation operation mode may start in a state where the bristles B are pressed and in close contact with the user's teeth T (T in FIG. 7) or gums. In addition, the second rotation operation mode may start at a time when the pressure contact of the bristles B is released from the user's teeth (T in FIG. 7) or gums.

Hereinafter, the brushing guide elastic toothbrush according to still another embodiment of the present invention will be described with reference to FIGS. 12 and 13.

FIG. 12 is a view for explaining a brushing guide elastic toothbrush according to still another embodiment of the present invention, and FIG. 13 is a view for explaining a toothbrush head and a toothbrush handle of a brushing guide elastic toothbrush according to still another embodiment of the present invention.

Referring to FIG. 12, the brushing guide elastic toothbrush 300 according to still another embodiment of the present invention may be formed to include a toothbrush head 110, a toothbrush handle 120, and an elastic rotation restoring part 230.

Since still another embodiment of the present invention is a combination between one embodiment of the present invention and another embodiment of the present invention, the same reference numerals may be assigned to the same components, and a detailed description thereof will be omitted.

The toothbrush head 110 according to still another embodiment of the present invention may be the same as the toothbrush head 110 (FIG. 1) according to one embodiment of the present invention.

Referring to FIG. 13, in other words, the toothbrush head 110 according to still another embodiment of the present invention may include a head body 111, a guide bar 112, an insertion end 113, and a first fixing end 114, like the toothbrush head 110 (FIG. 1) according to one embodiment of the present invention.

In addition, the toothbrush handle 120 according to still another embodiment of the present invention may be the same as the toothbrush handle 120 (FIG. 1) according to one embodiment of the present invention. In other words, the toothbrush handle 120 according to still another embodiment of the present invention may include a handle body 121, a slit 122, and a second fixing end 123, like the toothbrush handle 120 (FIG. 1) according to one embodiment of the present invention.

As described above, according to still another embodiment of the present invention, the first fixing end 114 may be provided to the toothbrush head 110 and the second fixing end 123 may be provided to the toothbrush handle 120, and thus a circular spring, of which one side and the other side are fixed by the first fixing end 114 and the second fixing end 123 in the circumferential direction, may be provided between the toothbrush head 110 and the toothbrush handle 120.

The circular spring may store a force applied from the toothbrush handle 120 and release the stored force to rotate the toothbrush head 110, together with an elastic polymer band to be described later.

However, according to still another embodiment of the present invention, the elastic rotation restoring part 230 made of the elastic polymer band may be provided, and thus the circular spring may be omitted.

Meanwhile, the elastic rotation restoring part 230 according to still another embodiment of the present invention may be the same as the elastic rotation restoring part 230 (FIG. 10) according to another embodiment of the present invention.

In other words, the elastic rotation restoring part 230 according to still another embodiment of the present invention may be provided as an elastic polymer band having a mesh structure, and may be provided in a form surrounding a contact portion between the toothbrush head 110 and the toothbrush handle 120 connected in one direction.

In other words, as in another embodiment, the longitudinal two ends of the elastic rotation restoring part 230 made of the elastic polymer band may be joined to the outer circumferential surfaces of the toothbrush head 110 and the toothbrush handle 120, and a portion except for the longitudinal two ends may not be joined to the outer circumferential surfaces of the toothbrush head 110 and the toothbrush handle 120.

In this case, a portion in which a longitudinal rear end of the toothbrush head 110 and a longitudinal front end of the toothbrush handle 120 are in contact with each other may be positioned below the elastic polymer band area which is not joined to outer circumferential surfaces of the toothbrush head 110 and the toothbrush handle 120.

Here, the elastic polymer band may be provided in a form covering the slit 122 formed in the toothbrush handle 120.

In general, toothbrushes may be mainly used in high-humidity environments such as bathrooms. Accordingly, according to still another embodiment of the present invention, the elastic polymer band provided in a form surrounding a contact portion between the toothbrush head 110 and the toothbrush handle 120 may cover the slit 112 formed at one side of the toothbrush handle 120 in the length direction, so as to block the penetration of moisture into the slit 112, thereby preventing mold from occurring in the toothbrush handle 120.

In other words, according to still another embodiment of the present invention, the slit 112 may be covered with the elastic polymer band, thereby making it possible to more hygienically manage the brushing guide elastic toothbrush 300.

The brushing guide elastic toothbrush 300 according to still another embodiment of the present invention, which is a combination of one embodiment of the present invention and another embodiment of the present invention, may guide the user's brushing of examining the rotation method while operating in the same manner as in one embodiment and the other embodiment.

In other words, the brushing guide elastic toothbrush 300 according to still another embodiment of the present invention may include a first rotation operation mode of the toothbrush handle 120 according to the allowed rotation of the elastic rotation restoring part 230 and a second rotation operation mode of the toothbrush head 110 according to a rotation energy caused by the first rotation operation provided from the elastic rotation restoring part 230 when a force is applied from the user.

According to still another embodiment of the present invention, the second rotation operation mode may start with a time difference from the first rotation operation mode. In other words, the second rotation operation mode may start after the first rotation operation mode is completed.

Here, the first rotation operation mode may start in a state where the bristles B are pressed and in close contact with the user's teeth T (T in FIG. 7) or gums. In addition, the second rotation operation mode may start at a time when the pressure contact of the bristles B is released from the user's teeth (T in FIG. 7) or gums.

Hereinafter, the modified embodiments of the present invention will be described. A description of overlapping parts will be omitted, and a differentiated configuration will be described in detail.

FIGS. 14 to 17 are views for explaining still another embodiment of the present invention.

Referring to FIG. 14, the brushing guide elastic toothbrush 400 according to still another embodiment of the present invention may include at least one of a toothbrush head 410 and a toothbrush handle 420. In this case, as described above, the bristles B may be provided at one side of the toothbrush head 410, and the shape and function of the bristles B correspond to those described with reference to FIGS. 3 and 8, and thus a detailed description thereof will be omitted.

A separation space S may be provided along the longitudinal direction of the toothbrush head 410 and the toothbrush handle 420 according to still another embodiment of the present invention. In other words, at least a portion of the toothbrush head 410 in the longitudinal direction and at least a portion of the toothbrush handle 420 in the longitudinal direction may be spaced apart from each other.

An elastic rotation restoring part 450 may be provided in the separation space S. The function of the elastic rotation restoring part 450 may correspond to that of the elastic rotation restoring part 130 or 230 described above, and more specifically, as described above with reference to FIGS. 7, 8, and 9, may perform a function of storing and releasing elastic energy to guide brushing.

The elastic rotation restoring part 450 may be made of a material which is soft and has good elasticity. For example, the elastic rotation restoring part 450 may be made of a material which is softer and has a higher elasticity than at least one of the toothbrush head part 410 and the toothbrush handle part 420. Accordingly, when torsional torque is generated due to brushing between the toothbrush head 410 and the toothbrush handle 420, the elastic rotation restoring part 450 may store elastic energy and release the stored elastic energy under a predetermined condition. For example, an elastic modulus of the elastic rotation restoring part 450 may be smaller than that of at least one of the toothbrush head 410 and the toothbrush handle 420.

Hereinafter, a manufacturing method thereof will be described with reference to FIGS. 15 to 17. A description of the manufacturing of the bristles B will be omitted. Hereinafter, the inside of the elastic rotation restoring part 450 will be shown to be visible in some drawings.

Referring to of FIG. 15A, the toothbrush head 410 and the toothbrush handle 420 may be provided with a separation space therebetween, and referring to FIG. 15B, the separation space may be filled with an elastic rotation restoring part 450. The elastic rotation restoring part 450 may further cover one side of the toothbrush head 410 and the toothbrush handle 420. Accordingly, mechanical durability may be improved, and slipping of a finger gripping point may be prevented.

In this case, it may be further considered that the storage and release of torsional elastic energy between the toothbrush head 410 and the toothbrush handle 420 may be possible, but a relative movement between the toothbrush head 410 and the toothbrush handle 420 to the separation space may be limited.

More specifically, referring to FIG. 16A, the toothbrush head 410 and the toothbrush handle 420 are provided with a separation space therebetween, and a protrusion may be provided so that the separation space may be narrowed in the longitudinal direction L. The space in the longitudinal direction L of the separation space may be narrowed by the protrusion, and the elastic rotation restoring part 450 may be filled therein. In this case, since the separation space S is narrowed, a relative movement between the toothbrush head 410 and the toothbrush handle 420 may be limited, whereas storage and release of torsional elastic energy between the toothbrush head 410 and the toothbrush handle 420 may still be possible.

Furthermore, a manufacturing method as shown in FIGS. 17A, 17B and 17C may be possible. Referring to FIG. 17A, the toothbrush head 410 and the toothbrush handle 420 may be connected to a connecting part 452 having a small thickness in an injection-molding process.

After that, as shown in FIG. 17B, the separation space (S) between the toothbrush head 410 and the toothbrush handle 420 may be filled with the elastic rotation restoring part 450.

Then, as shown in FIG. 17C, the thin connecting part 452 between the toothbrush head 410 and the toothbrush handle 420 may be cut. To this end, an external force may be applied between the toothbrush head 410 and the toothbrush handle 420 to cause a relative deformation. As the thin connecting part 452 is disconnected, a relative movement may be possible between the toothbrush head 410 and the toothbrush handle 420. However, when the connecting part 452 is disconnected, a longitudinal separation between the toothbrush head 410 and the toothbrush handle 420 may be very small, and thus the relative movement between the toothbrush head 410 and the toothbrush handle 420 during brushing of the toothbrush may rarely occur or, even if it does occur, may not cause inconvenience in brushing of the toothbrush.

The manufacturing method described above with reference to FIGS. 15 to 17 may be performed through a predetermined double injection-molding process or an insert process.

Hereinafter, the manufacturing method will be described, and the description of the manufacturing method may be applied to the toothbrush described with reference to FIGS. 14 to 17.

FIGS. 18 to 35 are views for explaining a manufacturing method of embodiments of the present invention.

Referring to FIG. 18, a first mold 1000 and a second mold 1100 may be prepared. It may be assumed that the first mold 1000 is a basic mold and the second mold 1100 is a moving mold. The basic mold and the moving mold may be opposite to each other. In other words, the first mold 1000 may be a moving mold.

As shown in FIG. 19, the second mold 1100 may move to the first mold 1000 to form a cavity. In other words, a first cavity (for 410) for injection-molding the toothbrush head and a second cavity (for 420) for injection-molding the toothbrush handle 450 may be formed.

As shown in FIG. 20, the toothbrush head 410 and the toothbrush handle 450 may be formed by injection-molding a plastic source from the first and second cavities.

As shown in FIG. 21, the second mold 1100 may be removed.

Then, as shown in FIG. 22, a second-A mold 1110 may be prepared.

The 2-A mold 1110 may form a third cavity (for 450) for injection-molding an elastic rotation restoring part together with the first mold 1000 (see FIG. 23).

As shown in FIG. 24, the elastic rotation restoring part 450 made of an elastic material may be formed through the third cavity (for 450). Such a series of processes may be referred to as double injection-molding.

As shown in FIG. 25, thereafter, an injection-molded product may be separated, and a brush B may be implanted into the toothbrush head 410. Thus, the brushing guide elastic toothbrush according to an embodiment may be manufactured.

Meanwhile, a protrusion described with reference to FIG. 16A and FIG. 16B may be provided by modifying the shapes of the first and second cavities. Then, as shown in FIG. 26, the elastic rotation restoring part may be formed through the third cavity. As shown in FIG. 27, the injection-molded product may be separated from the mold and the brush B may be implanted. In FIG. 27, the elastic rotation restoring part 450 may be shown as being translucent to describe the protrusion therein. The elastic rotation restoring part 450 according to one embodiment may be opaque, translucent, or transparent.

In this way, even if the toothbrush head 410 and the toothbrush handle 450 are separated from each other by the separation space S, the elastic rotation restoring part 450 may be formed, and in this way, the embodiments described with reference to FIGS. 14 to 17 may be manufactured.

Furthermore, the surface of the elastic rotation restoring part 450 may have a mesh structure formed in a diagonal direction (see a diagonal direction and a mesh direction of reference numeral 230 of FIG. 10) so as to facilitate storage and release of elastic energy.

Hereinafter, a modified embodiment of a manufacturing method according to one embodiment of the present invention will be described.

Referring to FIG. 28, a first mold 1000 and a second mold 1130 may be prepared. As the second mold 1130 is moved to the first mold 1000, as shown in FIG. 29, a first cavity (for 410) for the t toothbrush head injection-molding 410 and a second cavity (for 450) for the toothbrush handle 450 injection-molding may be formed.

Referring to FIG. 30, the first mold 1130 may be separated.

Referring to FIG. 31, the first-A mold 1010 (see a red line) may be repositioned in the direction of an arrow to form a third cavity. Accordingly, as shown in FIG. 32, one end portion of the toothbrush head 410, the separation space S, and one end portion of the toothbrush handle 450 may be provided as the cavity. In addition, a corresponding second mold 1140 may be prepared.

As shown in FIG. 33, the first mold and the second mold 1000 and 1140 may be matched with each other, thereby forming a third cavity (for 450) for forming the elastic rotation restoring part 450.

As shown in FIG. 34, the elastic rotation restoring part 450 may be formed to surround one end portion of the toothbrush head 410, fill the separation space S, and surround one end portion of the toothbrush handle 450. The embodiment described with reference to FIGS. 18 to 27 may be distinguished in that the elastic rotation restoring part 450 surrounds one end portion of the toothbrush head 410 and one end portion of the toothbrush handle 450.

Thus, as shown in FIG. 35, the brushing guide elastic toothbrush according to one embodiment may be manufactured. The manufacturing method described with reference to FIGS. 28 to 35 may be applied to the embodiments described with reference to FIGS. 14 to 17.

In FIG. 35, the elastic rotation restoring part 450 may be shown as being translucent to describe the protrusion therein. The elastic rotation restoring part 450 according to one embodiment may be opaque, translucent, or transparent.

Furthermore, the surface of the elastic rotation restoring part 450 may have a mesh structure formed in a diagonal direction (see a diagonal direction and a mesh direction of reference numeral 230 of FIG. 10) so as to facilitate storage and release of elastic energy.

In FIG. 35, the elastic rotation restoring part 450 may be shown as being translucent to describe the protrusion therein. The elastic rotation restoring part 450 according to one embodiment may be opaque, translucent, or transparent.

Hereinafter, various examples will be described with reference to FIG. 36.

Referring to (a) of FIG. 36, a first protrusion 412 may be provided at one end of the toothbrush head 410 of the elastic toothbrush according to one embodiment of the present invention, and a second protrusion 422 may be provided at one end of the toothbrush handle 420.

According to one example, the second protrusion 422 may extend from the toothbrush handle 420 in the Z-axis direction, which is the direction of the toothbrush head 410. The first protrusion 412 may be spaced apart from the second protrusion 422 in the X-axis and/or Y-axis directions and may protrude toward the toothbrush handle 420.

According to one example, referring to a cross-sectional shape (that is, an XY plane shape) at a position V of (a) of FIG. 36, as shown in V', the first protrusion 412 may have a circular cylindrical shape and the second protrusion 422 may have a bar shape. In this case, the first protrusion 412 may have an arc shape instead of a circle.

According to one example, the first and second protrusions 412 and 422 may overlap each other when viewed in the direction A of (a) of FIG. 36. Furthermore, addition to the second protrusion 422, an n auxiliary protrusion facing the first protrusion 412 and not overlapping with the same in the direction A may be provided at one end of the toothbrush handle 420.

The elastic rotation restoring part 450 may have a shape of (b) of FIG. 36 or a shape of (c) of FIG. 36, as described above, according to a manufacturing method thereof.

Thus, a longitudinal movement of the Z-axis between the toothbrush head 410 and the toothbrush handle 420 may be minimized, and only a degree of rotational freedom around the Z-axis may be selectively implemented.

In this case, in the present embodiment, at least one of the first protrusion 412 and the second protrusion 422 may be omitted. Furthermore, the positions of the first protrusion 412 and the second protrusion 422 may be opposite to each other. In other words, the shape of the first protrusion 412 may be provided at the toothbrush handle 420, and the shape of the second protrusion 422 may be provided at the toothbrush head 410.

The elastic rotation restoring part 450 may have a groove into which the first protrusion 412 is inserted. For another example, the first protrusion 412 may be provided at a radial outer circumferential surface of the elastic rotation restoring part 450. In this case, at least a portion of the elastic rotation restoring part 450 may be surrounded by the first protrusion 412 according to the shape of the first protrusion 412. It goes without saying that the first protrusion 412 may entirely surround the outer circumferential surface of the elastic rotation restoring part 450.

In addition, the elastic rotation restoring part 450 may have a groove into which the second protrusion 422 is inserted.

Hereinafter, another embodiment will be described with reference to FIG. 37. Only differentiated configurations will be described, and duplicate descriptions will be omitted.

Referring to FIG. 37, a first protrusion 412 may be provided at one end of the toothbrush head 410 of the elastic toothbrush according to one embodiment of the present invention, and a second protrusion 422 may be provided at one end of the toothbrush handle 420.

According to one example, the second protrusion 422 may extend from the toothbrush handle 420 in the Z-axis direction, which is the direction of the toothbrush head 410. The first protrusion 412 may be spaced apart from the second protrusion 422 in the X-axis and/or Y-axis directions and may protrude toward the toothbrush handle 420.

According to one example, the first and second protrusions 412 and 422 may overlap each other when viewed in the direction A of FIG. 37. Furthermore, in addition to the second protrusion 422, an auxiliary protrusion facing the first protrusion 412 and not overlapping with the same in the direction A may be provided at one end of the toothbrush handle 420.

In this case, an auxiliary protrusion 424 may be provided at one side of the second protrusion 422. The auxiliary protrusion 424 may serve to narrow a distance in the X and Y-axis directions from the first protrusion 412 when viewed in a V-position cross-section. This is to limit a degree of freedom other than the rotation in the Z-axis direction.

Although it is shown that the auxiliary protrusion 424 has a disk shape, the auxiliary protrusion may have a circular band shape having an empty inside, or a plurality of branches may be connected in the direction of the circular band from the center of the Z-axis toward the outside in the radial direction, such as a wheel shape (see a blue box 424a). This is to increase a contact area with the polymer material constituting an elasticity permission rotating part.

In addition, a sawtooth part may be provided on the first and second protrusions 412 and 422 and the auxiliary protrusion 424 to provide a predetermined roughness. This is also to increase a contact area with the elastic rotation restoring part.

In addition, at least one of the first and second protrusions 412 and 422 and the auxiliary protrusion 424 may be omitted. Furthermore, the positions may be opposite. In other words, the shape of the first protrusion 412 may be provided at the toothbrush handle 420, and the shape of the second protrusion 422 and the auxiliary protrusion 424 may be provided at the toothbrush head 410.

Meanwhile, although FIG. 37 shows that the first protrusion 412 is formed at an outer line of the toothbrush head 410, it is needless to say that it may be located at a position recessed into a predetermined inner side as shown in FIG. 36.

In addition, the elastic rotation restoring part 450 may have a shape corresponding to the shape of (b) of FIG. 36 or a shape corresponding to the shape of (c) of FIG. 36, as described above, according to a manufacturing method thereof.

The elastic rotation restoring part 450 may have a groove into which the first protrusion 412 is inserted. For another example, the first protrusion 412 may be provided at a radial outer circumferential surface of the elastic rotation restoring part 450. In this case, at least a portion of the elastic rotation restoring part 450 may be surrounded by the first protrusion 412 according to the shape of the first protrusion 412. It goes without saying that the first protrusion 412 may entirely surround the outer circumferential surface of the elastic rotation restoring part 450.

In addition, the elastic rotation restoring part 450 may have a groove into which the second protrusion 422 is inserted.

Hereinafter, another modified embodiment will be described with reference to FIG. 38. Only differentiated configurations will be described, and duplicate descriptions will be omitted.

Referring to FIG. 38, a first protrusion 412 may be provided at one end of the toothbrush head 410 of the elastic toothbrush according to one embodiment of the present invention, and a second protrusion 422 may be provided at one end of the toothbrush handle 420.

According to one example, the second protrusion 422 may extend from the toothbrush handle 420 in the Z-axis direction, which is the direction of the toothbrush head 410. The first protrusion 412 may be spaced apart from the second protrusion 422 in the X-axis and/or Y-axis directions and may protrude toward the toothbrush handle 420.

According to one example, the first and second protrusions 412 and 422 may overlap each other when viewed in the direction A of FIG. 38. Furthermore, in addition to the second protrusion 422, an auxiliary protrusion facing the first protrusion 412 and not overlapping with the same in the direction A may be provided at one end of the toothbrush handle 420.

According to one example, referring to a cross-sectional shape (that is, an XY plane shape) at a position V of FIG. 38, the first protrusion 412 may have a circular cylindrical shape. The first protrusion 412 may have an arc shape instead of a circle.

In this case, an auxiliary protrusion 424 may be provided at one side of the second protrusion 422. The auxiliary protrusion 424 may have a shape of a wheel (not shown, but a disk shape, other filled surface shapes, and a hollow surface shape are also available) as shown in the XZ plane (assuming that the bristles are also implanted in the XZ plane) or the YZ plane. Thus, an elastic rotational force in the Z-axis direction may be more easily transmitted to the toothbrush head 410.

As described above, a sawtooth part may be provided on the first and second protrusions 412 and 422 and the auxiliary protrusion 424 to provide a predetermined roughness. This is also to increase a contact area with the elastic rotation restoring part.

In addition, at least one of the first and second protrusions 412 and 422 and the auxiliary protrusion 424 may be omitted. Furthermore, the positions may be opposite. In other words, the shape of the first protrusion 412 may be provided at the toothbrush handle 420, and the shape of the second protrusion 422 and the auxiliary protrusion 424 may be provided at the toothbrush head 410.

Meanwhile, although FIG. 38 shows that the first protrusion 412 is formed at an outer line of the toothbrush head 410, it is needless to say that it may be located at a position recessed into a predetermined inner side as shown in FIG. 36.

In addition, the elastic rotation restoring part 450 may have a shape corresponding to the shape of (b) of FIG. 36 or a shape corresponding to the shape of (c) of FIG. 36, as described above, according to a manufacturing method thereof.

In addition, the shape of the auxiliary protrusion shown in FIG. 38 may have a three-dimensional spherical shape by combining with the shape of the auxiliary protrusion described with reference to FIG. 37. Unlike this, it goes without saying that it may have a three-dimensional shape such as a tetrahedron, a hexahedron or the like.

The elastic rotation restoring part 450 may have a groove into which the first protrusion 412 is inserted. For another example, the first protrusion 412 may be provided at a radial outer circumferential surface of the elastic rotation restoring part 450. In this case, at least a portion of the elastic rotation restoring part 450 may be surrounded by the first protrusion 412 according to the shape of the first protrusion 412. It goes without saying that the first protrusion 412 may entirely surround the outer circumferential surface of the elastic rotation restoring part 450.

In addition, the elastic rotation restoring part 450 may have a groove into which the second protrusion 422 is inserted.

Hereinafter, another modified embodiment will be described with reference to FIG. 39. Only differentiated configurations will be described, and duplicate descriptions will be omitted.

Referring to FIG. 39, a first protrusion 412 may be provided at one end of the toothbrush head 410 of the elastic toothbrush according to one embodiment of the present invention, and a second protrusion 422 may be provided at one end of the toothbrush handle 420.

According to one example, the second protrusion 422 may extend from the toothbrush handle 420 in the Z-axis direction, which is the direction of the toothbrush head 410. The first protrusion 412 may be spaced apart from the second protrusion 422 in the X-axis and/or Y-axis directions and may protrude toward the toothbrush handle 420.

According to one example, the first and second protrusions 412 and 422 may overlap each other when viewed in the direction A of FIG. 39. The first and second protrusions 412 and 422 may not overlap each other when viewed from the Z axis. The first and second protrusions 412 and 422 may have a plate shape or an arc shape when viewed from the Z axis. In this case, it may be assumed that the direction of implanting the bristles is the X-axis direction. However, the technical idea of the present embodiment may be applied even when the direction of implanting bristles is the Y-axis direction.

Furthermore, a first auxiliary protrusion 414 and a second auxiliary protrusion 424 may be provided at one side of the first and second protrusions 412 and 422. The first auxiliary protrusion 414 and the second auxiliary protrusion 424 may perform a function of limiting a degree of freedom other than the degree of freedom of rotation around the Z axis. The first auxiliary protrusion 414 and the second auxiliary protrusion 424 may or may not overlap each other in the direction A. A hole may be provided inside at least one of the first auxiliary protrusion 414 and the second auxiliary protrusion 424. The hole may increase a contact area between the auxiliary protrusion and the elastic rotation restoring part. In addition, as described above, a sawtooth uneven surface may be provided to increase a contact area.

In addition, the elastic rotation restoring part 450 may have a shape corresponding to the shape of (b) of FIG. 36 or a shape corresponding to the shape of (c) of FIG. 36, as described above, according to a manufacturing method thereof.

In addition, the elastic rotation restoring part 450 may have a groove into which the first protrusion 412 is inserted. For another example, the first protrusion 412 may be provided at a radial outer circumferential surface of the elastic rotation restoring part 450. In this case, at least a portion of the elastic rotation restoring part 450 may be surrounded by the first protrusion 412 according to the shape of the first protrusion 412.

In addition, the elastic rotation restoring part 450 may have a groove into which the second protrusion 422 is inserted.

In this case, a first groove portion into which the first and second protrusion portions 412 and 422 may be inserted may be provided at an outer circumferential surface (that is, a radial outer surface) of the elastic rotation restoring part 450. Further, a second groove into which the first auxiliary protrusion 414 and the second auxiliary protrusion 424 may be inserted may be provided at an outer circumferential surface of the elastic rotation restoring part 450.

Hereinafter, embodiment will be described with reference to FIG. 40. Only differentiated configurations will be described, and duplicate descriptions will be omitted.

Referring to FIG. 40, a first protrusion 412 may be provided at one end of the toothbrush head 410 (bristles not shown) of the elastic toothbrush according to one embodiment of the present invention, and a second protrusion 422 may be provided at one end of the toothbrush handle 420.

According to one example, the second protrusion 422 may extend from the toothbrush handle 420 in the Z-axis direction, which is the direction of the toothbrush head 410. The first protrusion 412 may be spaced apart from the second protrusion 422 in the X-axis and/or Y-axis directions and may protrude toward the toothbrush handle 420.

According to one example, the first and second protrusions 412 and 422 may overlap each other during assembling when viewed in the direction A of FIG. 40. The first and second protrusions 412 and 422 may not overlap each other when viewed from the Z axis. The first and second protrusions 412 and 422 may have a plate shape or an arc shape when viewed from the Z axis. In this case, it may be assumed that the direction of implanting the bristles is a radial direction.

Furthermore, a first auxiliary protrusion 414 and a second auxiliary protrusion 424 may be provided at one side of the first and second protrusions 412 and 422. The first auxiliary protrusion 414 and the second auxiliary protrusion 424 may perform a function of limiting a degree of freedom other than the degree of freedom of rotation around the Z axis. The first auxiliary protrusion 414 and the second auxiliary protrusion 424 may or may not overlap each other in the direction A. A hole may be provided inside at least one of the first auxiliary protrusion 414 and the second auxiliary protrusion 424. The hole may increase a contact area between the auxiliary protrusion and the elastic rotation restoring part. In addition, as described above, a sawtooth uneven surface may be provided to increase a contact area.

In addition, the elastic rotation restoring part 450 may have a shape corresponding to the shape of (b) of FIG. 36 or a shape corresponding to the shape of (c) of FIG. 36, as described above, according to a manufacturing method thereof.

The elastic rotation restoring part 450 may have at least one groove 452. The second auxiliary protrusions 414 and 424 may be coupled to the groove 452. The arc-shaped first and second protrusions 412 and 42 may support an outer circumferential surface of the elastic rotation restoring part 450. In this case, the outer circumferential surfaces of the arc shapes of the first and second protrusions 412 and 42 may be in contact with the elastic rotation restoring part so as not to allow a relative movement, or may be simply disposed so as to allow the relative movement.

Furthermore, as shown in a rightmost side of FIG. 40, one of the toothbrush head 410 and the toothbrush handle 420 may have a shape in which a groove having a predetermined depth is formed therein. In this case, the elastic rotation restoring part 450 may be inserted into the groove (in the Z-axis direction). This shape may be understood as a shape in which the first and/or second protrusions described with reference to FIG. 36 and the like entirely surround the elastic rotation restoring part 450.

In addition, even when the shape shown at a right side of FIG. 40 is adopted as at least one of the toothbrush head 410 and the toothbrush handle 420, the above-described protrusion may be further provided, and an auxiliary protrusion may also be further provided. Alternatively, the protrusion may be omitted, and only the auxiliary protrusion may be provided. For example, the toothbrush head 410 may be provided with a protrusion and an auxiliary protrusion at a rightmost drawing of FIG. 40, and the toothbrush handle 420 may be provided with only the auxiliary protrusion on the rightmost drawing of FIG. 40.

In addition, according to one example, the number of the grooves 452 of the elastic rotation restoring part may be at least one or more to correspond to the number of the auxiliary protrusions.

Hereinafter, another modified embodiment of the present invention will be described with reference to FIG. 41. Only differentiated configurations will be described, and duplicate descriptions will be omitted. This modified embodiment may differ from other embodiments in that the toothbrush head may be attached to and detached from the toothbrush handle.

Referring to (a) of FIG. 41, the modified embodiment may include a toothbrush head 410, a toothbrush handle 420, and an elastic rotation restoring part 450 therebetween.

A fastening part 460 for attaching and detaching the toothbrush handle 420 may be provided at one side of the toothbrush head 410. According to one example, the fastening part 460 may include two protrusions 462 and 464 like chopsticks.

The fastening part 460 may pass through an inner side of the elastic rotation restoring part 450 to be coupled to the toothbrush handle 420.

Referring to (b) of FIG. 41, the elastic rotation restoring part 450 and the toothbrush handle 420 may have a predetermined opening for fastening the fastening part 460. A width D1 of the opening of the elastic rotation restoring part 450 and a width D2 of the opening of the toothbrush handle 420 may be greater than that of the protrusions 462 and 464.

Meanwhile, when twist occurs for a toothbrush rotation method, the twist may occur due to rotation R between the protrusions 462 and 464, as shown in (d) of FIG. 41. In other words, a predetermined angle may occur between a virtual line B extending from one end of the protrusions 462 and 464 and a virtual line A extending from the other end of the protrusions 462 and 464. As the occurrence of the angle between one end and the other end of the protrusions 462 and 464 is restored, a strong toothbrush rotational force may be generated. In this case, the elastic rotation restoring part 450 may provide a restoring force so that the angle between one end and the other end of the protrusions 462 and 464 may be quickly restored. Furthermore, in order to form the generated angle, as shown in (c) of FIG. 41, which is a cross-sectional view taken along line C of (b) of FIG. 41, a twist path 425 may be provided in the circumferential direction of the toothbrush handle 420 so that the protrusions 462 and 464 inside the toothbrush handle 420 may rotate in the direction R. In addition, a block 427 may be provided to block a path of the twist path 425 to prevent an excessive twist. In addition, an opening inside the elastic rotation restoring part 450 may also have a shape such that the twist angle may occur. For example, the opening may have an 11-lettered shape to accommodate the fastening part 460, and may also have a spiral-shaped opening to generate the twist angle. In addition, when the twist angle is a predetermined angle or more, an opening shape may be provided so that a restoring force may be generated. Meanwhile, it may be needless to say that the twisted path part 425 and the block part 427 may be omitted.

In the modified embodiment described with reference to FIG. 41, the toothbrush handle 410 and the fastening part 460 may be integrally manufactured.

In addition, in the modified embodiment described with reference to FIG. 41, the elastic rotation restoring part 450 and the toothbrush handle 420 may be manufactured by the above-described double injection-molding or insert injection-molding process.

As described above, the elastic rotation restoring part 450 may be made of a more flexible material than that of the toothbrush handle 410, the fastening part 460, and the toothbrush handle 420. In addition, the protrusions 462 and 464 of the fastening part 460 may be made of a material which forms the twist angle described with reference to (d) of FIG. 41 and minimizes an undesired degree of freedom.

Meanwhile, in order to smoothly generate the twist angle of the fastening part 460, the fastening part 460 may also be made of a somewhat more flexible material than that of the toothbrush head 410 like the elastic rotation restoring part 450. In this case, the fastening part 460 and the toothbrush head 410 may be manufactured by a double injection-molding or insert process.

In a modified embodiment with reference to FIG. 41, it may be assumed that one end of the fastening part 460 may be fastened to the toothbrush handle 450, but alternatively may be fastened to the elastic rotation restoring part 450.

Meanwhile, the number of protrusions 462 and 464 may be one instead of two as shown in the drawing, or may be three or more. In the case of one, the protrusion may be located at the center.

Hereinafter, a modified embodiment in which the technical idea of the present invention is applied to a molar toothbrush (molar elastic toothbrush) will be described with reference to FIG. 42. Only differentiated configurations will be described, and duplicate descriptions will be omitted.

Referring to (a) of FIG. 42, the molar elastic toothbrush according to one embodiment of the present invention may include a toothbrush head 410, a toothbrush handle 420, and an elastic rotation restoring part 450 therebetween.

In the present modified embodiment, the bristles B may be provided at one end of the toothbrush head 410, and the bristles B may be implanted in a narrow area so as to serve as a common molar toothbrush. The molar toothbrush may be referred to link http://item.gmarket.co.kr/Item?good-scode=859705121.

(b) of FIG. 42 may show a state in which the elastic rotation restoring part 450 is not shown. For reference, the elastic rotation restoring part 450 may be provided between the toothbrush head 410 and the toothbrush handle 420. Furthermore, the elastic rotation restoring part 450 may be provided to surround at least one outer circumferential surface between an outer circumferential surface of at least one end of the toothbrush head 410 and an outer circumferential surface of at least one end of the toothbrush handle 420.

(c) of FIG. 42 may show a case in which the elastic rotation restoring part 450 is not shown, and a first protrusion 412 is provided at one end of the toothbrush head 410 and a second protrusion 422 is provided at one end of the toothbrush handle 420. This is to enable rotation and restoration in an R direction of (a) of FIG. 42 and limit a degree of freedom in the other direction.

(d) of FIG. 42 shows a case in which the elastic rotation restoring part 450 is not shown, and a first protrusion 412 is provided at one end of the toothbrush head 410 and a second protrusion 422 is provided at one end of the toothbrush handle 420. This is to enable rotation and restoration in an R direction of (a) of FIG. 42 and limit a degree of freedom in the other direction. In this case, in the molar elastic toothbrush according to the present modified embodiment, one end of at least one of the first protrusion 412 and the second protrusion 422 may be formed to be inclined, considering that the toothbrush head 410 forms a predetermined angle from an extension line of the toothbrush handle 420.

In the modified embodiments described with reference to (c) of FIG. 42 and (d) of FIG. 42, the shapes of the first and second protrusions may vary, but is not limited thereto.

In addition, as shown in (e) of FIG. 42, the toothbrush head 410 may have a bent structure, the toothbrush handle 420 may be spaced apart therefrom, and an elastic rotation restoring part (not shown) may be provided therebetween. In this case, the technical idea of the embodiment described above with reference to FIGS. 1 to 41 may be applied.

FIG. 43 is a view for explaining still another modified embodiment of the present invention. Only differentiated configurations will be described, and duplicate descriptions will be omitted.

Referring to (a) of FIG. 43 and (b) of FIG. 43, the elastic toothbrush according to one embodiment of the present invention may include a toothbrush head 410, a toothbrush handle 420, and a first elastic rotation restoring part 452 therebetween.

For reference, (a) of FIG. 43 shows a plane and (b) of FIG. 43 shows a side.

As shown in (c) of FIG. 43, the first elastic rotation restoring part 452 may have a thin plate-shaped structure having a somewhat wide width W and a small thickness D. It may be disposed with the width facing a plane, or with the width facing a side.

The first elastic rotation restoring part 452 may have a wide and thin plate-shaped structure, and thus storage and release of torsional (R) elastic energy may be possible.

According to one example, the first elastic rotation restoring part 452 may have a thin thickness to enable a longitudinal axis torsional deformation. For example, the thickness of the first elastic rotation restoring part 452 may be 0.1 mm to 1.2 mm. More specifically, blades may have any thickness of 0.2 mm, 0.3 mm, 0.4 mm, 0.5 mm, 0.6 mm, 0.7 mm, 0.8 mm, 0.9 mm, 1.0 mm, 1.1 mm, and 1.2 mm. This is an example, and any thickness which may enable torsional deformation with respect to a longitudinal axis of the toothbrush may be possible.

In other words, even if the first elastic rotation restoring part 452 is formed of plastic, when it has a thin plate-shaped structure, there may occur a torsional deformation in which it is twisted with respect to the longitudinal axis of the toothbrush, and thus torsional elastic energy may be stored and released. One end of the first elastic rotation restoring part 452 may be defined as A in (c) of FIG. 43, and the other end thereof may be defined as (c) of FIG. 43. In this case, (d) of FIG. 43 is a view for explaining a twisted phase of the first elastic rotation restoring part 452 in the area A and the area B upon the occurrence of twist when viewed from the direction F. As shown, a torsional twist angle may occur, for example, at a degree of 90 in the area B compared to the area A.

Subsequently, referring to V1 in (c) of FIG. 43, the first elastic rotation restoring part 452 may have a point having a thickness D which is not constant in the longitudinal direction (from the toothbrush head to the toothbrush handle) and which is somewhat thin, such as D'. This is to more smoothly twist the first elastic rotation restoring part 452. Of course, the thickness of the first elastic rotation restoring part 452 in the longitudinal direction may be constant. In such a technical idea, the widths of the first elastic rotation restoring part 452 may be different in the longitudinal direction.

Referring to V2 in (c) of FIG. 43, the first elastic rotation restoring part 452 may further have a leg 453. The leg 453 may be disposed on one side, for example, a lower end of the first elastic rotation restoring part 452 in the longitudinal direction. Accordingly, the first elastic rotation restoring part 452 may have a laid U shape. This is to generate a strong restoring force after twisting.

Referring to (e) of FIG. 43, a second elastic rotation restoring part 454 may be provided at a surface of the first elastic rotation restoring part 452. One end and the other end of the second elastic rotation restoring part 454 may surround at least a portion of one end of the toothbrush head 410 and at least a portion of one end of the toothbrush handle 420. Of course, it may not be surrounded.

In the modified embodiment described with reference to FIG. 43, the first elastic rotation restoring part 452 may be integrally formed with at least one of the toothbrush head 410 and the toothbrush handle 420. For example, the first elastic rotation restoring part 452, the toothbrush head 410, and the toothbrush handle 420 may be manufactured through a single injection-molding process. From another point of view, the first elastic rotation restoring part 452 may be made of the same material as that of the toothbrush head 410 and the toothbrush handle 420, for example, plastic or an eco-friendly material. In other words, even though the first elastic rotation restoring part 452 is made of plastic, the part may have a wide and thin plate-like shape, and thus may be twisted and restored.

The second elastic rotation restoring part 454 may be made of a material, for example, a thermoplastic resin-based material, a rubber-based material, a silicone-based material, or a polymer-based material, which is more flexible than that of the first elastic rotation restoring part 452, the toothbrush head 410, and the toothbrush handle 420. In other words, the above-described double injection-molding or insert process may be used to manufacture the second elastic rotation restoring part 454.

The technical idea may be applied to the molar toothbrush described with reference to FIG. 42.

Meanwhile, although it has been described under the assumption that the number of the first elastic rotation restoring part 452 is one, it goes without saying that it may be plural.

In addition, this technical matter may be applicable to a method in which the toothbrush head 410 is detached from the toothbrush handle 420. As shown in FIG. 44, the first elastic rotation restoring part 452 may be provided at the side of the toothbrush head 410, and the second elastic rotation restoring part 454 may be provided at the side of the toothbrush handle 420. In this case, the first elastic rotation restoring part 452 may be fitted into the second elastic rotation restoring part 454 so as to be coupled to the second elastic rotation restoring part 454, or may pass through the second elastic rotation restoring part 454 so as to be coupled to the toothbrush handle 420.

Meanwhile, for robustness, as shown in FIG. 44, an end toothbrush handle 422 may be further provided. The end toothbrush handle 422 may be made of the same material as the toothbrush handle 420. Although not shown, the end toothbrush handle 422 and the toothbrush handle 420 may be connected via a connection part for connecting both thereof. The connection part may be made of the same material as that of the end toothbrush handle 422 and the toothbrush handle 420 by the same injection-molding process. The connection part may hold the end toothbrush handle 422 and the toothbrush handle 420 as a single body during the injection-molding process, thereby facilitating a double injection-molding process of the second elastic rotation restoring part 454. In other words, when the end toothbrush handle 422 and the toothbrush handle 420 are formed as two bodies during the injection-molding process, it may be possible to solve the difficulty of the double injection-molding design and step.

In this case, a path of the end toothbrush handle 422 through which the first elastic rotation restoring part 452 passes may be wider than that of the second elastic rotation restoring part 454.

In the description of FIG. 44, it may be assumed that the first elastic rotation restoring part is disposed on the toothbrush head, but alternatively may be disposed on the side of the toothbrush handle. In addition, it may be assumed that the first elastic rotation restoring part is disposed on the toothbrush head, but alternatively may be disposed on the side of the toothbrush head.

FIG. 45 is a view for explaining an elastic toothbrush according to another embodiment of the present invention. Only differentiated configurations will be described, and duplicate descriptions will be omitted.

Referring to FIG. 45, the elastic toothbrush according to one embodiment of the present invention may include a toothbrush head 410, a toothbrush handle 420, and a first elastic rotation restoring part 452 therebetween. In the embodiment described with reference to FIG. 45, it may be assumed that the technical idea of the present invention is applied to the molar toothbrush, but may be applied to a general toothbrush.

As shown in FIG. 45, the first elastic rotation restoring part 452 may have a plate-shaped structure which is somewhat narrow and thick. It can be seen that the thickness and width directions of the plate shape are different from those of the embodiment described with reference to FIG. 43.

According to one example, the first elastic rotation restoring part 452 may have a thin thickness to enable a longitudinal axis torsional deformation. For example, the thickness of the first elastic rotation restoring part 452 may be 0.1 mm to 1.2 mm. More specifically, blades may have any thickness of 0.2 mm, 0.3 mm, 0.4 mm, 0.5 mm, 0.6 mm, 0.7 mm, 0.8 mm, 0.9 mm, 1.0 mm, 1.1 mm, and 1.2 mm. This is an example, and any thickness which may enable torsional deformation with respect to a longitudinal axis of the toothbrush may be possible.

The first elastic rotation restoring part 452 may have a somewhat wide and thin plate-shaped structure, and thus storage and release of torsional elastic energy may be possible. Torsional deformation may occur with respect to the longitudinal axis of the toothbrush, and thus torsional elastic energy may be stored and released. This may be the same as described above with reference to (c) of FIG. 43 and (d) of FIG. 43.

Furthermore, the first elastic rotation restoring part 452 described with reference to FIG. 45 may further include the leg described with reference to V2 in FIG. 43.

In addition, a hole may be provided at the first elastic rotation restoring part 452.

For a more detailed description, reference will be made to FIG. 47. Referring to FIG. 47 (showing a side view of the elastic toothbrush shown in FIG. 45, without considering a color), it can be seen that the hole 452h is provided at the first elastic rotation restoring part 452. The size and position of the hole 452h may be determined in consideration of the ease of twisting of the first elastic rotation restoring part 452, the magnitude of the restoring force, and the ease of manufacture. According to one example, as shown in (a) of FIG. 47, the hole 452h may be provided in a longitudinal direction of the elastic toothbrush, and the first elastic rotation restoring part 452 may be two branches, that is, an upper branch and a lower branch. In other words, the first elastic rotation restoring part 452 may be divided into two types by the hole 452h. Unlike this, the first elastic rotation restoring part 452 may be composed of three or more branches. Further, as shown in (b) of FIG. 47, a plurality of holes 452h may be provided in a longitudinal direction of the elastic toothbrush. For reference, a coupling force between the first elastic rotation restoring part 452 and the second elastic rotation restoring part, which will be described later, may be improved by the hole 452h.

As described above with reference to (e) of FIG. 43, a second elastic rotation restoring part 454 may be provided at a surface of the first elastic rotation restoring part 452. One end and the other end of the second elastic rotation restoring part 454 may surround at least a portion of one end of the toothbrush head 410 and at least a portion of one end of the toothbrush handle 420. Of course, it may not be surrounded.

FIG. 47 shows an example of the second elastic rotation restoring part 452. Referring to FIG. 47, a predetermined pattern may be formed at the outside of the second elastic rotation restoring part 454 so that the first elastic rotation restoring 452 may be deformed when twisted or untwisted. A hole corresponding to the shape and size of the first elastic rotation restoring part 452 may be provided inside the second elastic rotation restoring part 454 so as to surround at least a portion of the first elastic rotation restoring part 452.

In the modified embodiment described with reference to FIG. 45, the first elastic rotation restoring part 452 may be integrally formed with at least one of the toothbrush head 410 and the toothbrush handle 420. For example, the first elastic rotation restoring part 452, the toothbrush head 410, and the toothbrush handle 420 may be manufactured through a single injection-molding process. From another point of view, the first elastic rotation restoring part 452 may be made of the same material as that of the toothbrush head 410 and the toothbrush handle 420, for example, plastic. In other words, even though the first elastic rotation restoring part 452 is made of plastic, the part may have a wide and thin plate-like shape, and thus may be twisted and restored.

The second elastic rotation restoring part 454 may be made of a material, for example, a thermoplastic resin-based material, a rubber-based material, a silicone-based material, or a polymer-based material, which has a greater strain rate against an external force than that of the first elastic rotation restoring part 452, the toothbrush head 410, and the toothbrush handle 420, that is, a flexible material. In other words, the above-described double injection-molding or insert process may be used to manufacture the second elastic rotation restoring part 454.

The present technical idea may be applied without limitation to a molar toothbrush, a general toothbrush, etc.

In addition, this technical matter may be applicable to a method in which the toothbrush head 410 is detached from the toothbrush handle 420. This may be the same as described with reference to FIG. 44. In addition, for robustness, as described with reference to FIG. 44, an end toothbrush handle 422 may be further provided. The end toothbrush handle 422 may be made of the same material as the toothbrush handle 420. Although not shown, the end toothbrush handle 422 and the toothbrush handle 420 may be connected via a connection part for connecting both thereof. The connection part may be made of the same as that of the end toothbrush handle 422 and the toothbrush handle 420 by the same injection-molding process. The connection part may hold the end toothbrush handle 422 and the toothbrush handle 420 as a single body during the injection-molding process, thereby facilitating a double injection-molding process of the second elastic rotation restoring part 454. In other words, when the end toothbrush handle 422 and the toothbrush handle 420 are formed as two bodies during the injection-molding process, it may be possible to solve the difficulty of the double injection-molding design and step.

In this case, a path of the end toothbrush handle 422 through which the first elastic rotation restoring part 452 passes may be wider than that of the second elastic rotation restoring part 454.

In the description of FIG. 44, it may be assumed that the first elastic rotation restoring part is disposed on the toothbrush head, but alternatively may be disposed on the side of the toothbrush handle. In addition, it may be assumed that the first elastic rotation restoring part is disposed on the toothbrush head, but alternatively may be disposed on the side of the toothbrush head.

(a) of FIG. 46 shows that the first elastic rotation restoring part 452 according to FIG. 45 is formed of two branches. For reference, an upper end of (a) of FIG. 46 is an overall perspective view, and a lower end shows an enlarged view. Although a molar toothbrush is exemplified in an example with reference to (a) of FIG. 46, it goes without saying that it may be applied to a general toothbrush and other various fields.

As shown in (a) of FIG. 46, the first elastic rotation restoring part 452 may include two branches extending in the longitudinal direction. In this case, in order to reinforce strength, two branches extending in the longitudinal direction may be connected to each other by a connection bar. An injection-molded product source inlet may be located at one side of the connection bar. Accordingly, it may be possible to easily inject the injection-molded product source. In addition, in order to reinforce strength, two branches extending in the longitudinal direction may be provided with a reinforcing rib facing one side (the outside or the inside as shown).

Other descriptions are the same as those described with reference to FIGS. 45, 47 (hole 452h), and 48 (second elastic rotation restoring part 454), and thus a description thereof will be omitted.

FIGS. 49A and 49B is a view for explaining an elastic toothbrush according to another embodiment of the present invention. Only differentiated configurations will be described, and duplicate descriptions will be omitted.

Referring to FIGS. 49A and 49B, the elastic toothbrush according to one embodiment of the present invention may include a toothbrush head 410, a toothbrush handle and a 420, first elastic rotation restoring part 452 therebetween. In the embodiment described with reference to FIGS. 49A and 49B, it may be assumed that the technical idea of the present invention is applied to the molar toothbrush, but may be applied to a general toothbrush.

As shown in FIG. 49A and FIG. 49B (with FIG. 49B showing a longitudinal cross-section of the elastic rotation restoring part 452 in FIG. 49A), the first elastic rotation restoring part 452 may have a cross-section having a "+" shape. In addition, according to one example, referring to (b) of FIG. 49B showing a cross-section of the first elastic rotation restoring part 452 in the direction of an arrow in (a) of FIG. 49B, the first elastic rotation restoring part 452 may be provided in a direction of a coordinate system, and the first elastic rotation restoring part 452 may be provided in a direction inclined at a degree of 45 with respect to the coordinate system. Besides, a blade direction of the elastic rotation restoring part 452 may vary. In addition, according to one example, the first elastic rotation restoring part 452 may be formed of two plate shapes, but alternatively may be formed of three or more plate shapes. In other words, in the case of two plate shapes, there may be four blades, and in addition, 5, 6, 7, 8, 9, 10, etc. blades may be provided.

According to one example, the first elastic rotation restoring part 452 may have a thin thickness to enable a longitudinal axis torsional deformation. For example, the thickness of each blade may be 0.1 mm to 1.2 mm. More specifically, blades may have any thickness of 0.2 mm, 0.3 mm, 0.4 mm, 0.5 mm, 0.6 mm, 0.7 mm, 0.8 mm, 0.9 mm, 1.0 mm, 1.1 mm, and 1.2 mm. This is an example, and any thickness which may enable torsional deformation with respect to a longitudinal axis of the toothbrush may be possible.

The first elastic rotation restoring part 452 may have a plate-like "+" cross-sectional shape, and thus storage and release of torsional elastic energy may be possible. This may be the same as described above with reference to (c) of FIG. 43 and (d) of FIG. 43. In other words, the first elastic rotation restoring part 452 may have a plate-like "+" cross-sectional shape, and thus it may be possible to maintain the shape without being deformed even when an external force is applied, as shown in FIG. 49B. In other words, even if the first elastic rotation restoring part 452 is minimally deformed in an unintended direction, there may occur a torsional deformation in which it is twisted with respect to the longitudinal axis of the toothbrush, and thus torsional elastic energy may be stored and released.

According to one example, in order to increase rigidity against an external force, a thickness of the plate-like "+" cross-sectional shape of the first elastic rotation restoring part 452 may vary depending on a direction. For example, at least one of the blades in a direction parallel to the bristles may be thicker than the blade in the other direction.

In addition, a hole may be provided at the first elastic rotation restoring part 452. This may be the same as described with reference to FIG. 46.

As described above with reference to (e) of FIG. 43, a second elastic rotation restoring part 454 may be provided at a surface of the first elastic rotation restoring part 452. One end and the other end of the second elastic rotation restoring part 454 may surround at least a portion of one end of the toothbrush head 410 and at least a portion of one end of the toothbrush handle 420. Of course, the second elastic rotation restoring part 454 may be omitted.

According to one example, at least one hole may be provided in the first elastic rotation restoring part 452 along a longitudinal direction of the first elastic rotation restoring part 452. For example, three holes may be provided. The second elastic rotation restoring part 454 may be provided in the hole. When the first elastic rotation restoring part 452 is made of a material harder than that of the second elastic rotation restoring part 454, that is, when the first elastic rotation restoring part 452 is made of plastic and the second elastic rotation restoring part 454 is made of a rubber material, deformation may occur in a hole shape of the first elastic rotation restoring part 452, if the first elastic rotation restoring part 452 is twisted by the rotation method of brushing. When the second elastic rotation restoring part 454 is provided inside the hole of the first elastic rotation restoring part 452, the second elastic rotation restoring part 454 may also be deformed by the deformation of the hole shape. In other words, the second elastic rotation restoring part 454 may be compressively deformed, and the second elastic rotation restoring part 454 may also provide a restoring force while the compressively deformed shape is restored. To this end, the second elastic rotation restoring part 454 may be provided in a dot shape to fill only the hole of the first elastic rotation restoring part 452, and may be disposed to cover other portions other than the hole. This example may be applied not only to a case in which the first elastic rotation restoring part 452 has a "+" shaped cross section, but also to a case in which it has one branch shape as described with reference to FIGS. 43, 44, and 45, and a case in which it has two parallel branch shapes as described with reference to FIG. 46.

Meanwhile, the second elastic rotation restoring part 454 may have an uneven shape on a surface as shown in FIG. 48, for example, a mesh structure. However, the first elastic rotation restoring part 452 may have a "+" shaped cross section, and thus the second elastic rotation restoring part 454 may be formed at an angled portion of the "+" shape.

In the modified embodiment described with reference to FIGS. 49A and 49B, the first elastic rotation restoring part 452 may be integrally formed with at least one of the toothbrush head 410 and the toothbrush handle 420. For example, the first elastic rotation restoring part 452, the toothbrush head 410, and the toothbrush handle 420 may be manufactured through a single injection-molding process. From another point of view, the first elastic rotation restoring part 452 may be made of the same material as that of the toothbrush head 410 and the toothbrush handle 420, for example, plastic. In other words, even though the first elastic rotation restoring part 452 is made of plastic, as shown in FIGS. 49A and 49B, the part may have a thin "+" cross-sectional shape, and thus may be twisted and restored. According to one example, the first elastic rotation restoring part 452, the toothbrush head 410, and the toothbrush handle 420 may be made of at least one material of eco-friendly plastics, biodegradable materials, and metals.

The second elastic rotation restoring part 454 may be made of a material, for example, a thermoplastic resin-based material, a rubber-based material, a silicone-based material, or a polymer-based material, which has a greater strain rate against an external force than that of the first elastic rotation restoring part 452, the toothbrush head 410, and the toothbrush handle 420, that is, a flexible material. In other words, the above-described double injection-molding or insert process may be used to manufacture the second elastic rotation restoring part 454.

The present technical idea may be applied without limitation to a molar toothbrush, a general toothbrush, etc.

In addition, this technical matter may be applicable to a method in which the toothbrush head 410 is detached from the toothbrush handle 420. This may be the same as described with reference to FIG. 44. In addition, for robustness, as described with reference to FIG. 44, an end toothbrush handle 422 may be further provided. The end toothbrush handle 422 may be made of the same material as the toothbrush handle 420. Although not shown, the end toothbrush handle 422 and the toothbrush handle 420 may be connected via a connection part for connecting both thereof. The connection part may be made of the same material as that of the end toothbrush handle 422 and the toothbrush handle 420 by the same injection-molding process. The connection part may hold the end toothbrush handle 422 and the toothbrush handle 420 as a single body during the injection-molding process, thereby facilitating a double injection-molding process of the second elastic rotation restoring part 454. In other words, when the end toothbrush handle 422 and the toothbrush handle 420 are formed as two bodies during the injection-molding process, it may be possible to solve the difficulty of the double injection-molding design and step.

In this case, a path of the end toothbrush handle 422 through which the first elastic rotation restoring part 452 passes may be wider than that of the second elastic rotation restoring part 454.

In the description of FIG. 44, it may be assumed that the first elastic rotation restoring part is disposed on the toothbrush head, but alternatively may be disposed on the side of the toothbrush handle. In addition, it may be assumed that the first elastic rotation restoring part is disposed on the toothbrush head, but alternatively may be disposed on the side of the toothbrush head.

FIG. 50 shows another embodiment of the present invention. Only differentiated configurations will be described, and duplicate descriptions will be omitted.

Referring to FIG. 50, the elastic toothbrush according to one embodiment of the present invention may include a toothbrush head 410, a toothbrush handle 420, a first elastic rotation restoring part 452 therebetween, and a second elastic rotation restoring part 454 surrounding at least a portion of the first elastic rotation restoring part 452. The second elastic rotation restoring part 454 may be omitted.

In the embodiment described with reference to FIG. 50, it may be assumed that the technical idea of the present invention is applied to a common toothbrush, but may be applied to a molar toothbrush.

As described with reference to FIGS. 49A and 49B, the first elastic rotation restoring part 452 may have a "+" shaped cross section in the longitudinal direction. In this case, the "+" shape of the first elastic rotation restoring part 452 may be provided to be increased toward the toothbrush handle 420. Torsional deformation may occur with respect to the longitudinal axis of the toothbrush, and thus torsional elastic energy may be stored and released.

According to one example, the first elastic rotation restoring part 452 may have a thin thickness to enable a longitudinal axis torsional deformation. For example, the thickness of the first elastic rotation restoring part 452 may be 0.1 mm to 1.2 mm. More specifically, blades may have any thickness of 0.2 mm, 0.3 mm, 0.4 mm, 0.5 mm, 0.6 mm, 0.7 mm, 0.8 mm, 0.9 mm, 1.0 mm, 1.1 mm, and 1.2 mm. This is an example, and any thickness which may enable torsional deformation with respect to a longitudinal axis of the toothbrush may be possible.

The first elastic rotation restoring part 452 may be formed of two plate shapes, but alternatively may be formed of three or more plate shapes.

In addition, a hole may be provided at the first elastic rotation restoring part 452. This may be the same as described with reference to FIG. 47. In addition, as in the example described with reference to FIGS. 49A and 49B, at least one hole may be provided, and the second elastic rotation restoring part may provide a restoring force after the compressive deformation.

The second elastic rotation restoring part 454 may be provided at a surface of the first elastic rotation restoring part 452. One end and the other end of the second elastic rotation restoring part 454 may surround at least a portion of one end of the toothbrush head 410 and at least a portion of one end of the toothbrush handle 420. Of course, the second elastic rotation restoring part 454 may be omitted.

Meanwhile, an example of the second elastic rotation restoring part 454 may be the same as described with reference to FIG. 48. However, the first elastic rotation restoring part 452 may have a "+" shaped cross section, and thus the second elastic rotation restoring part 454 may be formed at an angled portion of the "+" shape.

In the modified embodiment described with reference to FIG. 50, the first elastic rotation restoring part 452 may be integrally formed with at least one of the toothbrush head 410 and the toothbrush handle 420. For example, the first elastic rotation restoring part 452, the toothbrush head 410, and the toothbrush handle 420 may be manufactured through a single injection-molding process. From another point of view, the first elastic rotation restoring part 452 may be made of the same material as that of the toothbrush head 410 and the toothbrush handle 420, for example, plastic. In other words, even though the first elastic rotation restoring part 452 is made of plastic, the part may have a thin "+" cross-sectional shape, and thus may be twisted and restored.

The second elastic rotation restoring part 454 may be made of a material, for example, a thermoplastic resin-based material, a rubber-based material, a silicone-based material, or a polymer-based material, which has a greater strain rate against an external force than that of the first elastic rotation restoring part 452, the toothbrush head 410, and the toothbrush handle 420, that is, a flexible material. In other words, the above-described double injection-molding or insert process may be used to manufacture the second elastic rotation restoring part 454.

In addition, this technical matter may be applicable to a method in which the toothbrush head 410 is detached from the toothbrush handle 420. This may be the same as described with reference to FIG. 44. In addition, for robustness, as described with reference to FIG. 44, an end toothbrush handle 422 may be further provided. The end toothbrush handle 422 may be made of the same material as the toothbrush handle 420. Although not shown, the end toothbrush handle 422 and the toothbrush handle 420 may be connected via a connection part for connecting both thereof. The connection part may be made of the same material as that of the end toothbrush handle 422 and the toothbrush handle 420 by the same injection-molding process. The connection part may hold the end toothbrush handle 422 and the toothbrush handle 420 as a single body during the injection-molding process, thereby facilitating a double injection-molding process of the second elastic rotation restoring part 454. In other words, when the end toothbrush handle 422 and the toothbrush handle 420 are formed as two bodies during the injection-molding process, it may be possible to solve the difficulty of the double injection-molding design and step.

FIG. 51 shows another embodiment of the present invention. Only differentiated configurations will be described, and duplicate descriptions will be omitted.

Referring to FIG. 51, the elastic toothbrush according to one embodiment of the present invention may include a toothbrush head 410, a toothbrush handle 420, a first elastic rotation restoring part 452 therebetween, and a second elastic rotation restoring part 454 surrounding at least a portion of the first elastic rotation restoring part 452. The second elastic rotation restoring part 454 may be omitted.

In the embodiment described with reference to FIG. 51, it may be assumed that the technical idea of the present invention is applied to a common toothbrush, but may be applied to a molar toothbrush.

The first elastic rotation restoring part 452 may have a bent shape as shown. From another point of view, a virtual longitudinal extension line of the toothbrush head 410 and a virtual longitudinal extension line of the toothbrush handle 420 may have a bent shape, and the first elastic rotation restoring part 452 may have a bent shape so that the first elastic rotation restoring part 452 may connect the same. In this case, the first elastic rotation restoring part 452 may have a thin plate-shaped thickness to enable twist and restoration.

In addition, a hole may be provided at the first elastic rotation restoring part 452. This may be the same as described with reference to FIG. 47. In addition, as in the example described with reference to FIGS. 49A and 49B, at least one hole may be provided, and the second elastic rotation restoring part may provide a restoring force after the compressive deformation.

The second elastic rotation restoring part 454 may be provided at a surface of the first elastic rotation restoring part 452. One end and the other end of the second elastic rotation restoring part 454 may surround at least a portion of one end of the toothbrush head 410 and at least a portion of one end of the toothbrush handle 420. Of course, the second elastic rotation restoring part 454 may be omitted.

In the modified embodiment described with reference to FIG. 51, the first elastic rotation restoring part 452 may be integrally formed with at least one of the toothbrush head 410 and the toothbrush handle 420. For example, the first elastic rotation restoring part 452, the toothbrush head 410, and the toothbrush handle 420 may be manufactured through a single injection-molding process. From another point of view, the first elastic rotation restoring part 452 may be made of the same material as that of the toothbrush head 410 and the toothbrush handle 420, for example, plastic. In other words, even though the first elastic rotation restoring part 452 is made of plastic, the part may have a thin "+" cross-sectional shape, and thus may be twisted and restored.

The second elastic rotation restoring part 454 may be made of a material, for example, a thermoplastic resin-based material, a rubber-based material, a silicone-based material, or a polymer-based material, which has a greater strain rate against an external force than that of the first elastic rotation restoring part 452, the toothbrush head 410, and the toothbrush handle 420, that is, a flexible material. In other words, the above-described double injection-molding or insert process may be used to manufacture the second elastic rotation restoring part 454.

FIG. 52 shows another embodiment of the present invention. Only differentiated configurations will be described, and duplicate descriptions will be omitted.

Referring to FIG. 51, the elastic toothbrush according to one embodiment of the present invention may be formed to include a toothbrush head 410 and a toothbrush handle 220.

In this case, the toothbrush handle 420 may have a U-shaped cross section so as to have torsional elastic restoring force. A thickness of the U shape may have a thin thickness to enable a longitudinal axis torsional deformation. For example, the thickness of the U shape may be 0.1 mm to 1.2 mm. More specifically, blades may have any thickness of 0.2 mm, 0.3 mm, 0.4 mm, 0.5 mm, 0.6 mm, 0.7 mm, 0.8 mm, 0.9 mm, 1.0 mm, 1.1 mm, and 1.2 mm. This is an example, and any thickness which may enable torsional deformation with respect to a longitudinal axis of the toothbrush may be possible.

Although not shown, the second elastic rotation restoring part 454 described with reference to FIG. 51 may be provided on one side, for example, at least a portion of the inside of the U shape of the toothbrush handle 420.

In the embodiment described with reference to FIG. 52, it may be assumed that the technical idea of the present invention is applied to a common toothbrush, but may be applied to a molar toothbrush.

FIG. 53 shows another embodiment of the present invention. Only differentiated configurations will be described, and duplicate descriptions will be omitted.

Referring to FIG. 53, the elastic toothbrush according to one embodiment of the present invention may include a toothbrush head 410, a toothbrush handle 420, a first elastic rotation restoring part 452 therebetween, and a second elastic rotation restoring part 454 surrounding at least a portion of the first elastic rotation restoring part 452. The second elastic rotation restoring part 454 may be omitted.

In the embodiment described with reference to FIG. 53, it may be assumed that the technical idea of the present invention is applied to a common toothbrush, but may be applied to a molar toothbrush.

The first elastic rotation restoring part 452 may have a curved shape along a longitudinal direction of the first elastic rotation restoring part 452. In this case, the first elastic rotation restoring part 452 may include at least two layers. Accordingly, the first elastic rotation restoring part 452 may have a twist and a restoring force. To this end, the cross-section thereof may have a thin plate shape.

In addition, a hole may be provided at the first elastic rotation restoring part 452. This may be the same as described with reference to FIG. 47. In addition, as in the example described with reference to FIGS. 49A and 49B, at least one hole may be provided, and the second elastic rotation restoring part may provide a restoring force after the compressive deformation.

The second elastic rotation restoring part 454 may be provided at a surface of the first elastic rotation restoring part 452. One end and the other end of the second elastic rotation restoring part 454 may surround at least a portion of one end of the toothbrush head 410 and at least a portion of one end of the toothbrush handle 420. Of course, the second elastic rotation restoring part 454 may be omitted.

Meanwhile, a hole may be formed outside, not inside, of the second elastic rotation restoring part 454.

In the modified embodiment described with reference to FIG. 53, the first elastic rotation restoring part 452 may be integrally formed with at least one of the toothbrush head 410 and the toothbrush handle 420. For example, the first elastic rotation restoring part 452, the toothbrush head 410, and the toothbrush handle 420 may be manufactured through a single injection-molding process. From another point of view, the first elastic rotation restoring part 452 may be made of the same material as that of the toothbrush head 410 and the toothbrush handle 420, for example, plastic.

The second elastic rotation restoring part 454 may be made of a material, for example, a thermoplastic resin-based material, a rubber-based material, a silicone-based material, or a polymer-based material, which has a greater strain rate against an external force than that of the first elastic rotation restoring part 452, the toothbrush head 410, and the toothbrush handle 420, that is, a flexible material. In other words, the above-described double injection-molding or insert process may be used to manufacture the second elastic rotation restoring part 454.

In addition, this technical matter may be applicable to a method in which the toothbrush head 410 is detached from the toothbrush handle 420. This may be the same as described with reference to FIG. 44.

FIG. 54 shows another embodiment of the present invention. Only differentiated configurations will be described, and duplicate descriptions will be omitted.

Referring to FIG. 54, the elastic toothbrush according to one embodiment of the present invention may include a toothbrush head 410, a toothbrush handle 420, a first elastic rotation restoring part 452 therebetween, and a second elastic rotation restoring part 454 surrounding at least a portion of the first elastic rotation restoring part 452. The second elastic rotation restoring part 454 may be omitted.

In the embodiment described with reference to FIG. 54, it may be assumed that the technical idea of the present invention is applied to a common toothbrush, but may be applied to a molar toothbrush.

The first elastic rotation restoring part 452 may include a first protrusion 452a protruding and extending from the toothbrush head 410 and a second protrusion 452b protruding and extending from the toothbrush handle 420. The first protrusion 452a and the second protrusion 452b may be assembled so as to be rotatable relative to each other with respect to a longitudinal axis of the toothbrush. Here, "to be movable relative to" may mean that the longitudinal axis rotation of the second protrusion 452b is not performed in conjunction with the longitudinal axis rotation of the first protrusion 452a.

To this end, the first protrusion 452a may be inserted into a longitudinal hollow of the second protrusion 452b in the direction of the arrow in FIG. 54. On the contrary, unlike what is shown, the second protrusion 452b may be inserted into a longitudinal hollow of the first protrusion 452a in the direction of the arrow in FIG. 54.

In addition, a hole may be provided at the first elastic rotation restoring part 452. This may be the same as described with reference to FIG. 47. In addition, as in the example described with reference to FIGS. 49A and 49B, at least one hole may be provided, and the second elastic rotation restoring part may provide a restoring force after the compressive deformation. Torsional deformation may occur with respect to the longitudinal axis of the toothbrush, and thus torsional elastic energy may be stored and released.

The second elastic rotation restoring part 454 may be provided at a surface of the first elastic rotation restoring part 452. One end and the other end of the second elastic rotation restoring part 454 may surround at least a portion of one end of the toothbrush head 410 and at least a portion of one end of the toothbrush handle 420.

Meanwhile, a concave portion or a hole may be formed outside, not inside, of the second elastic rotation restoring part 454.

According to one example, a sleeve (not shown) may be provided between an external surface of the first elastic rotation restoring part 452 and an inner surface of the second elastic rotation restoring part 454. The sleeve may have a shape surrounding at least a portion of the first elastic rotation restoring part 452 in the circumferential direction. Accordingly, the sleeve may be provided so that the second elastic rotation restoring part 454 and the first elastic rotation restoring part 452 may not be in direct contact with each other. The sleeve may be omitted.

The second elastic rotation restoring part 454 may be made of a material, for example, a thermoplastic resin-based material, a rubber-based material, a silicone-based material, or a polymer-based material, which has a greater strain rate against an external force than that of the first elastic rotation restoring part 452, the toothbrush head 410, and the toothbrush handle 420, that is, a flexible material. In other words, the above-described double injection-molding or insert process may be used to manufacture the second elastic rotation restoring part 454.

The first protrusion 452a and the second protrusion 452b may rotate relative to each other, and the second elastic rotation restoring part 454 may surround at least a portion of an outer circumferential surface to which the first protrusion 452a and the second protrusion 452b are connected, 1. and thus the second elastic rotation restoring part 454 may provide an elastic twist and a restoring force during the rotation method of brushing,
2. and the rigidity may be secured in the state where the first protrusion 452a and the second protrusion 452b are assembled, thereby minimizing a phenomenon of being unintentionally pushed when brushing teeth.

In the present embodiment, it has been described that the first elastic rotation restoring part 452 may include a first protrusion 452a protruding and extending from the toothbrush head 410 and a second protrusion 452b protruding and extending from the toothbrush handle 420, but any structure capable of relative movement between the toothbrush head 410 and the toothbrush handle 420 may be possible.

For example, as shown in FIG. 54, the first protrusion 452a protruding and extending from the toothbrush head 410 may be provided, and the toothbrush handle 420 may be provided with an inlet into which the first protrusion 452a is inserted. In this case, unlike FIG. 54, the second protrusion 452b may be omitted.

For another example, as shown in FIG. 54, the second protrusion 452b protruding and extending from the toothbrush handle 420 may be provided, and the toothbrush head 410 may be provided with an inlet into which the second protrusion 452b is inserted. In this case, the first protrusion 452a may be omitted.

According to one example, an opening may be provided at one side of the toothbrush handle 420, and the first protrusion 452a may pass through the second protrusion 452b and be exposed through the opening of the toothbrush handle 420. Accordingly, the user may press the exposed first protrusion 452a, and the rotation of the toothbrush head 410 may vary depending on whether it is pressed or not. Accordingly, the user may not press the exposed first protrusion 452a when desiring to perform the rotation method of brushing and on the contrary, may press the exposed first protrusion 452a when desiring to perform the rotation method of brushing. At least a portion of the exposed first protrusion 452a may be covered by the second elastic rotation restoring part 454.

According to still another example, a rod may be provided instead of the first protrusion 452a and the second protrusion 452b. The rod may be, for example, a long rod shape having a circular cross-section. The rod may have a separate configuration from the toothbrush head 410 and the toothbrush handle 420, and may be coupled for relative movement relative to the toothbrush head 410 and the toothbrush handle 420. A hole between the toothbrush head 410 and the toothbrush handle 420 may be provided at one end of the toothbrush head 410 and one end of the toothbrush handle 420 so as to be coupled for relative movement. In other words, the rod may move relative to one end of the toothbrush head 410 and may move relative to one end of the toothbrush handle 420. Here, the second elastic rotation restoring part 454 may be disposed to surround at least a portion of the rod, the toothbrush head 410, and the toothbrush handle 420. In other words, the rod, the toothbrush head 410, and the toothbrush handle 420 may be coupled by the second elastic rotation restoring part 454.

FIGS. 55 to 60 are views for explaining another embodiment of the present invention. Only differentiated configurations will be described, and duplicate descriptions will be omitted. FIG. 55 shows an appearance of another embodiment, FIG. 56 shows a planar cross-section, FIG. 57 shows a side cross-section, FIG. 58 shows the first protrusion 412, and FIG. 59 shows the second protrusion 422.

Referring to FIGS. 55 to 60, the elastic toothbrush according to one embodiment of the present invention may include a toothbrush head 410, a toothbrush handle 420, and at least one of a first elastic rotation restoring part 452 and a second elastic rotation restoring part 454. The second elastic rotation restoring part 454 may be omitted.

Referring to FIGS. 55 to 60, it may be assumed that the technical idea of the present invention is applied to a common toothbrush, but may be applied to a molar toothbrush.

The toothbrush head 410 and the toothbrush handle 420 may be separate components independent from each other. The first protrusion 412 may be provided at one end of the toothbrush head 410. The second protrusion 422 may be provided at one end of the toothbrush handle 420. The first protrusion 412 may extend and protrude toward the toothbrush handle 420, and the second protrusion 422 may extend and protrude toward the toothbrush head 410.

In this case, an empty space may be provided inside the first protrusion 412. To that end, the first protrusion 412 may have a hollow circular cylinder shape. An empty space may be provided inside the second protrusion 422. To that end, the second protrusion 422 may have a hollow circular cylinder shape. Accordingly, when the toothbrush head 410 and the toothbrush handle 420 are coupled, a rotation accommodation hollow E may be provided therein.

As shown in FIGS. 56 and 57, one end of the first protrusion 412 may be inclined downward in the direction of the toothbrush handle 420 from the toothbrush rotation accommodation hollow E radially outward, may be horizontal in the Y-axis direction, or may be inclined upward in the direction of the toothbrush head 410 radially outward. The second protrusion 422 may have a shape corresponding to the shape of the first protrusion 412.

The toothbrush head 410 may be provided with the first elastic rotation restoring part 452 in the direction of the toothbrush handle 420. For example, the first elastic rotation restoring part 452 may extend through at least a portion of the rotation accommodation hollow E. The first elastic rotation restoring part 452 may have a plate-shaped structure which is somewhat narrow and thick. In other words, as shown in FIG. 56 showing the plane of FIG. 55, the first elastic rotation restoring part 452 may be relatively narrow in the width direction (Y direction), and as shown in FIG. 57 showing the side of FIG. 55, the first elastic rotation restoring part 452 may be relatively thick in the height direction (Z direction). Accordingly, the first elastic rotation restoring part 452 may perform torsional deformation and release a restoring force during the rotation method of brushing. The shape of the first elastic rotation restoring part may be one example, and as described above, the width and height directions may be opposite to each other, the cross section may be a "+" shape, the cross section may have a smaller or larger blade than the "+" shape, or the two plate shapes may be disposed in parallel.

The first elastic rotation restoring part 452 may have a thin thickness to enable a longitudinal axis torsional deformation. For example, the thickness of the first elastic rotation restoring part 452 may be 0.1 mm to 1.2 mm. More specifically, blades may have any thickness of 0.2 mm, 0.3 mm, 0.4 mm, 0.5 mm, 0.6 mm, 0.7 mm, 0.8 mm, 0.9 mm, 1.0 mm, 1.1 mm, and 1.2 mm. This is an example, and any thickness which may enable torsional deformation with respect to a longitudinal axis of the toothbrush may be possible.

Hereinafter, it may be assumed that the shape of the first elastic rotation restoring part 452 is the shape shown in FIGS. 56 and 57.

In order for the first elastic rotation restoring part 452 to perform a torsional deformation and release a restoring energy thereof with respect to the longitudinal axis of the toothbrush, when the toothbrush head 410 and the toothbrush handle 420 are coupled, one end of the first elastic rotation restoring part 452 may be accommodated in an accommodation hole C (see FIG. 59) provided at one side of the toothbrush handle 420.

After the toothbrush head 410 and the toothbrush handle 420 are coupled to each other, at least a portion of the first protrusion 412 and the second protrusion 422 may be surrounded by the second elastic rotation restoring part 454. The second elastic rotation restoring part 454 may serve as a coupling agent for coupling the toothbrush head 410 and the toothbrush handle 420.

The toothbrush head 410, the first protrusion 412, the first elastic rotation restoring part 452, the toothbrush handle 420, and the second protrusion 422 may be made of a hard material, and the second elastic rotation restoring part 454 may be made of a soft material. The hard material may be made of at least one of, for example, plastic, an eco-friendly material, and a biodegradable plastic, and the soft material may be made of at least one of a thermoplastic resin-based material, a rubber-based material, a silicone-based material, and a polymer-based material.

Due to the above-described coupling relationship and material relationship, during the rotation method of brushing, the first elastic rotation restoring part 452 may be subjected to torsional deformation in the rotation accommodation hollow E, and the second elastic rotation restoring part 454 may be subjected to deformation to extend in the circumferential direction around the X axis. Accordingly, the first elastic rotation restoring part 452 and the second elastic rotation restoring part 454 may provide an elastic restoring force in the direction S of FIG. 57 and in either direction.

Unlike the above-described example, the second elastic rotation restoring part 454 may fill at least a portion of the rotation accommodation hollow E.

In the above-described example, the toothbrush head 410, the first protrusion 412, and the first elastic rotation restoring part 452 may be injection-molded as one component, and the toothbrush handle 420 and the second protrusion 422 may be separately injection-molded as another component.

For another example, the toothbrush head 410, the first protrusion 412, the first elastic rotation restoring part 452, the toothbrush handle 420, and the second protrusion 422 may be injection-molded as one component. In this case, the accommodation hole C may be omitted. In addition, the second elastic rotation restoring part 454 may be disposed to connect the first protrusion portion 412 and the second protrusion portion 422 which is movable with respect to the first protrusion 412. Accordingly, the second elastic rotation restoring part 454 may store and release a torsional elastic energy.

In addition, in the above-described example, it may be assumed that the first protrusion 452 and the second protrusion 454 are provided, but one of them may be omitted. In this case, the remaining protrusion may further extend in the direction of the omitted protrusion, and may be filled with the second elastic rotation restoring part 454.

In addition, although it is assumed in the above-described example that the first elastic rotation restoring part 452 extends from the inside of the toothbrush head 410 toward the toothbrush handle 420, the first elastic rotation restoring part 452 may extend from the inside of the toothbrush handle 420 toward the toothbrush head 410. In this case, the accommodation hole may be provided inside the toothbrush head 410.

In addition, in the above-described example, it may be assumed that the first elastic rotation restoring part 452 and the second elastic rotation restoring part 454 provide an elastic rotation restoring force together, but one of them may be omitted.

For example, the first elastic rotation restoring part 452 may be omitted. In this case, the second elastic rotation restoring part 454 may provide an elastic rotation restoring force. Furthermore, the rotation accommodation hollow E may still form a hollow, or may be omitted and filled with the toothbrush head or the toothbrush handle.

For another example, the second elastic rotation restoring part 454 may be omitted. In this case, the first elastic rotation restoring part 454 may provide an elastic rotation restoring force.

According to one example, an opening (not shown) may be provided at one side of the toothbrush handle 420, for example, the opening may be provided at a lower end (a lower end opposite to the toothbrush head) than an accommodation hole C (see FIG. 59) provided at one side of the toothbrush handle 420. The first elastic rotation restoring part 452 may pass through the accommodation port C and be exposed through an opening of the toothbrush handle 420.

Accordingly, the user may press the exposed first elastic rotation restoring part 452, and the rotation of the toothbrush head 410 may vary depending on whether it is pressed or not. Accordingly, the user may not press the exposed first elastic rotation restoring part 452 when desiring to perform the rotation method of brushing and on the contrary, may press the exposed first elastic rotation restoring part 452 when desiring to perform the rotation method of brushing. At least a portion of the exposed first elastic rotation restoring part 452 may be covered by the second elastic rotation restoring part 454.

Further, for convenience of pressing, the first elastic rotation restoring part 452 may be wider in the Y direction at the exposed opening than at the toothbrush rotation accommodation hollow E.

FIG. 60 is a modified embodiment described with reference to FIGS. 55 to 59. The following description will focus on differentiated configurations.

A protrusion 424 may be provided in the toothbrush handle 420. The first elastic rotation restoring part 452 may be inserted for relative movement relative to the protrusion 424. In this case, the second elastic rotation restoring part 454 may store and release a torsional deformation energy with respect to the longitudinal axis of the toothbrush. In this case, the first elastic rotation restoring part 452 may be inserted into the protrusion 424 to reinforce strength against an external force. Accordingly, the first elastic rotation restoring part 452 may merely serve as a rotation part.

To that end, the first elastic rotation restoring part 452 may have a long rod shape having a circular cross-section. The protrusion 424 may have a shape in which the first elastic rotation restoring part 452 may relatively move inside the protrusion 424.

Unlike the arrangement relationship of the above-described example, a configuration which serves as the first elastic rotation restoring part 452 may be provided in the toothbrush handle 420 rather than the toothbrush head 410. In this case, the protrusion 424 may be provided in the toothbrush head 410.

Other descriptions such as materials of other configurations, etc., may be the same as those described above with reference to FIGS. 55 to 59.

FIG. 61 is a view for explaining still another modified embodiment of the present invention. Only differentiated configurations will be described, and duplicate descriptions will be omitted.

Referring to FIG. 61, the elastic toothbrush according to one embodiment of the present invention may include a toothbrush head 410, a toothbrush handle 420, and a first elastic rotation restoring part 452 therebetween. In the embodiment described with reference to FIG. 61, it may be assumed that the technical idea of the present invention is applied to the molar toothbrush, but may be applied to a general toothbrush.

As shown in FIG. 61, the first elastic rotation restoring part 452 may have a spiral screw shape, but may have a predetermined thin thickness to store and release a torsional energy deformed with respect to the longitudinal axis of the toothbrush. From another point of view, it may be understood as having a spiral structure of a thin-plate-shaped elastic rotation restoring part described with reference to FIG. 45. Furthermore, the first elastic rotation restoring part 452 may have a double spiral structure such as a base structure.

The first elastic rotation restoring part 452 may have a thin thickness to enable a longitudinal axis torsional deformation. For example, the thickness of the first elastic rotation restoring part 452 may be 0.1 mm to 1.2 mm. More specifically, blades may have any thickness of 0.2 mm, 0.3 mm, 0.4 mm, 0.5 mm, 0.6 mm, 0.7 mm, 0.8 mm, 0.9 mm, 1.0 mm, 1.1 mm, and 1.2 mm. This is an example, and any thickness which may enable torsional deformation with respect to a longitudinal axis of the toothbrush may be possible.

A thickness of the first elastic rotation restoring part 452 may vary depending on a direction. For example, it may become thicker from the toothbrush head 410 toward the toothbrush handle 420.

In addition, the spiral structure of the first elastic rotation restoring part 452 may have a phase change of one period from the toothbrush head 410 to the toothbrush handle 420, and may have a smaller or larger phase change.

In addition, the spiral structure of the first elastic rotation restoring part 452 may have a shorter or longer pitch distance from the toothbrush head 410 to the toothbrush handle 420. If the pitch distance becomes longer and thicker, the elastic torsional force may be provided more strongly near the toothbrush head 410.

As described above, a second elastic rotation restoring part may be provided at a surface of the first elastic rotation restoring part 452. One end and the other end of the second elastic rotation restoring part may surround at least any area between at least a portion of one end of the toothbrush head 410 and at least a portion of one end of the toothbrush handle 420. Of course, the second elastic rotation restoring part 454 may be omitted.

According to one example, at least one hole may be provided in the first elastic rotation restoring part 452 along a longitudinal direction of the first elastic rotation restoring part 452. For example, three holes may be provided. The second elastic rotation restoring part may be provided in the hole. When the first elastic rotation restoring part 452 is made of a material harder than that of the second elastic rotation restoring part 454, that is, when the first elastic rotation restoring part 452 is made of plastic and the second elastic rotation restoring part is made of a rubber material, deformation may occur in a hole shape of the first elastic rotation restoring part 452, if the first elastic rotation restoring part 452 is twisted by the rotation method of brushing. When the second elastic rotation restoring part is provided inside the hole of the first elastic rotation restoring part 452, the second elastic rotation restoring part may also be deformed by the deformation of the hole shape. In other words, the second elastic rotation restoring part may be compressively deformed, and the second elastic rotation restoring part may also provide a restoring force while the compressively deformed shape is restored. To this end, the second elastic rotation restoring part may be provided in a dot shape to fill only the hole of the first elastic rotation restoring part 452, and may be disposed to cover other portions other than the hole.

Meanwhile, the second elastic rotation restoring part may have an uneven shape on a surface as shown in FIG. 48, for example, a mesh structure.

In the modified embodiment described with reference to FIG. 61, the first elastic rotation restoring part 452 may be integrally formed with at least one of the toothbrush head 410 and the toothbrush handle 420. For example, the first elastic rotation restoring part 452, the toothbrush head 410, and the toothbrush handle 420 may be manufactured through a single injection-molding process. From another point of view, the first elastic rotation restoring part 452 may be made of the same material as that of the toothbrush head 410 and the toothbrush handle 420, for example, plastic. In other words, even though the first elastic rotation restoring part 452 is made of plastic, as shown in FIG. 61, the part may have a thin cross-sectional plate-like shape, and thus may be twisted and restored. According to one example, the first elastic rotation restoring part 452, the toothbrush head 410, and the toothbrush handle 420 may be made of at least one material of eco-friendly plastics, biodegradable materials, and metals.

The second elastic rotation restoring part may be made of a material, for example, a thermoplastic resin-based material, a rubber-based material, a silicone-based material, or a polymer-based material, which has a greater strain rate against an external force than that of the first elastic rotation restoring part 452, the toothbrush head 410, and the toothbrush handle 420, that is, a flexible material. In other words, the above-described double injection-molding or insert process may be used to manufacture the second elastic rotation restoring part.

The present technical idea may be applied without limitation to a molar toothbrush, a general toothbrush, etc.

In addition, this technical matter may be applicable to a method in which the toothbrush head 410 is detached from the toothbrush handle 420. This may be the same as described with reference to FIG. 44. In addition, for robustness, as described with reference to FIG. 44, an end toothbrush handle 422 may be further provided. The end toothbrush handle 422 may be made of the same material as the toothbrush handle 420. Although not shown, the end toothbrush handle 422 and the toothbrush handle 420 may be connected via a connection part for connecting both thereof. The connection part may be made of the same material as that of the end toothbrush handle 422 and the toothbrush handle 420 by the same injection-molding process. The connection part may hold the end toothbrush handle 422 and the toothbrush handle 420 as a single body during the injection-molding process, thereby facilitating a double injection-molding process of the second elastic rotation restoring part. In other words, when the end toothbrush handle 422 and the toothbrush handle 420 are formed as two bodies during the injection-molding process, it may be possible to solve the difficulty of the double injection-molding design and step. In this case, a path of the end toothbrush handle 422 through which the first elastic rotation restoring part 452 passes may be wider than that of the second elastic rotation restoring part. In the description of FIG. 44, it may be assumed that the first elastic rotation restoring part is disposed on the toothbrush head, but alternatively may be disposed on the side of the toothbrush handle. In addition, it may be assumed that the first elastic rotation restoring part is disposed on the toothbrush head, but alternatively may be disposed on the side of the toothbrush head.

The embodiments described in the present specification may be variously combined. In other words, the toothbrush head of a specific drawing, the toothbrush handle of another drawing, and the elastic rotation restoring part of still another drawing may be combined in various ways.

In addition, as described above, the surface of the elastic rotation restoring part 450 (applicable to the first and second elastic rotation restoring parts, too) may have an unevenness thereon and, for example, may have a mesh structure formed in a diagonal direction (see a diagonal direction and a mesh direction of reference numeral 230 of FIG. 10) so as to facilitate storage and release of elastic energy. It goes without saying that not only the mesh direction, but also the vertical direction and/or the horizontal direction, and a combination thereof may be also possible. In addition, in the case of the molar elastic toothbrush described with reference to FIG. 42, the uneven structure may have a predetermined shape so that rotation may be smooth when the toothbrush head and the toothbrush handle have a predetermined angle.

Although the embodiments described with reference to FIGS. 1 to 61 have been described with reference to a toothbrush, the technical idea of the present invention may be an elastic restoring mechanism applied to other products. In other words, it may be applied to applications for purposes other than the purpose of rotational restoring force of the bristles. For example, it may be applied to various structures such as animal toothbrushes, molar toothbrushes, tongue cleaners, ear picks, industrial multi-joints, razors, and other human, industrial, and household goods (without limitation to the scope of application). For example, when applied to a tongue cleaner, the posture of a tongue cleaner portion may vary to correspond to a curved surface of a tongue, and thus cleaning may be tightly carried out. Furthermore, when applied to an ear pick, an unintended force may be prevented from being applied to the ear by the deformation of the elastic deformation allowing part, and an elastic force may be further added to an ear picking force, so as to improve the efficiency of the ear picking. In addition, when applied to a razor, it may be provided between a razor blade and a razor handle and the elastic deformation restoring part may be deformed so that the razor blade may come in good contact with the skin. In other words, the technical idea of the present invention may not be limited to the exemplified toothbrush only, but may be used in various fields.

According to one example, the bending strength of the bristles may vary depending on the posture of the bristles. For example, for the rotation method, the bristles may be easily bent at a small external force while leaning against the tooth surface as a preparation operation. The bristles are bent to a certain extent when an external force is applied via the handle, and as a degree of bending increases, more force (operating the toothbrush handle) is required for further bending. Accordingly, the bending strength of the elastic rotation restoring part (meaning at least one of the elastic rotation restoring part, the first elastic rotation restoring part, and the second elastic rotation restoring part) according to the present embodiments may be determined in consideration of the shape of the bristles (meaning the bending shape of the bristles according to the brushing). For example, an unfolded state in which an external force is not applied to the bristles (that is, before the brushing starts) is most easily bent by the external force, and the elastic rotation restoring part (meaning at least one of the elastic rotation restoring part, the first elastic rotation restoring part, and the second elastic rotation restoring part) may have a bending strength enough to start twist when a stronger external force is given by the brushing.

At least a portion of the elastic rotation restoring part (meaning at least one of the elastic rotation restoring part, the first elastic rotation restoring part, and the second elastic rotation restoring part) according to the present embodiments may be located outside the mouth during tooth brushing.

According to one example, the toothbrush head and the toothbrush handle may be made of plastic, eco-friendly materials, biodegradable plastic, or silicone-based materials.

According to one example, the shape of the bristles described with reference to FIG. 3 may be applied to other embodiments.

Although the present invention has been described in detail with reference to exemplary embodiments, the scope of the present invention is not limited to a specific embodiment and should be interpreted by the attached claims. In addition, those skilled in the art should understand that many modifications and variations are possible without departing from the scope of the present invention.

The invention claimed is:

1. A brushing guide elastic toothbrush comprising:
   a toothbrush head part having bristles provided on an outer circumferential surface of one side in a longitudinal direction;

a toothbrush handle part connected to a rear end of the toothbrush head part in the longitudinal direction and extending in one direction such that a user holds the toothbrush handle part by hand; and a first elastic rotation restoring part provided between the toothbrush head part and the toothbrush handle part and configured to allow rotation of the toothbrush handle part and rotation of the toothbrush head part based on the rotation of the toothbrush handle part, wherein, in a state where the bristles are pressed and in close contact with user's teeth or gums, when a force is applied to the toothbrush handle part by the user such that the toothbrush handle part rotates in one direction with respect to the longitudinal direction, the first elastic rotation restoring part allows the rotation of the toothbrush handle part through an axial torsional deformation of the first elastic rotation restoring part, wherein, in a state where axial torsional energy according to the axial torsional deformation of the first elastic rotation restoring part is stored in the first elastic rotation restoring part, when the pressure contact of the bristles is released from the user's teeth or gums, the first elastic rotation restoring part releases the stored axial torsional energy to the toothbrush head part such that the toothbrush head part rotates in the same direction as the toothbrush handle part, thereby allowing the teeth or gums to be cleaned by the bristles, wherein the toothbrush head part, the toothbrush handle part, and the first elastic rotation restoring part form a single body of the same material, and wherein the first elastic rotation restoring part is formed of at least one plate-shaped member having a length in one direction smaller than a length in the other direction in a cross-section, for the axial torsional deformation and the storage and release of the axial torsional energy.

2. The brushing guide elastic toothbrush of claim 1, wherein the first elastic rotation restoring part has a cross-section formed of the at least one plate-shaped member in a plus (+) shape.

3. The brushing guide elastic toothbrush of claim 2, wherein, when the cross-section of the first elastic rotation restoring part has the plus (+) shape, the cross-section having the plus (+) shape increases in size toward the toothbrush head part or the toothbrush handle part.

4. The brushing guide elastic toothbrush of claim 1, wherein the first elastic rotation restoring part increases in width or thickness toward the toothbrush head part or the toothbrush handle part.

5. The brushing guide elastic toothbrush of claim 1, wherein, for the axial torsional deformation and the storage and release of the axial torsional energy, a thickness of the plate-shaped member, which is defined by a length in one direction smaller than a length in the other direction in a cross-section, is 0.1 mm to 1.2 mm.

6. The brushing guide elastic toothbrush of claim 1, further comprising a second elastic rotation restoring part configured to surround at least a portion of the first elastic rotation restoring part, wherein the second elastic rotation restoring part is formed of a material having an axial torsional deformation rate greater than that of the first elastic rotation restoring part when the force is applied to the toothbrush handle part by the user.

7. The brushing guide elastic toothbrush of claim 6, wherein the toothbrush head part, the toothbrush handle part, and the first elastic rotation restoring part are manufactured by a first injection molding process, and the second elastic rotation restoring part is manufactured by a second injection molding process following the first injection molding process.

* * * * *